Aug. 3, 1943. M. CHRISTENSEN Re. 22,359

SIGNATURE HANDLING MACHINE

Original Filed Aug. 24, 1939 44 Sheets-Sheet 1

INVENTOR
MARTIN CHRISTENSEN
BY
Erwin B. Keiring
ATTORNEY

SIGNATURE HANDLING MACHINE

Original Filed Aug. 24, 1939 44 Sheets-Sheet 2

INVENTOR
MARTIN CHRISTENSEN
BY Erwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 3

INVENTOR
MARTIN CHRISTENSEN
BY
Erwin B. Keising
ATTORNEY

Aug. 3, 1943. M. CHRISTENSEN Re. 22,359

SIGNATURE HANDLING MACHINE

Original Filed Aug. 24, 1939 44 Sheets-Sheet 4

INVENTOR
MARTIN CHRISTENSEN
BY Erwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 5

INVENTOR
MARTIN CHRISTENSEN
BY
Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 6

INVENTOR
MARTIN CHRISTENSEN
BY Kenwin B. Fising
ATTORNEY

Aug. 3, 1943. M. CHRISTENSEN Re. 22,359

SIGNATURE HANDLING MACHINE

Original Filed Aug. 24, 1939 44 Sheets-Sheet 7

INVENTOR
MARTIN CHRISTENSEN
BY
Erwin B. Siring
ATTORNEY

Aug. 3, 1943. M. CHRISTENSEN Re. 22,359

SIGNATURE HANDLING MACHINE

Original Filed Aug. 24, 1939 44 Sheets-Sheet 8

INVENTOR
MARTIN CHRISTENSEN
BY Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 9

INVENTOR
MARTIN CHRISTENSEN
BY Erwin B. Kiesing
ATTORNEY

Aug. 3, 1943. M. CHRISTENSEN Re. 22,359

SIGNATURE HANDLING MACHINE

Original Filed Aug. 24, 1939 44 Sheets-Sheet 10

INVENTOR
MARTIN CHRISTENSEN
BY Erwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 11

INVENTOR
MARTIN CHRISTENSEN
BY
ATTORNEY

Aug. 3, 1943. M. CHRISTENSEN Re. 22,359

SIGNATURE HANDLING MACHINE

Original Filed Aug. 24. 1939 44 Sheets-Sheet 12

INVENTOR
MARTIN CHRISTENSEN
BY Edwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 13

INVENTOR
MARTIN CHRISTENSEN
BY Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 14

INVENTOR
MARTIN CHRISTENSEN
BY
Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 15

INVENTOR
MARTIN CHRISTENSEN
BY
Erwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 16

INVENTOR
MARTIN CHRISTENSEN
BY
ATTORNEY

Aug. 3, 1943. M. CHRISTENSEN Re. 22,359

SIGNATURE HANDLING MACHINE

Original Filed Aug. 24, 1939 44 Sheets-Sheet 17

INVENTOR
MARTIN CHRISTENSEN
BY
Kenwin B. Kiring
ATTORNEY

Aug. 3, 1943. M. CHRISTENSEN Re. 22,359

SIGNATURE HANDLING MACHINE

Original Filed Aug. 24, 1939 44 Sheets-Sheet 18

INVENTOR
MARTIN CHRISTENSEN
BY Erwin B. Eiring
ATTORNEY

Aug. 3, 1943. M. CHRISTENSEN Re. 22,359

SIGNATURE HANDLING MACHINE

Original Filed Aug. 24, 1939 44 Sheets-Sheet 19

INVENTOR
MARTIN CHRISTENSEN
BY
Erwin B. Keiring
ATTORNEY

SIGNATURE HANDLING MACHINE

Original Filed Aug. 24, 1939 44 Sheets-Sheet 20

INVENTOR
MARTIN CHRISTENSEN
BY
Erwin B. Kiring
ATTORNEY

SIGNATURE HANDLING MACHINE
Original Filed Aug. 24, 1939 44 Sheets-Sheet 21
FIG. 22
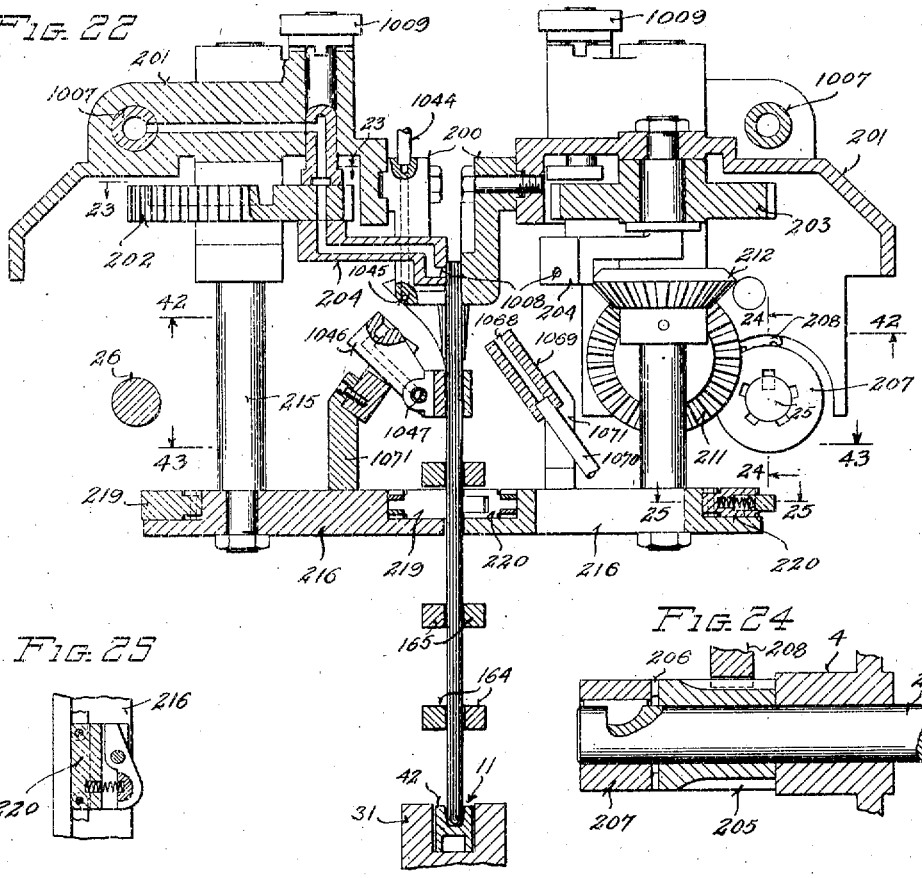
FIG. 25
FIG. 24
FIG. 23
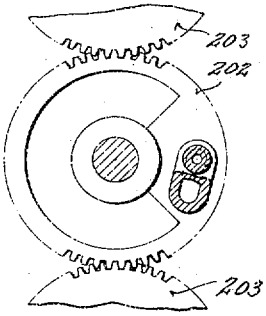
FIG. 26
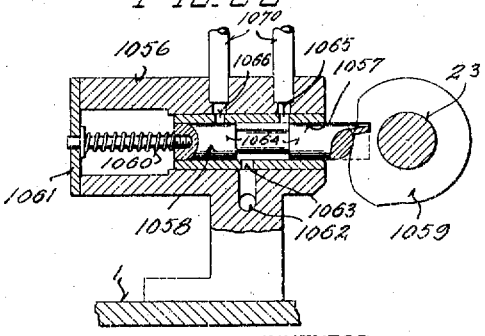
INVENTOR
MARTIN CHRISTENSEN
BY Erwin B. Keiring
ATTORNEY Aug. 3, 1943. M. CHRISTENSEN Re. 22,359

SIGNATURE HANDLING MACHINE

Original Filed Aug. 24, 1939 44 Sheets-Sheet 22

INVENTOR
MARTIN CHRISTENSEN
BY
Edwin B. Karing
ATTORNEY

Aug. 3, 1943. M. CHRISTENSEN Re. 22,359

SIGNATURE HANDLING MACHINE

Original Filed Aug. 24, 1939 44 Sheets-Sheet 23

INVENTOR
MARTIN CHRISTENSEN
BY Erwin B. Keising
ATTORNEY

Aug. 3, 1943. M. CHRISTENSEN Re. 22,359

SIGNATURE HANDLING MACHINE

Original Filed Aug. 24, 1939 44 Sheets-Sheet 24

INVENTOR
MARTIN CHRISTENSEN
BY Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 25

Aug. 3, 1943. M. CHRISTENSEN Re. 22,359

SIGNATURE HANDLING MACHINE

Original Filed Aug. 24, 1939 44 Sheets-Sheet 26

INVENTOR
MARTIN CHRISTENSEN
BY Erwin B. Keiring
ATTORNEY

SIGNATURE HANDLING MACHINE

Original Filed Aug. 24, 1939 44 Sheets-Sheet 27

INVENTOR
MARTIN CHRISTENSEN
BY
Erwin B. Kiring
ATTORNEY

SIGNATURE HANDLING MACHINE

Original Filed Aug. 24, 1939 44 Sheets-Sheet 28

INVENTOR
MARTIN CHRISTENSEN
BY Erwin B. Eiring
ATTORNEY

SIGNATURE HANDLING MACHINE

Original Filed Aug. 24, 1939 44 Sheets-Sheet 29

INVENTOR
MARTIN CHRISTENSEN
BY Erwin B. Kiring
ATTORNEY

SIGNATURE HANDLING MACHINE

Original Filed Aug. 24, 1939 44 Sheets-Sheet 30

INVENTOR
MARTIN CHRISTENSEN
BY
Kerwin B. Koring
ATTORNEY

SIGNATURE HANDLING MACHINE

Original Filed Aug. 24, 1939 44 Sheets-Sheet 31

INVENTOR
MARTIN CHRISTENSEN
BY Erwin B. Kiring
ATTORNEY

SIGNATURE HANDLING MACHINE

Original Filed Aug. 24, 1939 44 Sheets-Sheet 32

INVENTOR
MARTIN CHRISTENSEN
BY
ATTORNEY

SIGNATURE HANDLING MACHINE

Original Filed Aug. 24, 1939 44 Sheets-Sheet 33

INVENTOR
MARTIN CHRISTENSEN
BY Erwin B. Ewing
ATTORNEY

SIGNATURE HANDLING MACHINE

Original Filed Aug. 24, 1939 44 Sheets-Sheet 34

INVENTOR
MARTIN CHRISTENSEN
BY Edwin B. Herring
ATTORNEY

Aug. 3, 1943. M. CHRISTENSEN Re. 22,359

SIGNATURE HANDLING MACHINE

Original Filed Aug. 24, 1939 44 Sheets-Sheet 35

INVENTOR
MARTIN CHRISTENSEN
BY Benjamin B. Lining
ATTORNEY

SIGNATURE HANDLING MACHINE

Original Filed Aug. 24, 1939 44 Sheets-Sheet 36

INVENTOR
MARTIN CHRISTENSEN
BY
Erwin B. Keiring
ATTORNEY

SIGNATURE HANDLING MACHINE

Original Filed Aug. 24, 1939 44 Sheets-Sheet 37

INVENTOR
MARTIN CHRISTENSEN
BY Erwin B. Keiring
ATTORNEY

SIGNATURE HANDLING MACHINE

Original Filed Aug. 24, 1939 44 Sheets-Sheet 38

INVENTOR
MARTIN CHRISTENSEN
BY
ATTORNEY

SIGNATURE HANDLING MACHINE

Original Filed Aug. 24, 1939 44 Sheets-Sheet 39

INVENTOR
MARTIN CHRISTENSEN
BY
Benjamin B. Koring
ATTORNEY

Aug. 3, 1943. M. CHRISTENSEN Re. 22,359

SIGNATURE HANDLING MACHINE

Original Filed Aug. 24, 1939 44 Sheets-Sheet 40

INVENTOR
MARTIN CHRISTENSEN
BY
Norris B. Kiring
ATTORNEY

SIGNATURE HANDLING MACHINE

Original Filed Aug. 24, 1939 44 Sheets-Sheet 41

INVENTOR
MARTIN CHRISTENSEN
BY Erwin B. Keiring
ATTORNEY

Aug. 3, 1943. M. CHRISTENSEN Re. 22,359

SIGNATURE HANDLING MACHINE

Original Filed Aug. 24, 1939 44 Sheets-Sheet 42

INVENTOR
MARTIN CHRISTENSEN
BY
Erwin B. Kiring
ATTORNEY

SIGNATURE HANDLING MACHINE

Original Filed Aug. 24, 1939 44 Sheets-Sheet 43

INVENTOR
MARTIN CHRISTENSEN
BY
Erwin B. Keiring
ATTORNEY

SIGNATURE HANDLING MACHINE

Original Filed Aug. 24, 1939 44 Sheets-Sheet 44

INVENTOR
MARTIN CHRISTENSEN
BY
Emery B. Keiring
ATTORNEY

Reissued Aug. 3, 1943

Re. 22,359

UNITED STATES PATENT OFFICE 22,359

SIGNATURE HANDLING MACHINE

Martin Christensen, Milwaukee, Wis.

Original No. 2,253,556, dated August 26, 1941, Serial No. 291,662, August 24, 1939. Application for reissue August 24, 1942, Serial No. 455,962

80 Claims. (Cl. 270—55)

This invention relates to signature handling machines and more particularly to a method and apparatus for effecting the automatic transfer of succession of individual signatures from a source of supply, such as a stack on a signature feed station, to a moving conveyor; advancing the signatures through a signature opener station and subjecting them individually to the action of opener mechanisms to produce one or more openings in each signature between preselected pages thereof; advancing the open signatures through one or more sheet feed stations and effecting the insetting of sheets into the opening or openings in the signatures; advancing the filled signatures into a gauging station provided with mechanism for contacting the filled signatures individually to check the accuracy of the insetting operation; advancing the gauged filled signatures into a discharge station and ejecting them therefrom, under control of the signature gauging mechanism, into one of two segregated groups, accepted, properly filled, signatures or rejected, improperly filled, signatures.

The term signature as used in this application may be defined as a printed sheet or set of sheets folded as a unit into four or any multiple of four pages and forming a section of a book or pamphlet. In the book binding art, a signature generally contains sixteen pages.

The term inset as used in this application refers to one or more sheets or leaves which may be inserted into a signature prior to the binding operation. In the book binding art, an inset is considered to be the sheet, leaf, leaves, or color forms inset in or between pages of a previously folded signature.

The signature handling machine of the present invention comprises a fully automatic machine adapted to remove individual signatures from a stack, open them individually between preselected pages on either or both sides of the center fold of the signature, inset sheets or color forms into the opening or openings formed in the signature, gauge the filled signatures individually to determine the accuracy of the opening and insetting operations, and discharge the gauged signature into accepted or rejected groups under automatic control of the gauging mechanism.

To the best of my knowledge, the operation of insetting is performed manually in practice, with the possible exception of the instance where the inset is introduced into the opening formed by the center fold of the signature. When a sheet or color form is inserted into a signature between pages not separated by the center fold of the signature, the operation requires manual accomplishment. A skilled worker is able to fill between five and six thousand signatures in a day's time. Signatures filled manually require a second manual handling by an inspector in order to check the accuracy of the insetting operation.

One operator is able to care for the automatic machine of the present invention which has a capacity for handling and filling approximately six thousand signatures per hour. In addition to the high capacity of the machine, it is designed to function with one hundred per cent accuracy; no signature which is improperly filled can be discharged into, or confused with, properly filled signatures.

The primary object of the present invention resides in the provision in a signature handling machine of a new and improved method and means for the automatic handling of signatures which includes the feeding, opening, insetting of one or more auxiliary sheets or color forms into the open signature, gauging the filled signature to determine the accuracy of the opening and insetting operations and discharging the same under automatic control of the gauging mechanism.

A further object of the invention resides in the provision of a new and improved method and means for the removal of a succession of individual signatures from a stack on a signature feed station and the transfer of the signatures to a movable conveyor.

Another object of the invention, with reference to the signature feed station, resides in the provision of movable vacuum means adapted to engage the bottom signature of a stack and draw the leading edge thereof downwardly from the remaining signatures of the stack.

Another object, with reference to this station, lies in the provision of a rockable signature picker arm having a movable jaw; the arm and jaw cooperating to engage the leading edge of the lowermost signature and draw the signature outwardly from the stack and deposit it upon a feeding table.

Another object, with reference to this station lies in the provision of adjustable signature guide and pusher gauge plates, the latter adapted to advance the signature along the signature feed table to the position where the signature is engaged by a power feed roll and directed forwardly and downwardly on to a moving conveyor where the signature is deposited in upright closed position with the folded edge on the conveyor.

A further object resides in the provision of new and improved method and means for the automatic opening of the signatures at one or more places between preselected pages thereof during passage of the signature through the signature opener station.

Another object of the invention, with reference to the signature opener station, lies in the provision of manually operable means adapted to render selected opener mechanisms operative or inoperative, whereby the desired position of the opening or openings in the signature may be readily preselected on either or both sides of the center fold thereof.

Another object, with reference to this station, lies in the provision of means whereby individual sheets of the signature may be engaged successively and deflected away from the remainder of the signature to effect a progressive inward movement of the opening to the desired position between preselected pages of the signature.

Another object with reference to this station lies in the provision of fluid pressure means adapted to project a jet of air onto the leading edge of the signature to facilitate the operation of signature opener mechanisms.

A further object lies in the provision of new and improved method and means for the insetting of a sheet into the open signature during its passage through the sheet feed station or stations.

A further object resides in the provision of new and improved method and means for effecting the removal of individual sheets from a stack on the sheet feed station and their transfer and delivery into the open signature.

Another object with reference to this station lies in the provision of means for elevating the supply stack of sheets or color forms to compensate for those removed in the process of the insetting operation.

Another object with reference to this station lies in the provision of fluid pressure means for projecting a jet of air against the forward edge of the sheet supply stack to introduce air between the uppermost sheets to separate them and thereby facilitate the operation of the sheet removal means.

Another object with reference to this station lies in the provision of vacuum means for transferring the uppermost sheet from the stack to a delivery table and means for effecting the advance of the sheet toward and into the opened signature.

A further object resides in the provision of a new and improved method and means for gauging individual filled signatures to determine the accuracy of the signature opening and sheet insetting operations.

Another object with reference to the signature gauging station resides in the provision of a pair of signature contacting elements mounted on a plate adapted to be reciprocated toward and from a signature disposed adjacent it.

A more detailed object lies in the provision of a pair of longitudinally movable signature contacting elements on a movable plate, one of said elements being laterally fixed while the other is laterally adjustable.

A further detailed object of the gauging mechanism resides in the provision of a floating equalizing bar retained in contact with the outer extremity of each of the pair of signature contacting elements.

A further detailed object lies in the provision of a feeler mechanism adapted to be introduced between a fixed abutment and a portion of the floating equalizer bar.

A further detailed object lies in the provision of signature discharge mechanism, the operation of which is controlled by the equalizer bar and feeler mechanism whereby discrimination between correctly and incorrectly filled signatures is detected and the result is transmitted by mechanical means to effect the discharge of said filled gauged signatures into segregated groups of correctly and incorrectly filled signatures.

A further object resides in the provision of new and improved method and means for discharging a filled gauged signature from the machine.

Another object with reference to the signature discharge station dies in the provision of caliper control means for segregating incorrectly from correctly filled signatures.

Another object with reference to this station lies in the provision of new and improved means for transmitting motion to and controlling the motion of the signature discharging mechanism whereby the segregation of improperly from properly filled signatures is automatically effected.

A further object of the present invention lies in the provision of automatic fluid pressure means for controlling the operation of mechanisms in the several stations of the machine by means of the signature upon which the operations are to be accomplished.

Another object with reference to the automatic control means for the machine lies in the provision of a new and improved signature actuated fluid pressure mechanism for controlling the operation of mechanical throw-out of the driving clutch to stop the machine.

Another object with reference to the automatic control mechanism lies in the provision of new and improved means whereby the machine may be stopped promptly within one-sixteenth of a complete cycle of a machine operation.

Another object with reference to the automatic control mechanism lies in the provision of signature actuated fluid pressure means adapted to control either or both of the sheet feed mechanisms whereby the absence of an opened signature will render the sheet feed mechanism inoperative so that a sheet will not be fed into an on-coming signature which has not been opened to receive the same.

Another object resides in the provision of automatically actuated control means for effecting prompt interruption of the operation of the entire machine upon failure of a proper supply of stock either in the form of signatures or inset sheets.

A further object of the invention resides in the provision of new and improved means for accelerating, retarding, or interrupting the advance of a signature along its path of travel through the machine.

A further object resides in the provision of new and improved means for effecting the synchronized operation of the several stations of the machine, whereby successive operations on the signature are effected in synchronism with the advance of the signature.

Other objects and advantages will become manifest from the following description of an illustrative embodiment of the present invention shown in the accompanying drawings.

The invention resides in the novel method of handling the signature, elements which effect the signature movement through the machine, and the features of construction and arrangement and operation of parts in cooperative relationship which combine to produce a unitary structure capable of removing individual signatures from a supply stack on the signature feed station, transmitting them to a movable conveyor, opening the signature between preselected pages on either or both sides of the moving signature, inserting one or more color forms into the opening or openings formed in the signature, transmitting the filled signature to a calipering or gauging station wherein, the filled signature is calipered to determine the correctness of the preceding operations, and transmitting the gauged filled signature to the discharge station from which it is ejected under caliper controlled mechanism into segregated groups of accepted, properly filled signatures, or rejected, improperly filled signatures.

In the drawings:

Fig. 6 is an operator's side elevational view of the signature feed and opener stations;

Fig. 22 is a vertical transverse sectional view through the signature opener station taken on the line 22—22 of Fig. 3, showing a signature in the process of being opened;

Fig. 23 is a horizontal sectional view of a portion of the opener drive mechanism taken on the line 23—23 of Fig. 22;

Fig. 24 is a vertical sectional view on the line 24—24 of Fig. 22 showing the structural details of a portion of the opener drive mechanism;

Fig. 25 is a horizontal sectional view on the line 25—25 of Fig. 22, showing a spring urged link in an auxiliary signature drive mechanism;

Fig. 26 is a vertical sectional detail view taken on line 26—26 of Fig. 6, showing a cam actuated valve mechanism operative to control the flow of air to the blower bars located in the signature opener station;

Figure 1:
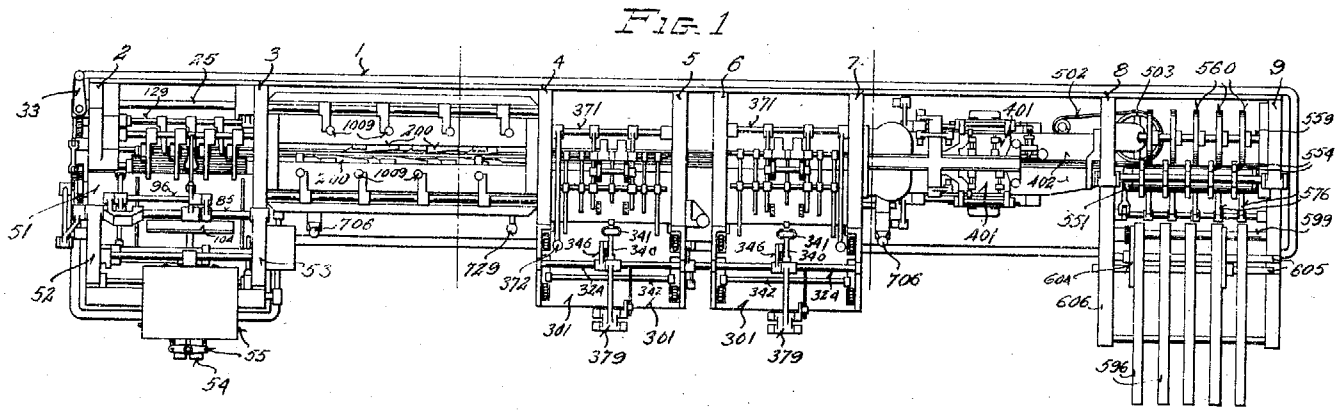
Figure 1 is a top plan view of a signature handling machine constructed in accordance with the teachings of the present invention.
Figure 2:
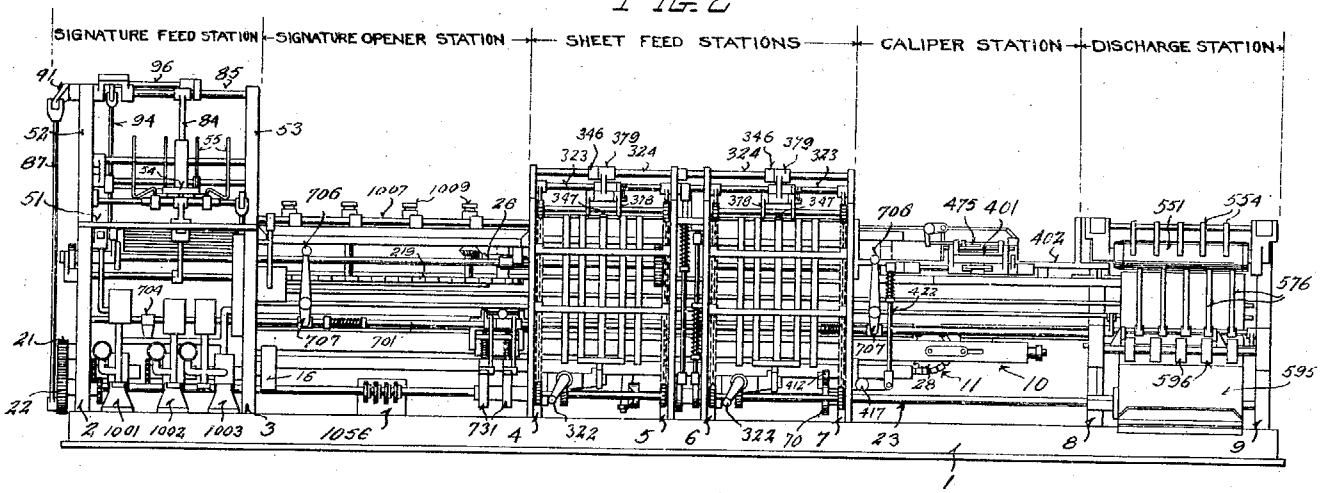
Fig. 2 is an operator's side elevational view of the entire machine.
Figure 3:
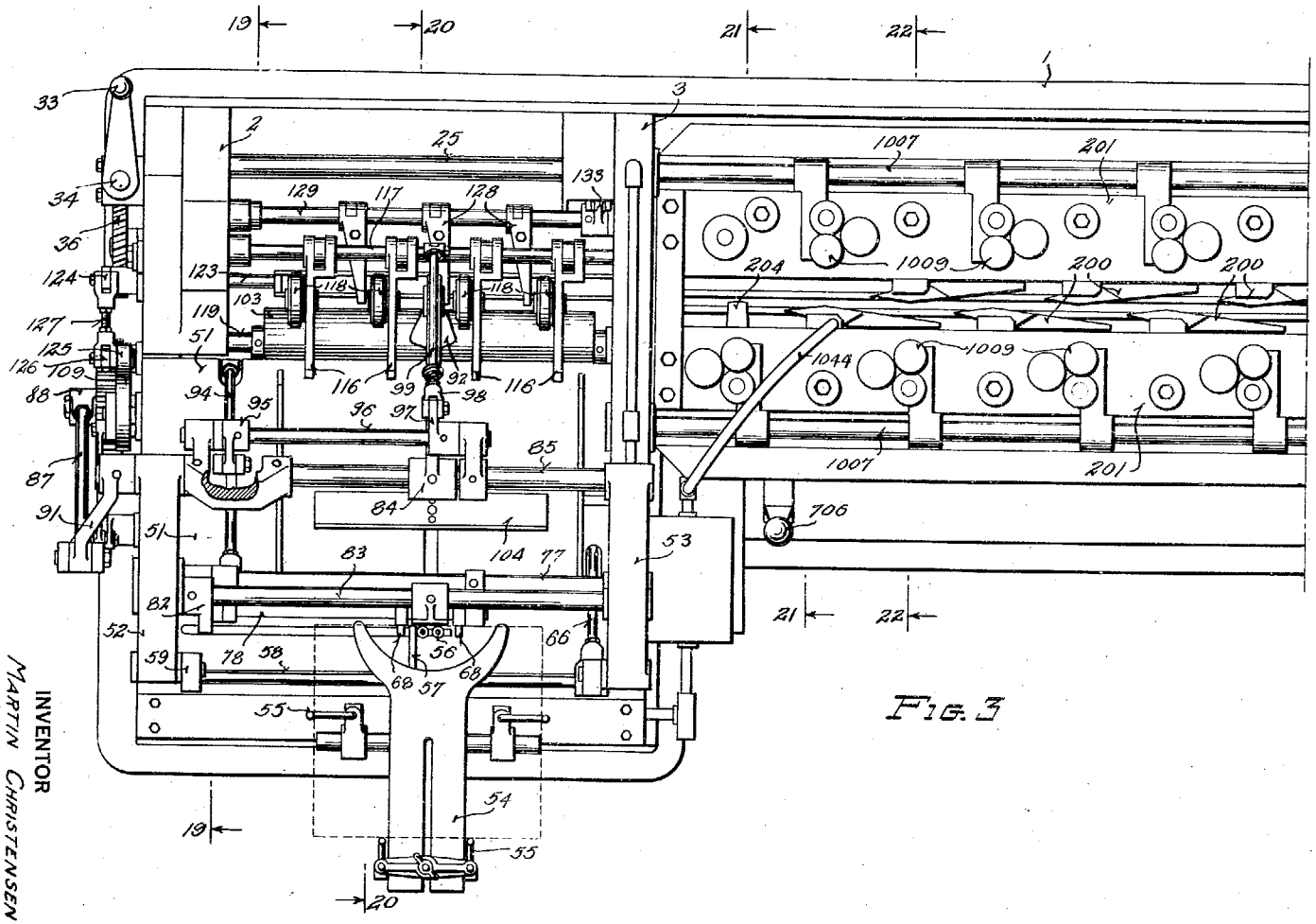
Fig. 3 is a top plan view of the signature feed and opener stations of the machine.
Figure 4:
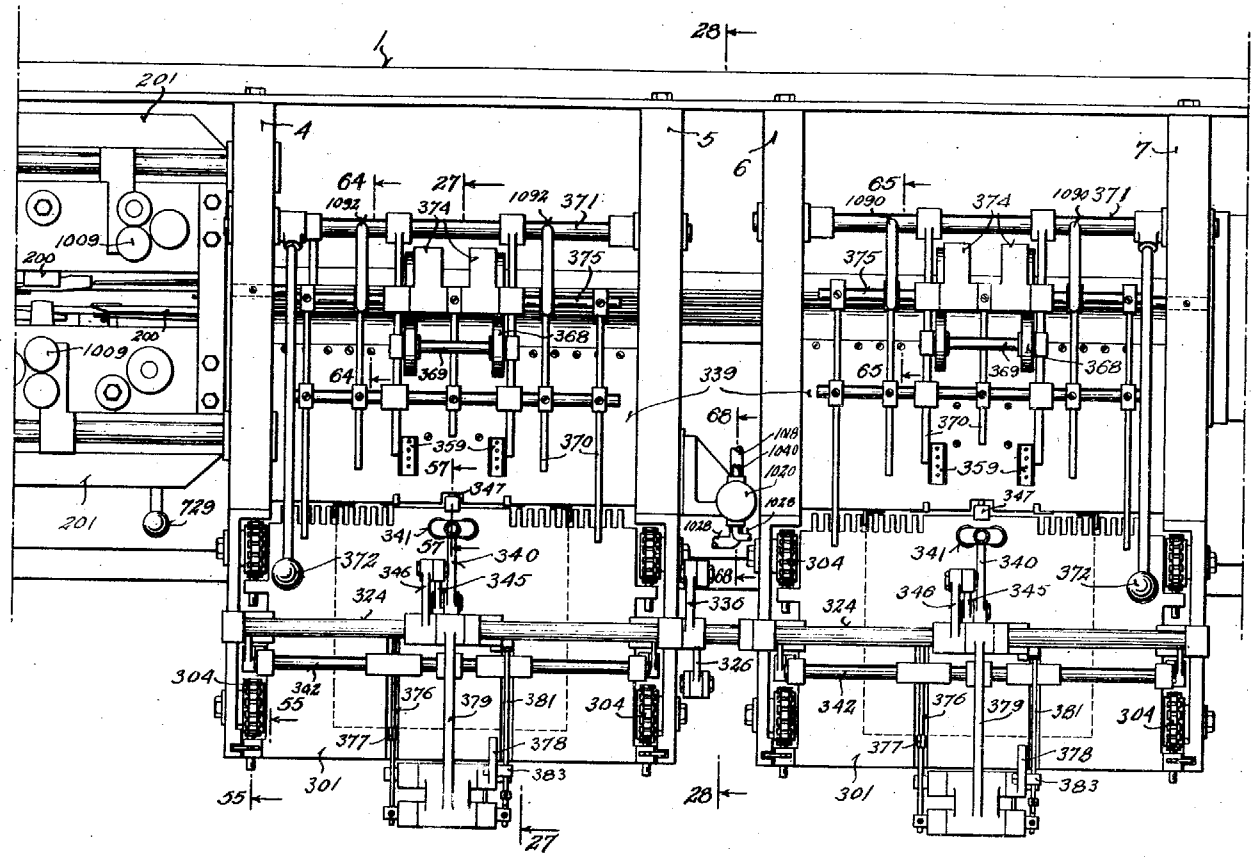
Fig. 4 is a top plan view of the sheet feed stations.
Figure 5:
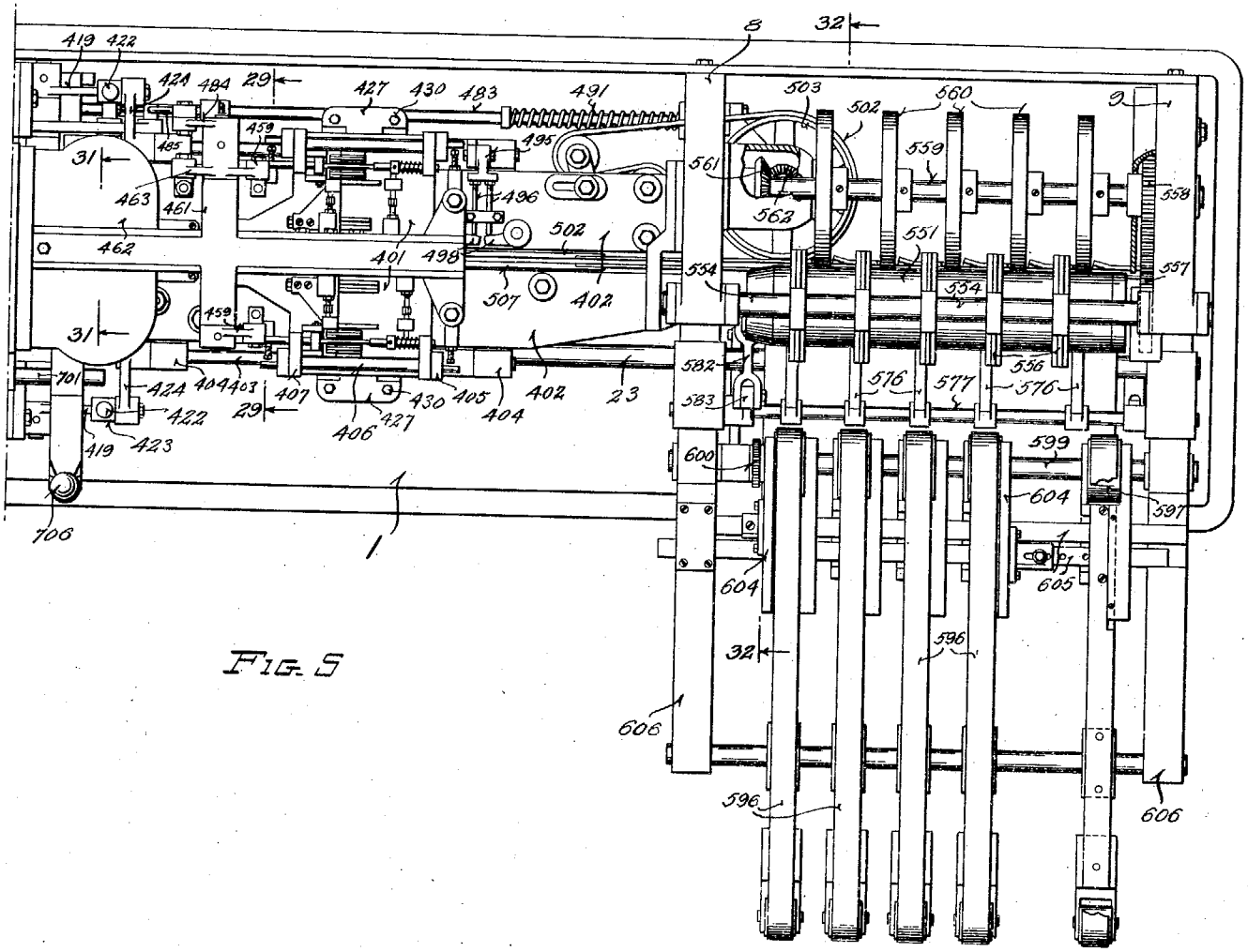
Fig. 5 is a top plan view of the gauging or calipering and the discharge stations.
Figure 5:
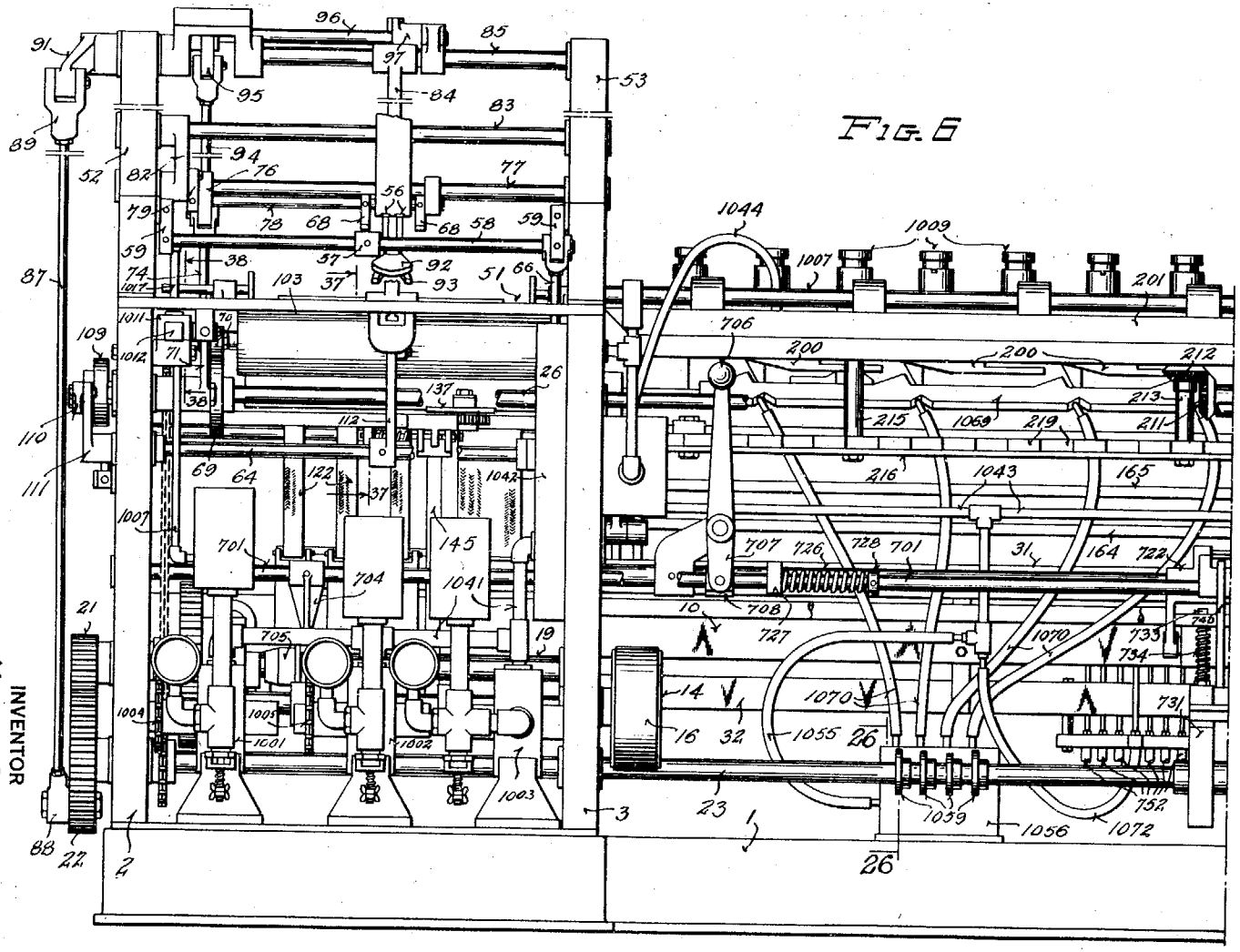
Figure 7:
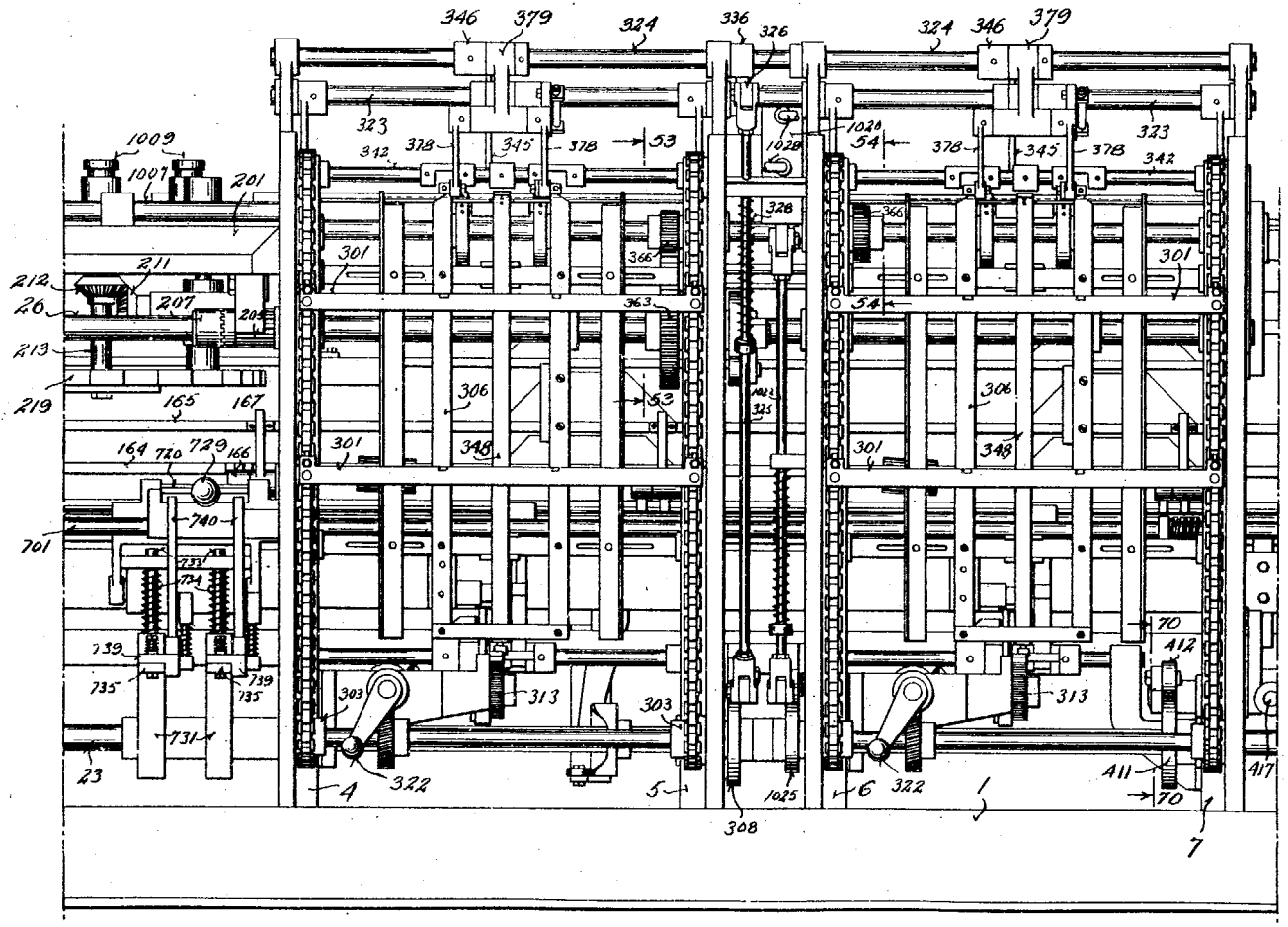
Fig. 7 is an operator's side elevational view of the sheet feed stations.
Figure 8:
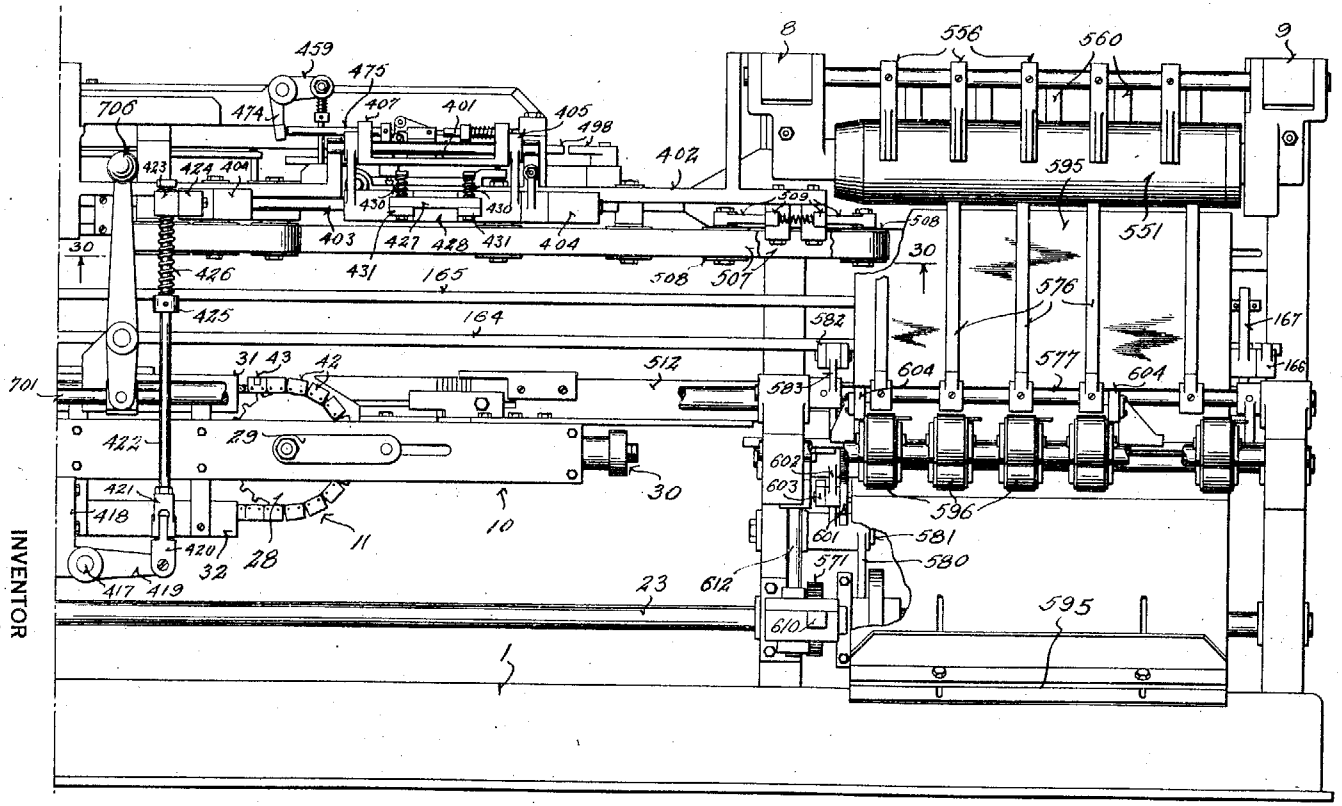
Fig. 8 is an operator's side elevational view of the gauging and discharge stations.
Figure 9:
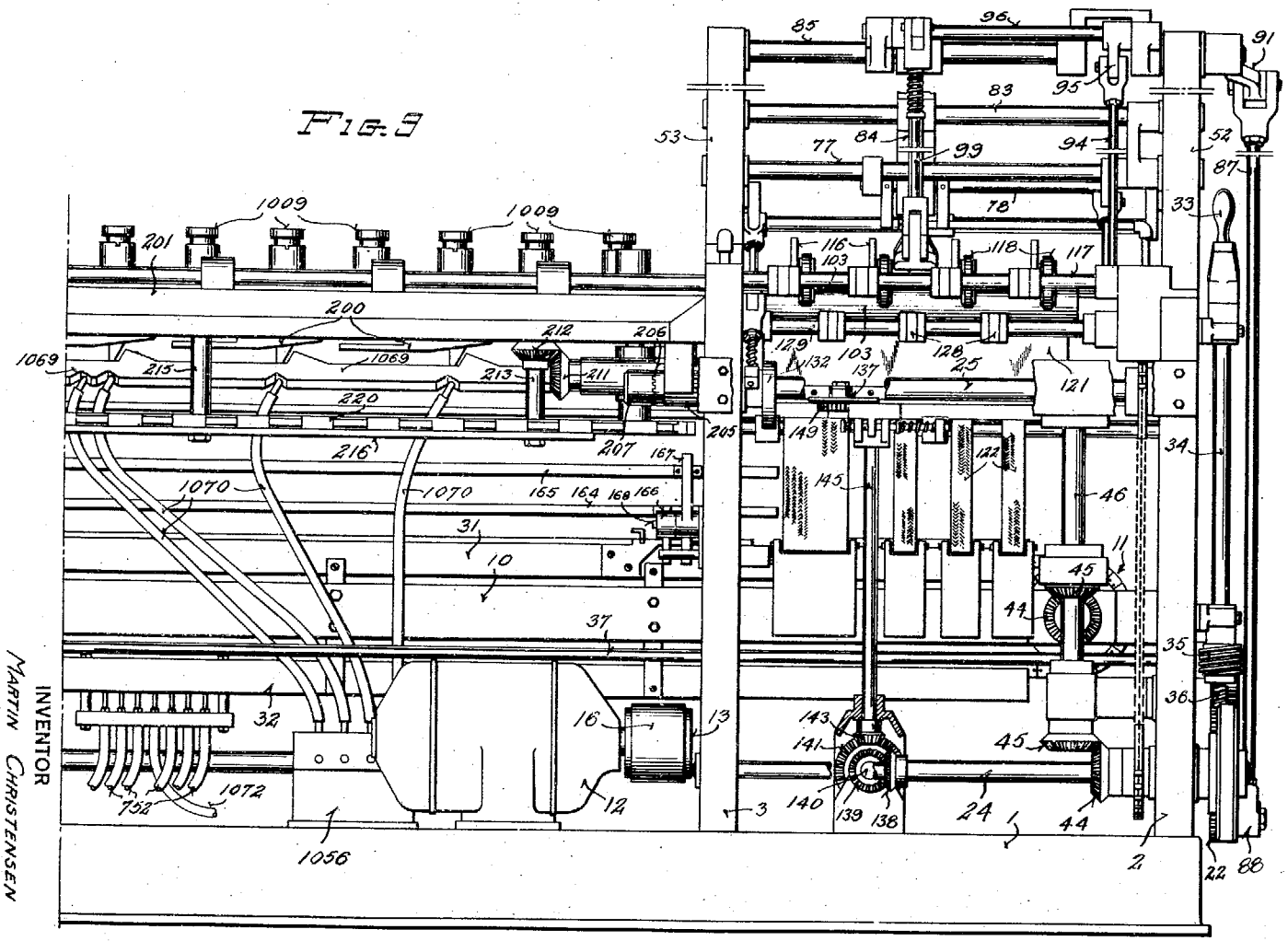
Fig. 9 is a far side elevational view of the signature feed and opener stations.
Figure 10:
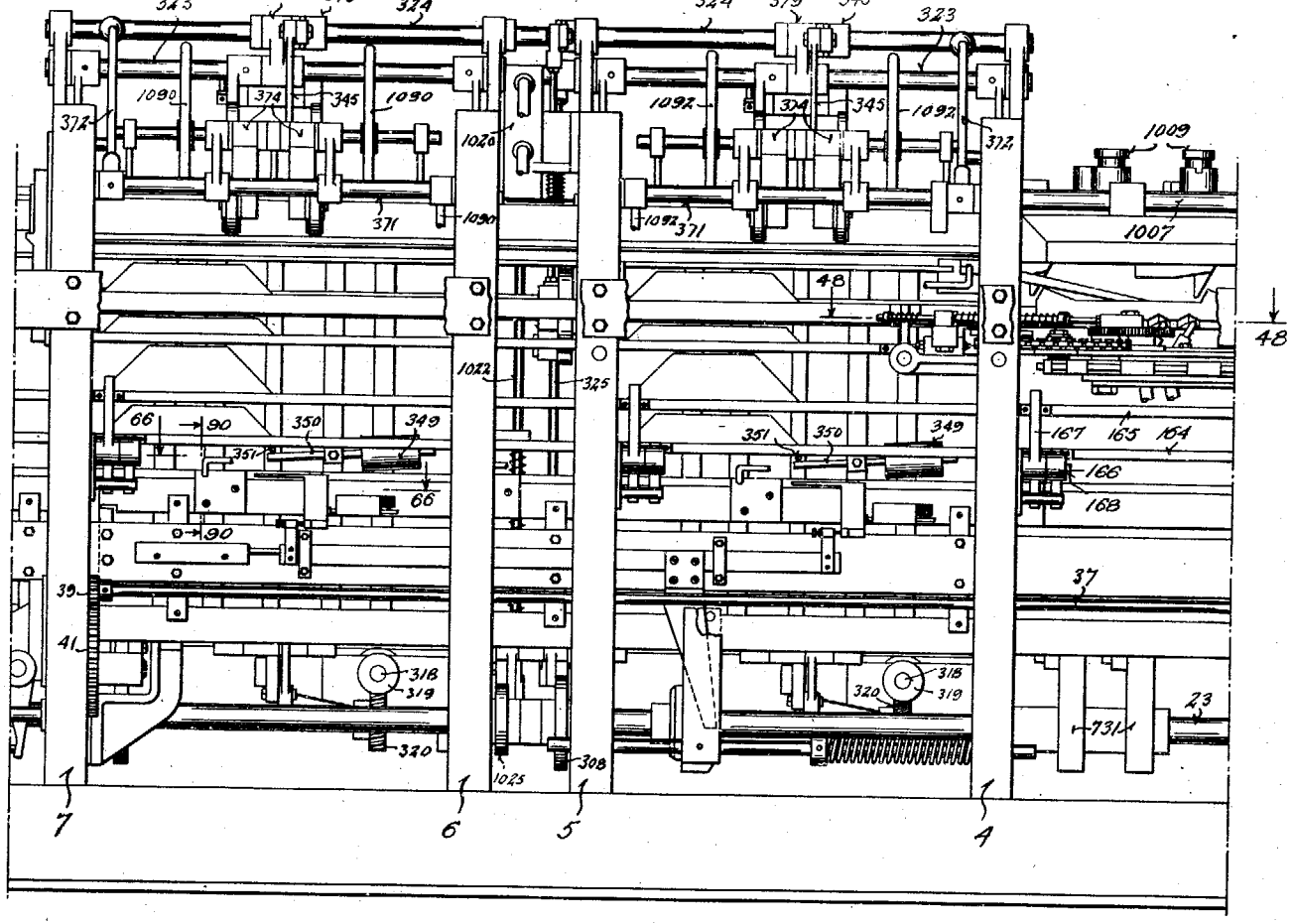
Fig. 10 is a far side elevational view of the sheet feed stations.
Figure 11:
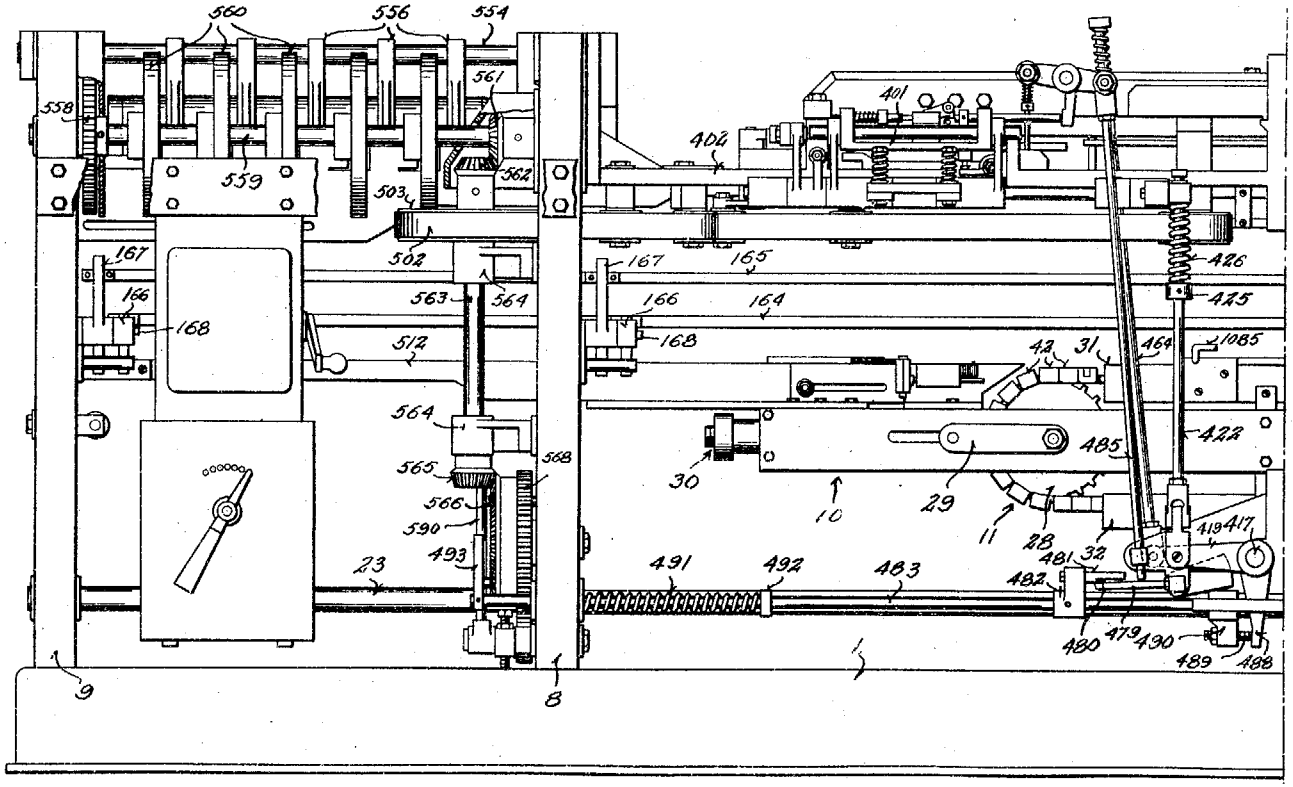
Fig. 11 is a far side elevational view of the gauging and discharge stations.
Figure 12:
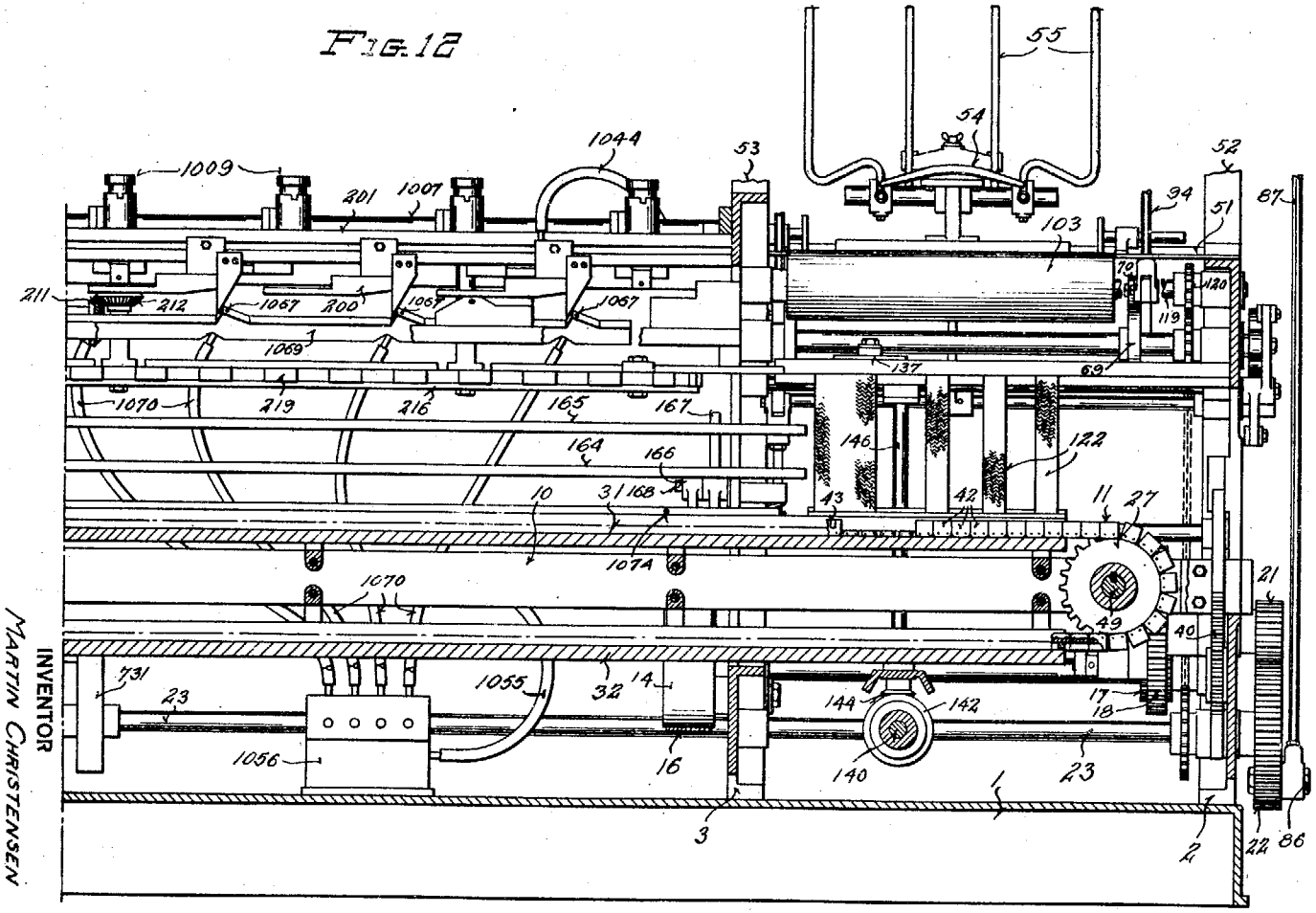
Fig. 12 is a longitudinal vertical sectional view through the signature conveyor in the signature feed and opener stations looking toward the operator's side of the machine.
Figure 13:
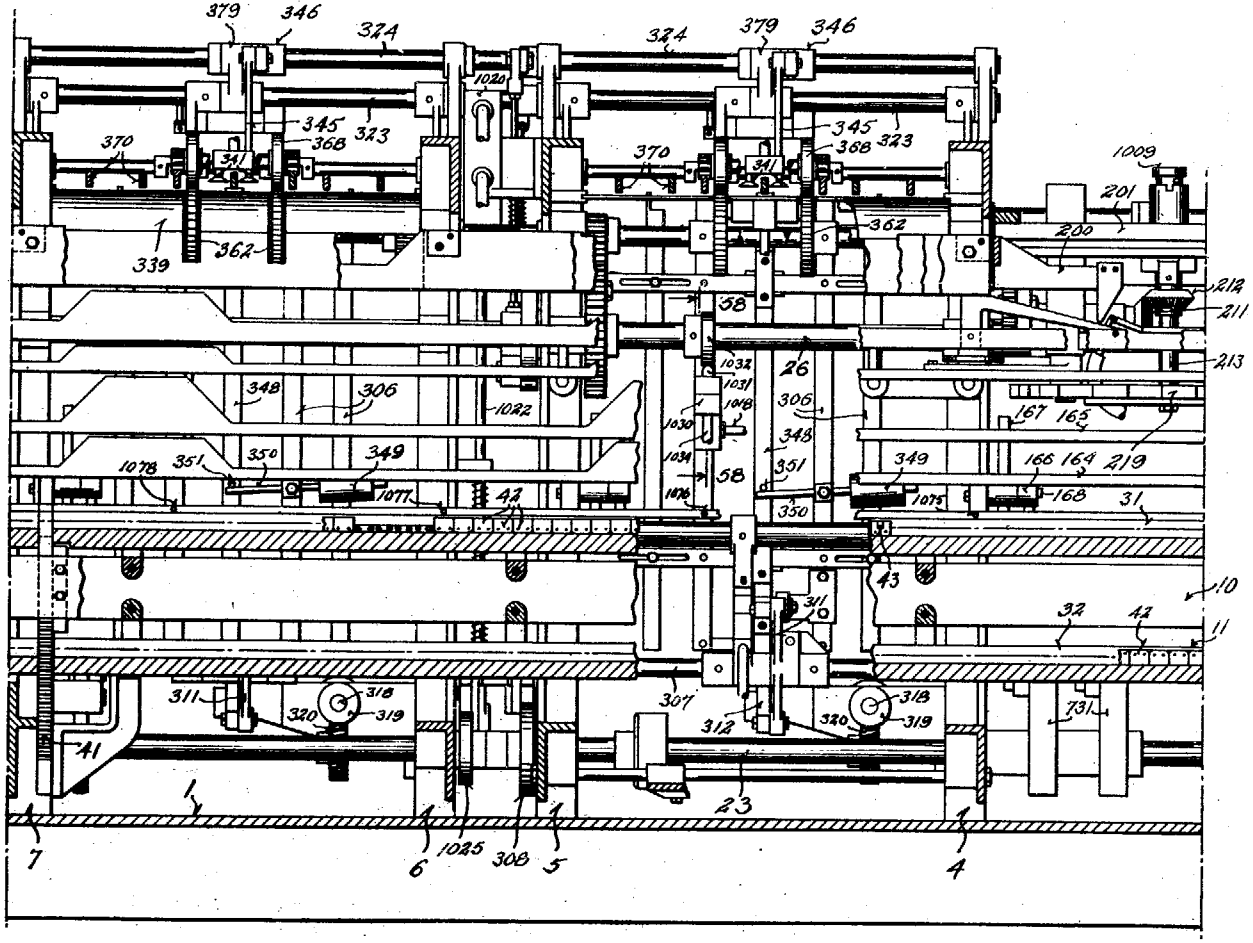
Fig. 13 is a longitudinal vertical sectional view through the signature conveyor in the sheet feed stations looking toward the operator's side of the machine.
Figure 14:
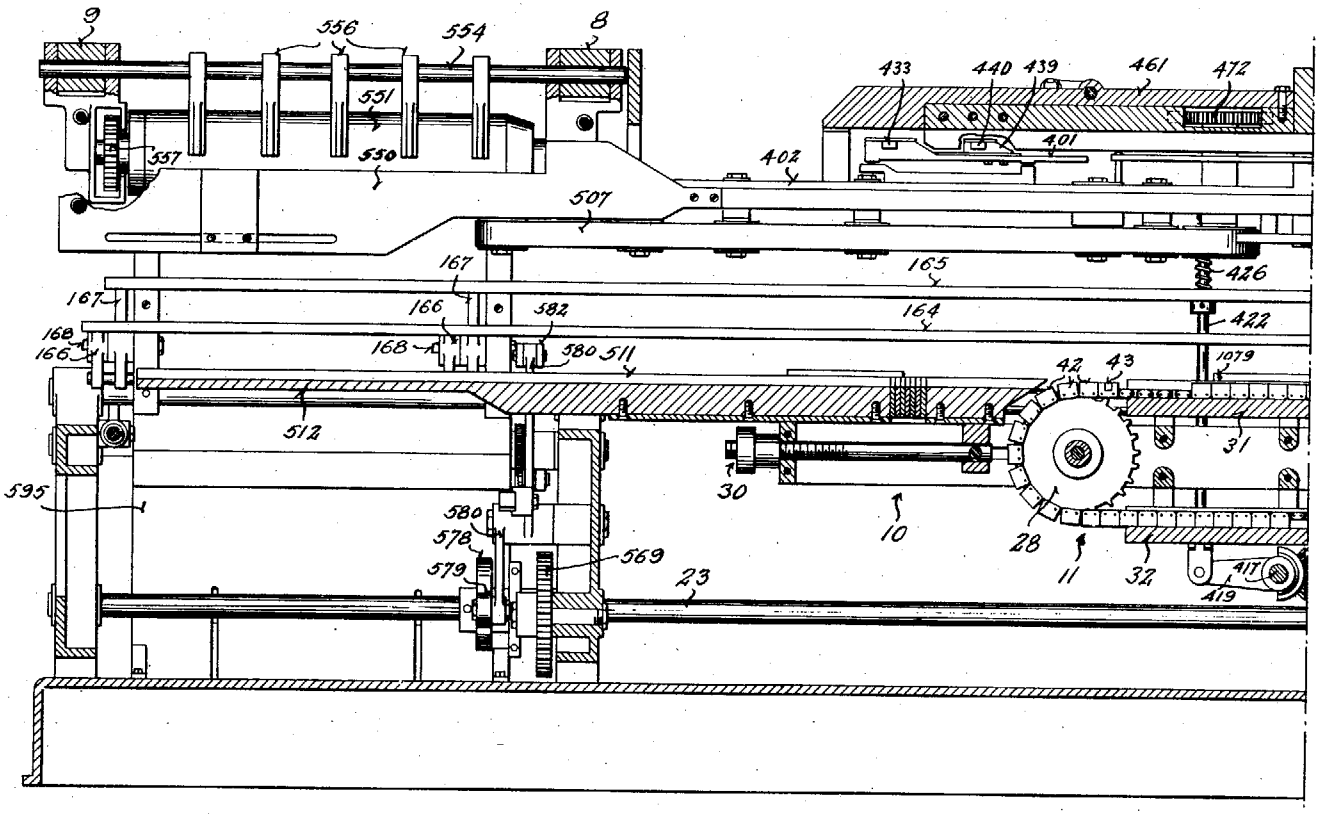
Fig. 14 is a longitudinal vertical sectional view through the signature conveyor in the gauging and discharge stations looking toward the operator's side of the machine.
Figure 15:
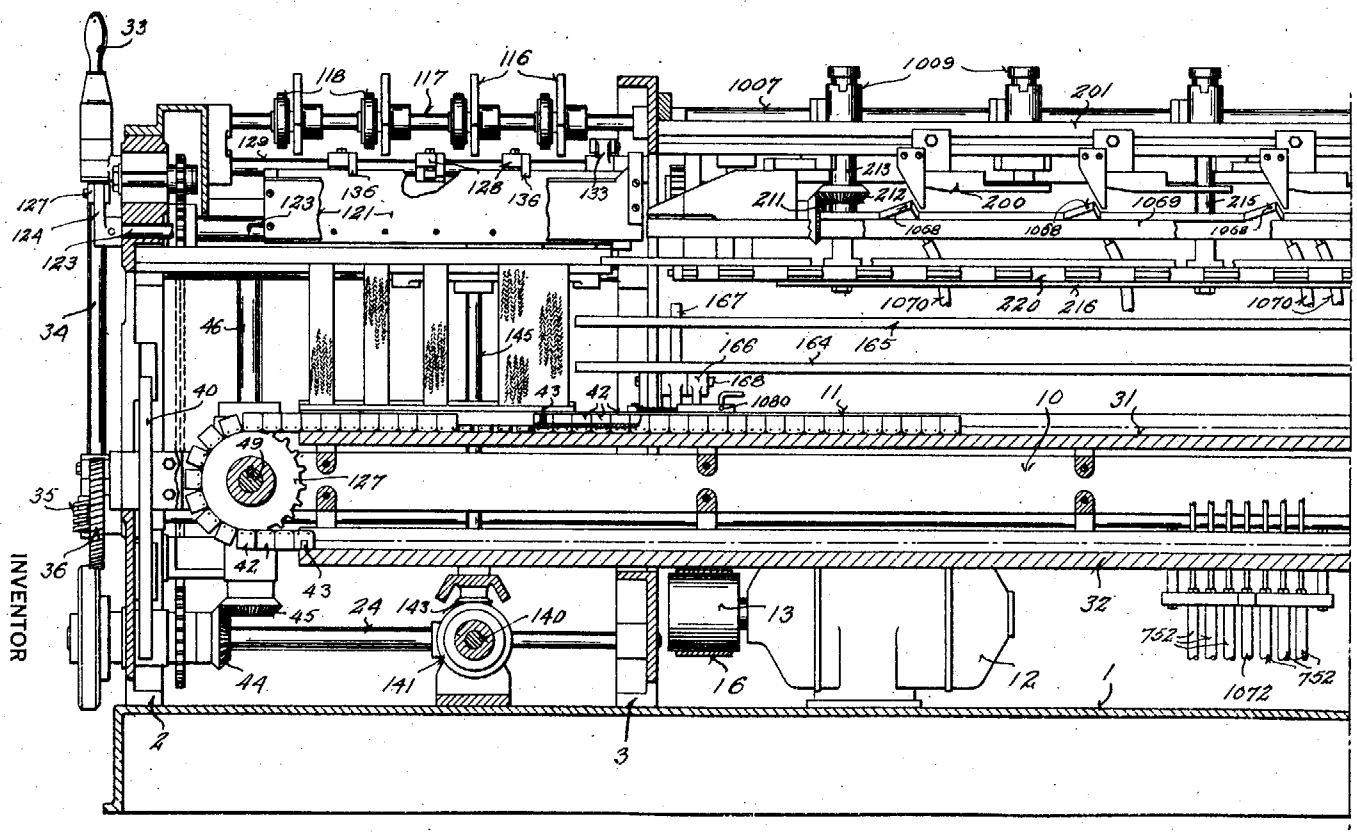
Fig. 15 is a longitudinal vertical sectional view through the signature conveyor in the signature feed and opener stations looking toward the far side of the machine.
Figure 16:
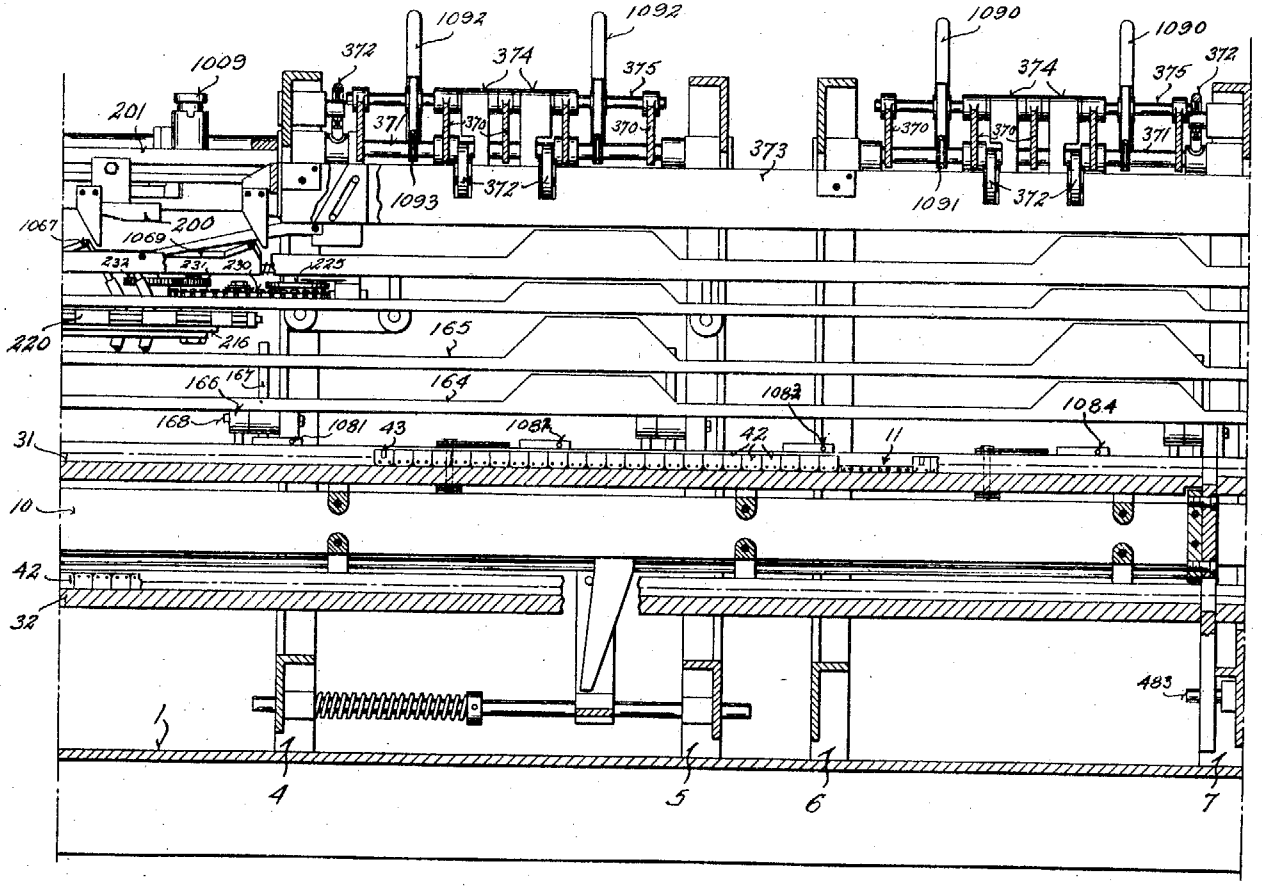
Fig. 16 is a longitudinal vertical sectional view through the conveyor in the sheet feed stations looking toward the far side of the machine.
Figure 17:
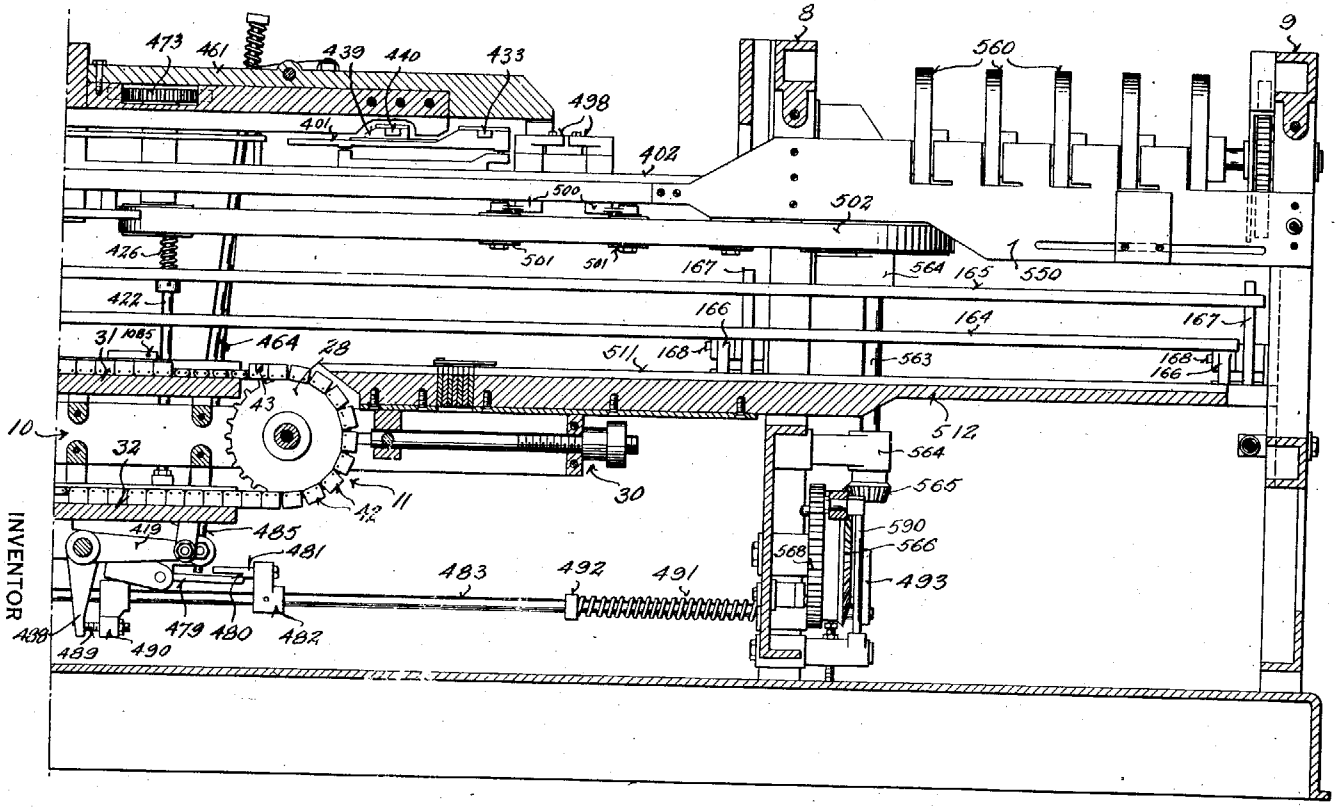
Fig. 17 is a longitudinal vertical sectional view through the conveyor in the caliper and discharge stations looking toward the far side of the machine.

The embodiment of the machine chosen for illustrative purposes in the accompanying drawings discloses a signature handling machine constructed in accordance with the teachings of the present invention.

The signature handling machine comprises a unitary structure including a plurality of individual stations at or in which separate operations are performed on a signature.

The collective effect of the several individual operations on the signature results in the provision of a signature handling machine which is capable of removing individual signatures from a stack or pile on the signature feed station; delivering them in spaced relationship onto a moving conveyor; advancing the signatures through a signature opener station to effect desired opening thereof; advancing the open signatures through one or more sheet feeding stations wherein individual sheets or color forms are removed from a stack or pile in timed relationship with the advance of the signature and delivered into the open signature as it passes through the sheet feed station; advancing the filled signature into the gauging station, wherein the filled signature is acted upon by gauging mechanism to determine the accuracy of the opening and insetting operations; and then advancing the signature into the discharge station from which it is ejected under control of the gauging mechanism to segregate the improperly filled signatures from those which are properly filled.

The signature feed station comprises a section of the machine on which a stack or pile of signatures is supported and contains mechanism, to be hereinafter described, for withdrawing individual signatures from the stack, transferring them to a feed table, advancing them on the table and depositing them in upright closed position in spaced relationship on a moving conveyor.

The signature opener station comprises a section of the machine, adjacent the signature feed station, into which signatures advance with the movement of the conveyor. The signature opener station includes mechanism, to be hereinafter more fully described, disposed adjacent the path of signature travel. This mechanism is adapted to be manually adjusted to effect the displacement of any predetermined number of sheets from either or both sides of the signature to form one or more openings in the signature at or between preselected pages.

The sheet feed station or stations, two of which are shown in the accompanying drawings, comprise a section of the machine, adjacent the signature opener station, into which the opened signatures are advanced by the moving conveyor. The sheet feed station includes a support for a stack or pile of sheets or color forms, and mechanism, to be hereinafter more fully described, for withdrawing individual sheets from the stack, transferring them to a feed table, advancing them on the table, and depositing each sheet into an opening formed in the signature.

The gauging station comprises a section of the machine, adjacent the sheet feed station, into which the filled signatures are advanced by the moving conveyor. The gauging station includes mechanism, to be hereinafter more specifically described, disposed adjacent the path of travel of the filled signature. The advance of the filled signature is interrupted momentarily, and the gauging mechanism is actuated to contact the signature to determine the proportional part lying outwardly of a fixed abutment with respect to the total thickness of the filled signature. By means of this gauging operation, it is possible to determine accurately the correctness of the position of the opening in the signature and of the inset sheet in the filled signature.

The signature discharge station comprises a section of the machine, adjacent the gauging station, into which filled signatures are advanced from the gauging station under the intermittent action of an auxiliary conveyor. The signature discharge mechanism, to be hereinafter more specifically described, engages the filled signature to raise it from its support and discharge it from the machine under automatic control of the gauging mechanism which includes mechanism adapted to effect the segregation of incorrectly filled signatures from those which are correctly filled.

GENERAL MACHINE STRUCTURE

The machine comprises a bed or base 1 upon which a plurality of longitudinally spaced parallelly disposed upright frame members 2, 3, 4, 5, 6, 7, 8 and 9 are anchored. These spaced frame members serve to support the various mechanisms which form the composite machine. The signature feed station includes mechanism lying between or supported by the frames 2 and 3. The signature opener mechanism comprises the mechanism lying between frames 3 and 4. The sheet feed stations lie between frames 4 and 5; and 6 and 7. The signature gauging station lies between frames 7 and 8. The signature discharge station lies between frames 8 and 9.

A conveyor frame 10, carrying an endless chain signature conveyor 11, extends through the several stations of the machine and is mounted for vertical adjustment with respect to the stationary upright frames 2 to 9 inclusive, to facilitate the setting up of the machine to accommodate signatures of various widths.

GENERAL TRANSMISSION

Figure 91:
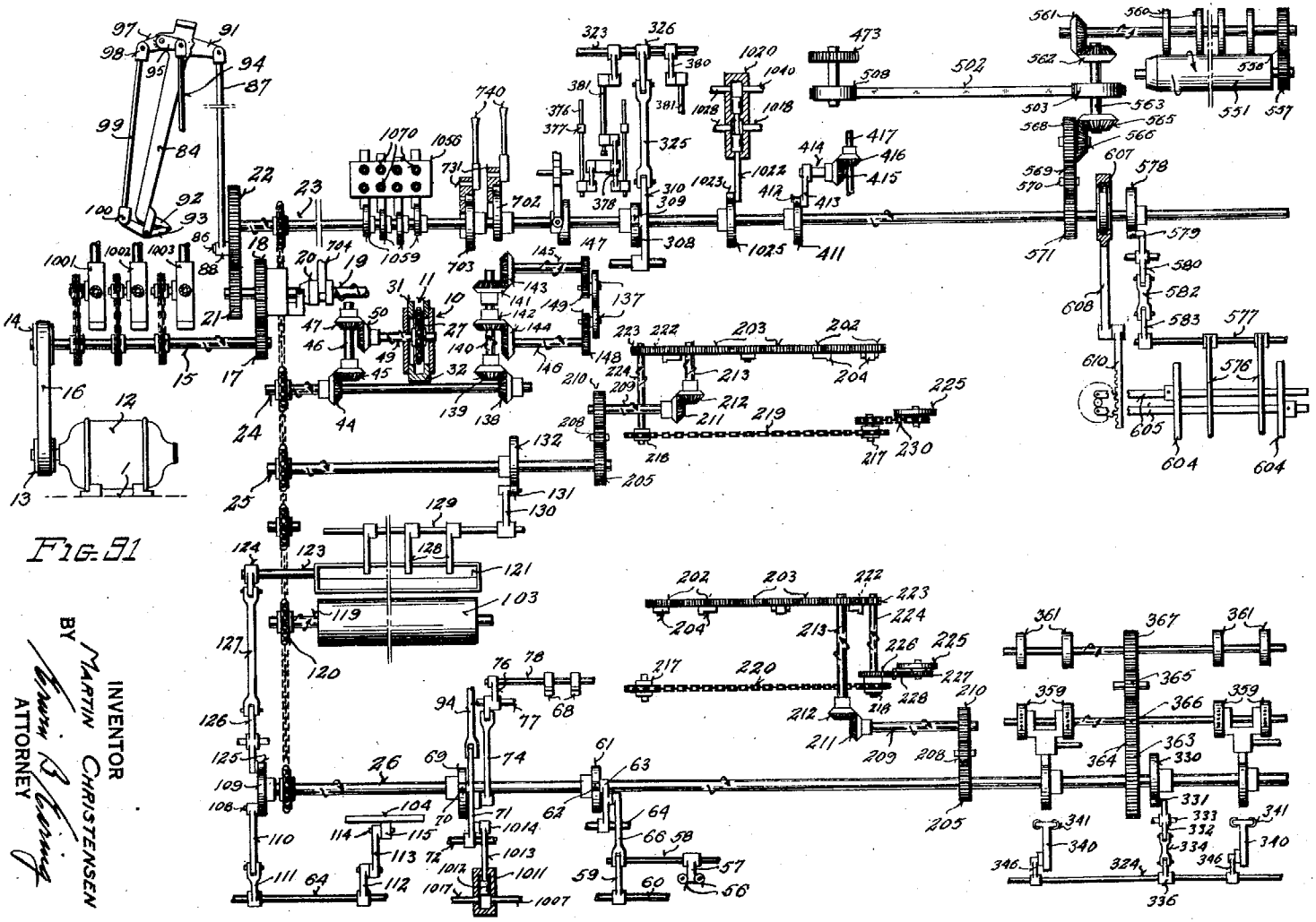
Fig. 91 is a schematic diagram of the mechanical transmission of the entire machine.

The general transmission for the machine (see Fig. 91) comprises an electric motor 12, mounted on the base 1 in the signature opener station, provided on its shaft with a pulley 13 which drives a pulley 14 on a power take-off shaft 15 through a belt 16. A spur gear 17 on shaft 15 meshes with a spur gear 18 to drive a clutch shaft 19 through a manually operable clutch 20. A spur gear 21 on shaft 19 meshes with a spur gear 22 on a power take-off shaft 23. Additional power take-off shafts 24, 25 and 26 are driven in the same direction and at the same speed of shaft 23 through chain and sprocket connection therewith. The several power take-off shafts are disposed longitudinally of the machine and are journalled in the upright frame members thereof. Shaft 15 is provided with means for driving a plurality of vacuum and pressure pumps to be hereinafter more specifically mentioned. Shafts 23, 24, 25 and 26 are provided with crank, cam, and gear means for effecting the operating movement of various mechanisms located in the several stations of the machine.

Power take-off shaft 23 extends the full length of the machine and is provided with separate means for effecting the operating movement of the following mechanisms; the signature picker arm, the several valve plungers controlling the air pressure to the signature opener station, the pneumatically controlled automatic mechanical de-clutching mechanism, the mechanical drag mechanism for maintaining the signature in proper position on the conveyor, the sheet feed joggers in the sheet feed stations, the valve plunger for controlling the vacuum to the sheet delivery devices, the caliper mechanism, an auxiliary belt conveyor for the signature drive, the signature gripping discharge mechanism, the signature jogger on the discharge table and the signature discharge fly.

Power take-off shaft 24 is provided with means for driving the main signature conveyor and also for driving the signature accelerating means.

Power take-off shaft 25 is provided with means for effecting movement of signature engaging fingers disposed in a chute in the signature feed station, means for driving one bank of signature opener mechanisms, one side of an auxiliary signature conveyor and also a signature reregistering mechanism.

Power take-off shaft 26 is provided with means for effecting movement of the signature pusher plate on the feed table, signature delivery chute, signature gripper jaw, signature separator foot, vacuum signature picker arm, valve means for establishing vacuum to signature engaging vacuum cups on said picker arm, the other bank of signature opener mechanisms, the other side of the auxiliary signature conveyor, the other side of the signature reregister mechanism, valve means for controlling vacuum to the sheet feed rollers in the first sheet feed station, sheet feeding means, vacuum sheet picking devices on both sheet feed stations, and valve means for controlling vacuum to the sheet feed rollers in the second sheet feed station.

MAIN SIGNATURE CONVEYOR ASSEMBLY

Figure 18:
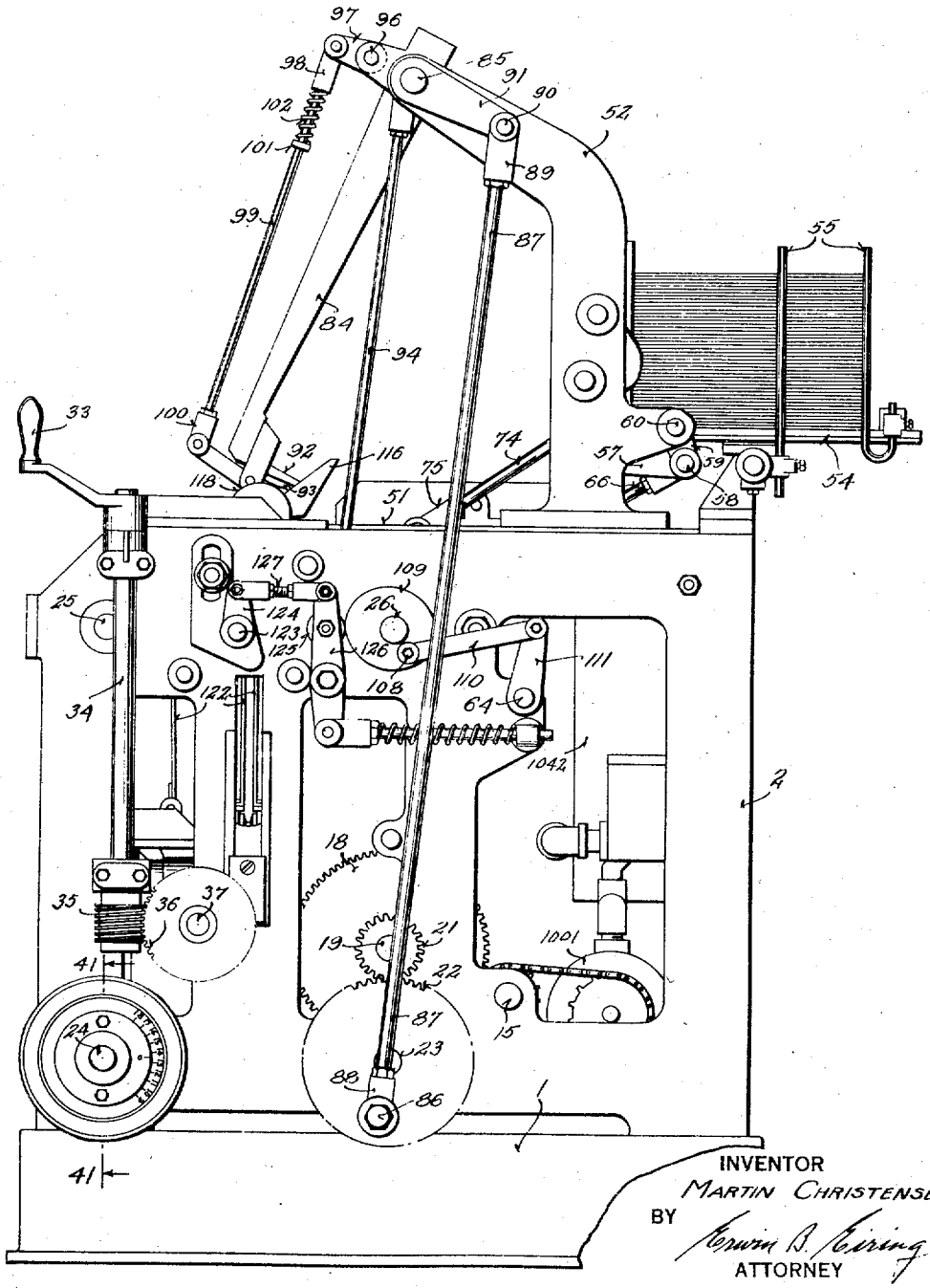
Fig. 18 is an elevational view of the signature feed end of the machine.
Figure 34:
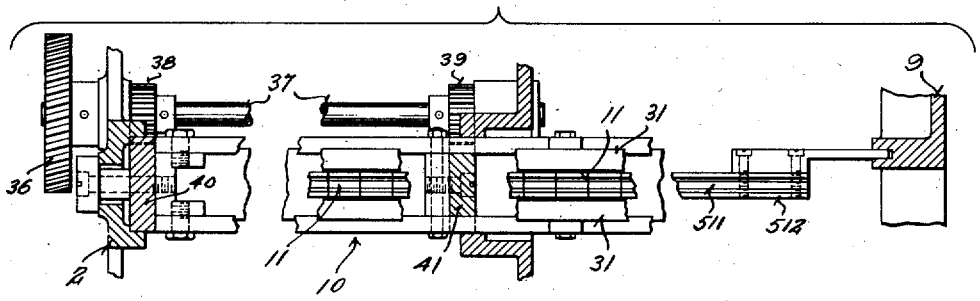
Fig. 34 is a horizontal longitudinal sectional view taken through portions of the main signature conveyor, showing conveyor guide and elevating mechanisms.
Figure 35:
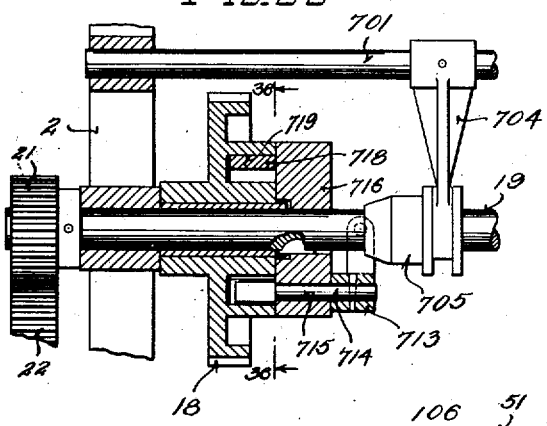
Fig. 35 is a vertical sectional view on the line 35—35 of Fig. 19 showing the clutch.
Figure 36:
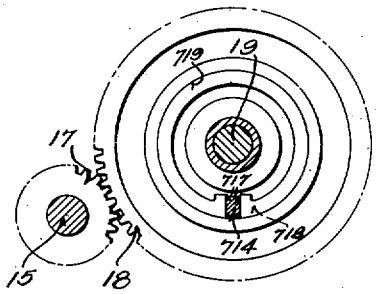
Fig. 36 is a vertical sectional view on the line 36—36 of Fig. 35 showing additional clutch structure.
Figure 37:
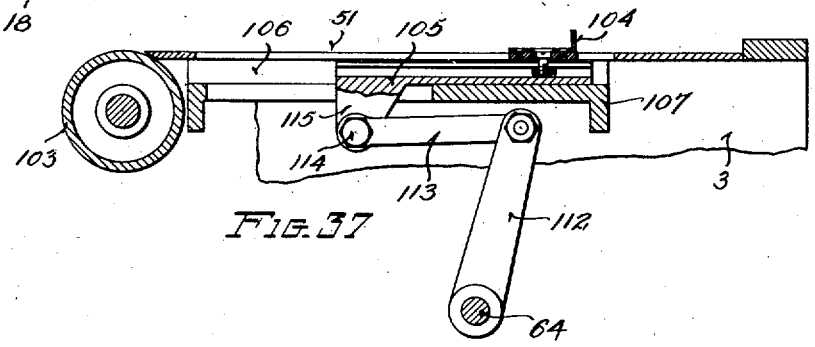
Fig. 37 is a vertical transverse sectional view on the line 37—37 of Fig. 6 showing the mechanism for advancing the signature from the feed table to the moving conveyor.
Figure 38:
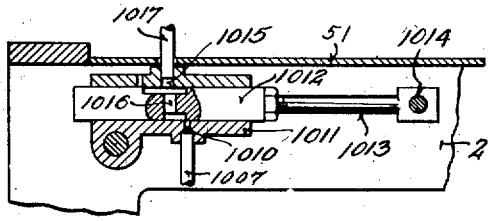
Fig. 38 is a vertical detail sectional view on the line 38—38 of Fig. 6 showing a valve structure and valve actuating mechanism adapted to control the operation of the vacuum signature picker elements in the signature feed station.
Figure 39:
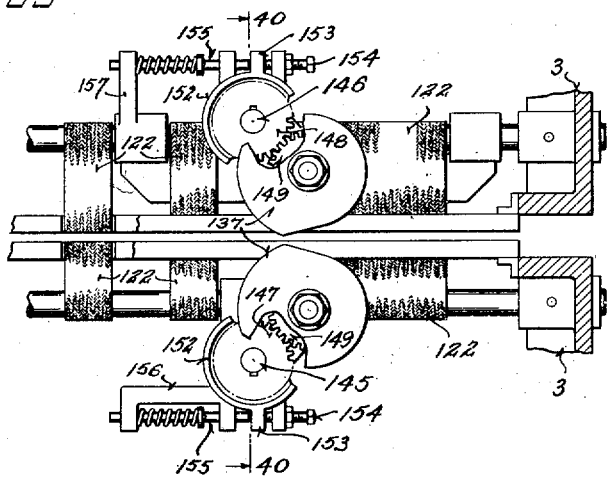
Fig. 39 is a horizontal sectional view taken on the line 39—39 of Fig. 20 showing a portion of the auxiliary signature drive mechanism located in the signature feed station.
Figure 40:
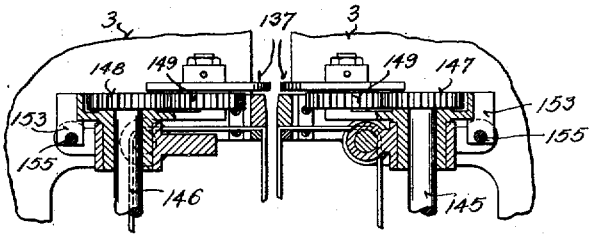
Fig. 40 is a vertical sectional view taken on the line 40—40 of Fig. 39 showing a portion of the drive mechanism for the auxiliary signature conveyor mechanism.
Figure 41:
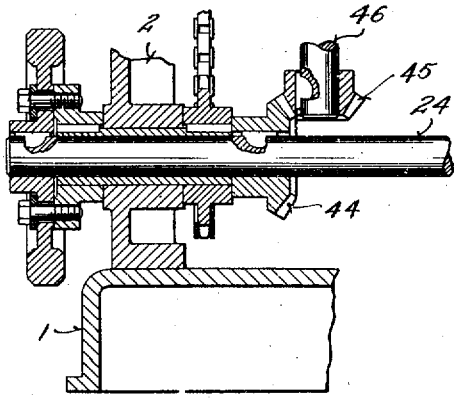
Fig. 41 is a vertical detail sectional view taken on line 41—41 of Fig. 18, showing means for adjustably advancing or retarding the signature conveyor with respect to the phase of operation of the signature feed station.
Figure 42:
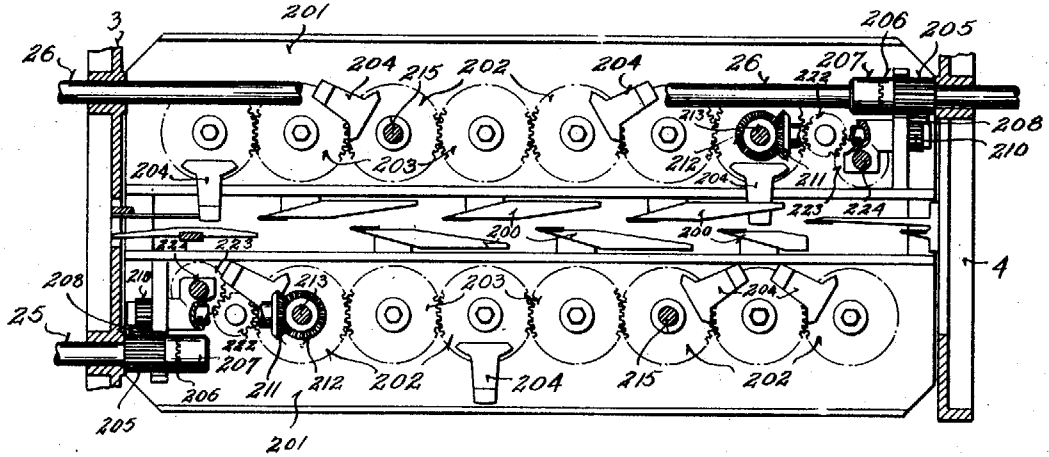
Fig. 42 is a horizontal sectional view of the signature opener mechanism looking upwardly from the line 42—42 of Fig. 22.
Figure 43:
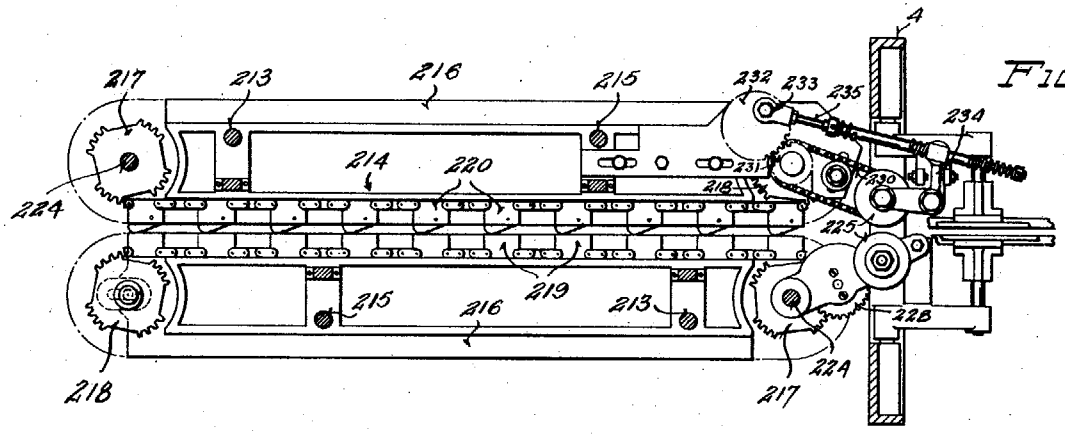
Fig. 43 is a horizontal sectional view showing the auxiliary signature drive mechanism located in the signature opener station and also showing the signature reregister mechanism looking downwardly from the line 43—43 of Fig. 22.
Figure 44:
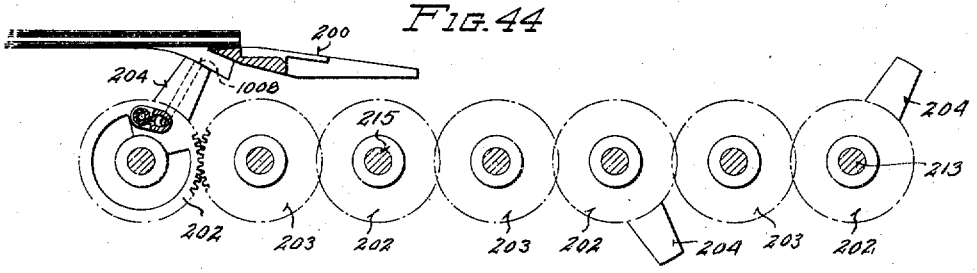
Figs. 44, 45, 46 and 47 show successive steps in the advance of a signature through the signature opener mechanism and indicate diagrammatically the operation of successive openers upon succeeding sheets on one side of the signature.
Figure 45:
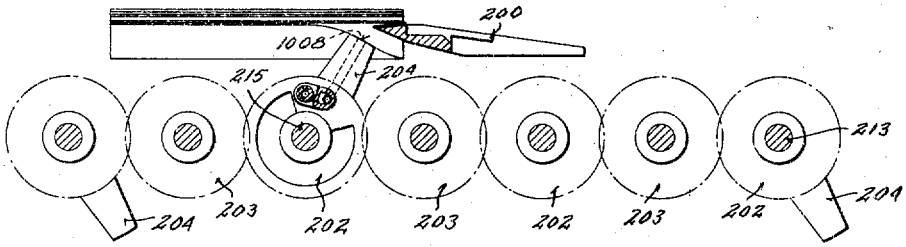
Figure 46:
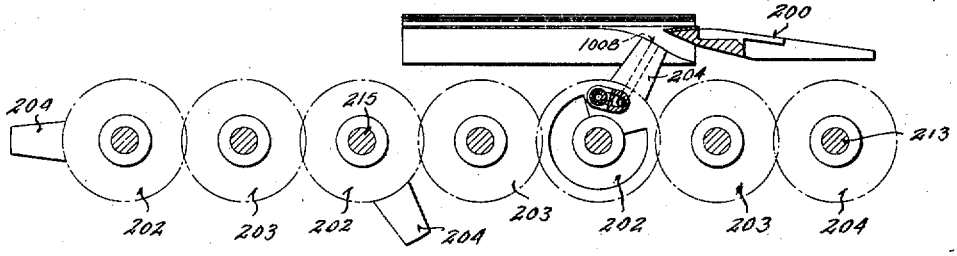
Figure 47:
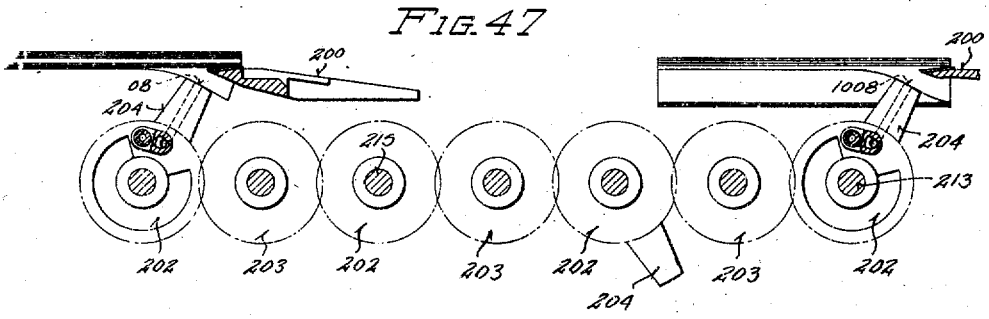
Figure 48:
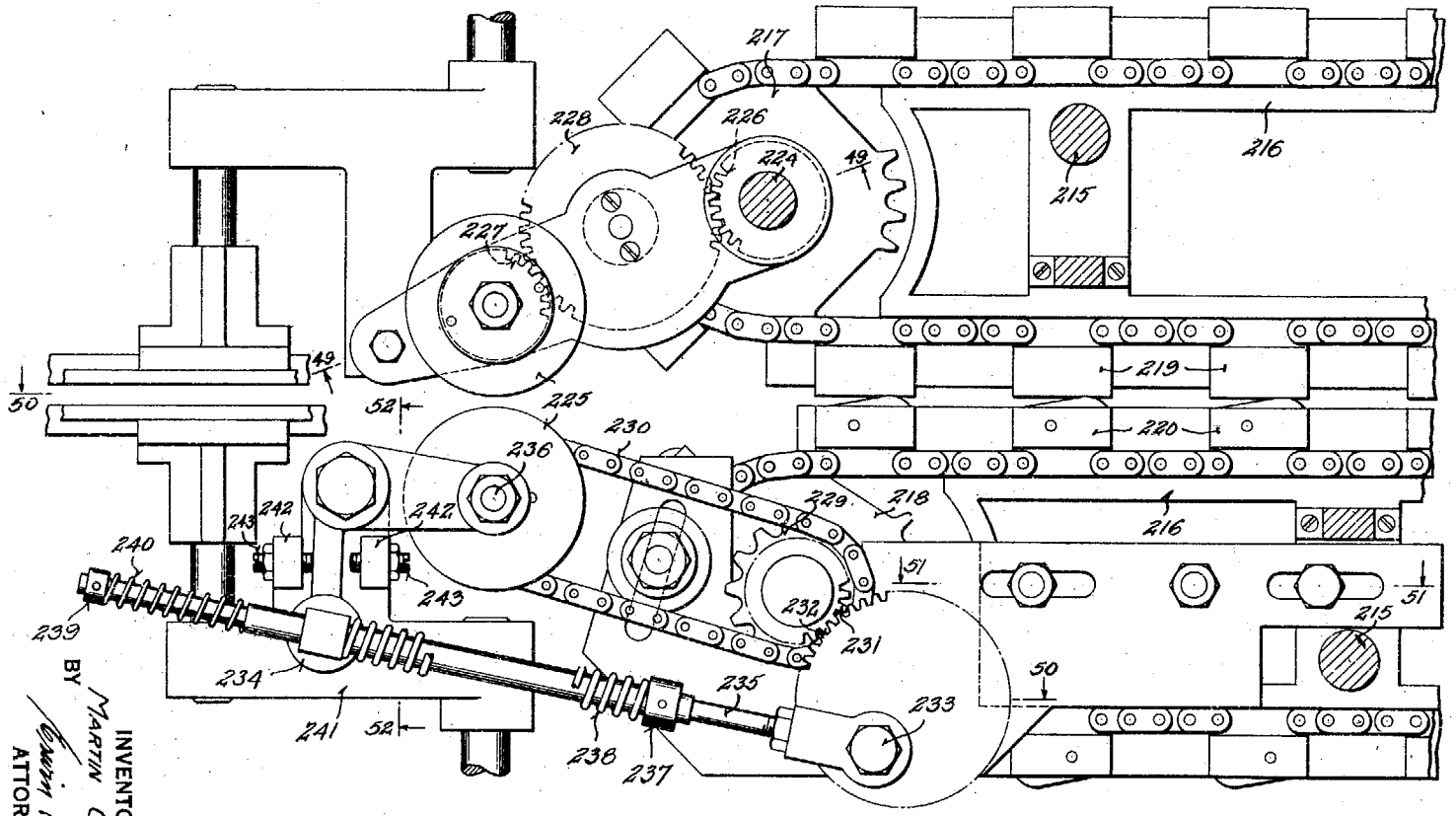
Fig. 48 is an enlarged view of the signature reregister mechanism taken on the line 48—48 of Fig. 10.
Figure 49:
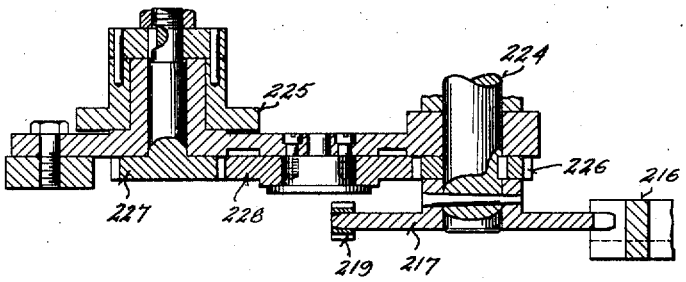
Fig. 49 is a vertical sectional view on the line 49—49 of Fig. 48 showing a portion of the signature reregister drive mechanism.
Figure 50:
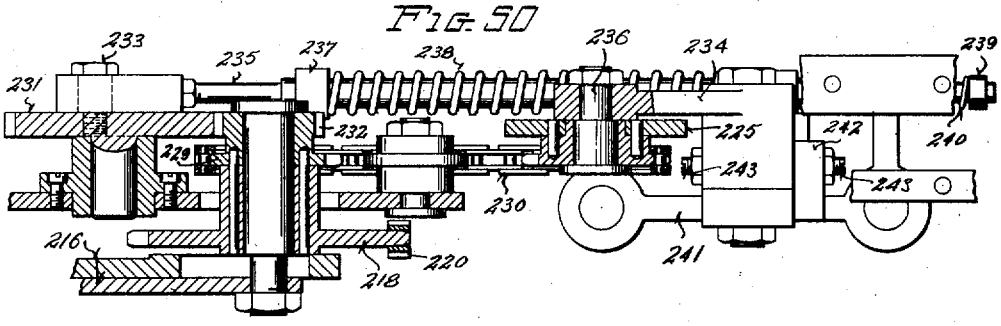
Fig. 50 is a vertical sectional view on the line 50—50 of Fig. 48 showing additional signature reregister drive mechanism.
Figure 51:
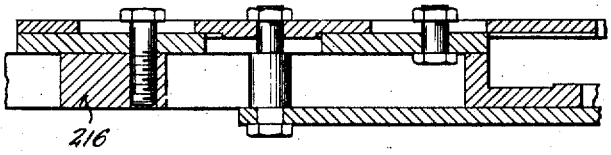
Fig. 51 is a vertical sectional view on the line 51—51 of Fig. 48 showing means for adjusting the position of the reregister mechanism.
Figure 52:
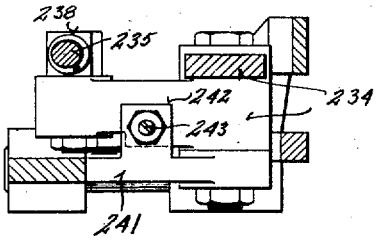
Fig. 52 is a vertical sectional view on the line 52—52 of Fig. 48 showing structural details of a portion of the reregister mechanism.
Figure 53:
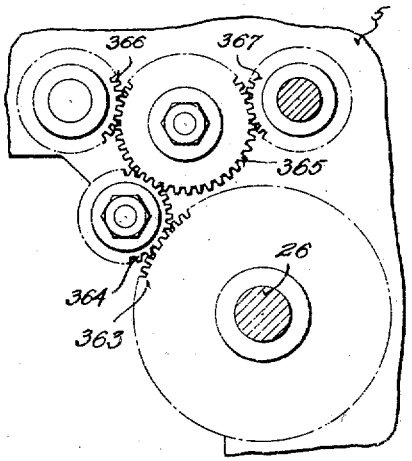
Fig. 53 is a vertical sectional view on the line 53—53 of Fig. 7 showing a portion of the drive means for advancing sheets from the source of supply in the first sheet feed station to the open signature on the moving conveyor.
Figure 54:
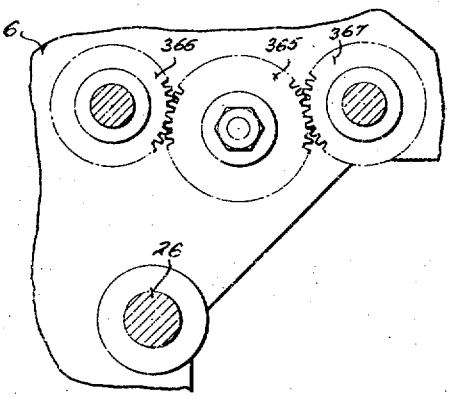
Fig. 54 is a vertical sectional view on the line 54—54 of Fig. 7 showing a portion of the means for advancing sheets in the second sheet feed station.
Figure 55:
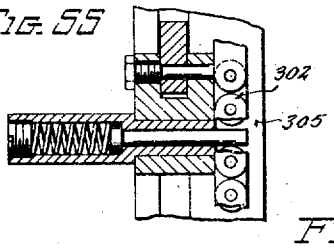
Fig. 55 is a vertical sectional detail view on the line 55—55 of Fig. 4 showing the latch mechanism carried by the sheet supporting trays.
Figure 56:
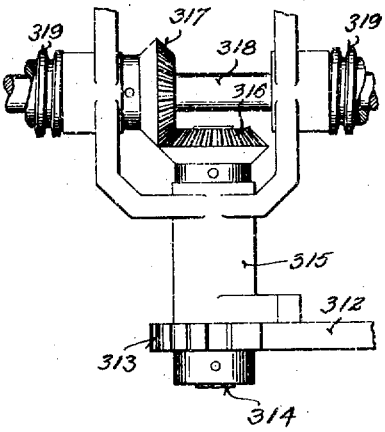
Fig. 56 is a horizontal detail sectional view on the line 56—56 of Fig. 27 showing a portion of the mechanism adapted to elevate the sheet supporting trays.
Figure 57:
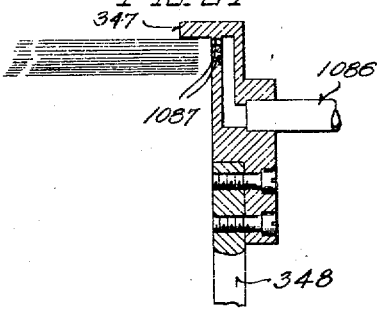
Fig. 57 is a vertical sectional detail view on the line 57—57 of Fig. 4 showing structural detail of the sheet engaging foot adapted to overlie the stacks of sheets on each of the sheet feeding stations.
Figure 58:
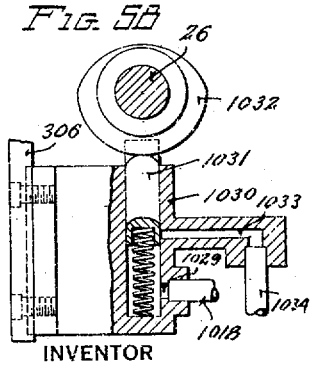
Fig. 58 is a vertical detail sectional view on the line 58—58 of Fig. 13 showing cam actuated valve means for controlling the vacuum action of the sheet feed rolls in the sheet feed station.
Figure 59:
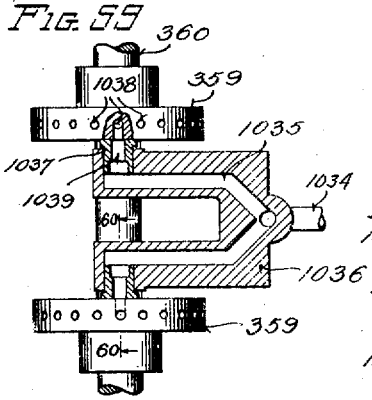
Fig. 59 is a horizontal detail sectional view on the line 59—59 of Fig. 27 showing the vacuum rolls for effecting the advance of sheets in the sheet feeding station.
Figure 60:
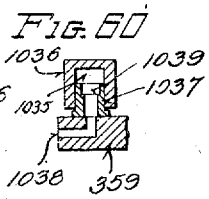
Fig. 60 is a detail sectional view on the line 60—60 of Fig. 59 showing the means for completing the vacuum circuit between the moving rolls and a stationary element.
Figure 61:
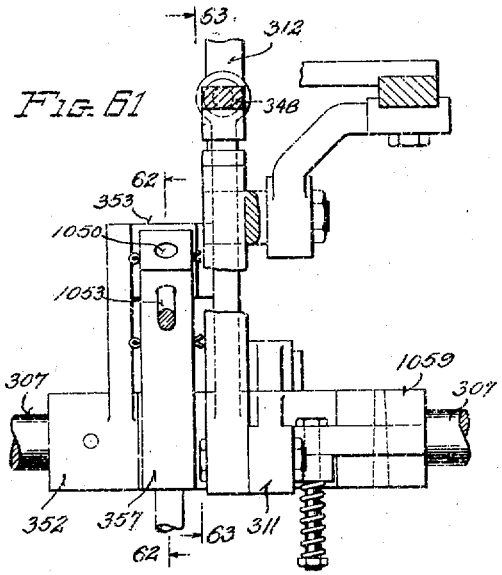
Fig. 61 is a horizontal sectional detail view on the line 61—61 of Fig. 27 showing means for controlling the movement of the sheet engaging presser foot in the sheet feed stations.
Figure 62:
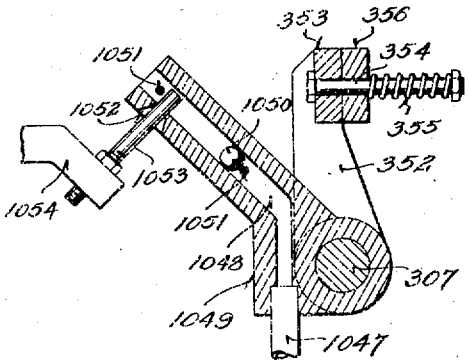
Fig. 62 is a vertical sectional view on the line 62—62 of Fig. 61 showing pneumatic pressure operated means for controlling the movement of the presser foot bar.
Figure 64:
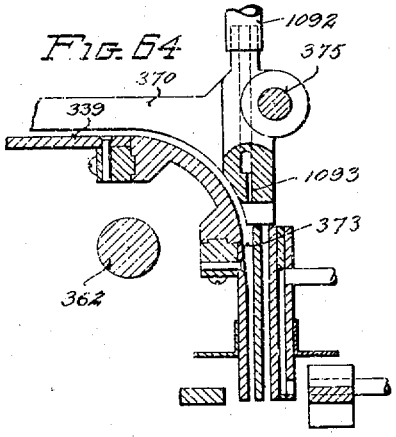
Fig. 64 is an enlarged detail sectional view on the line 64—64 of Fig. 4 showing an air injector nozzle disposed above the open signature in the first sheet feed station.
Figure 63:
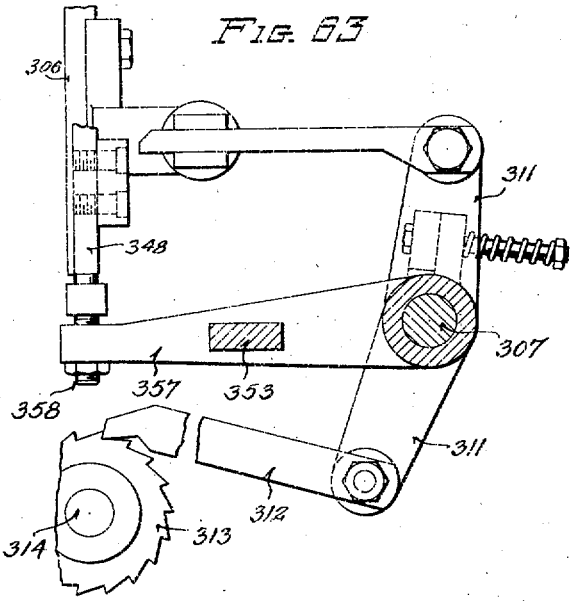
Fig. 63 is a vertical sectional view on the line 63—63 of Fig. 61 showing a stop bar actuated by the means shown in Fig. 62 for preventing the elevation of the presser foot.
Figure 65:
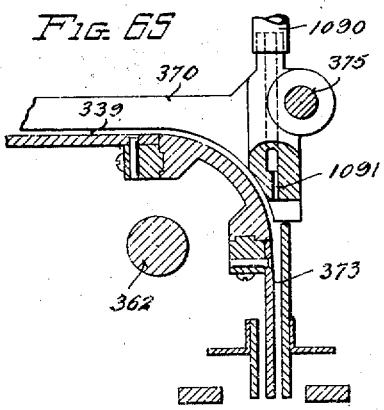
Fig. 65 is an enlarged detail sectional view on the line 65—65 of Fig. 4 showing an air injection nozzle disposed above the signature conveyor in the second sheet feed station.
Figure 66:
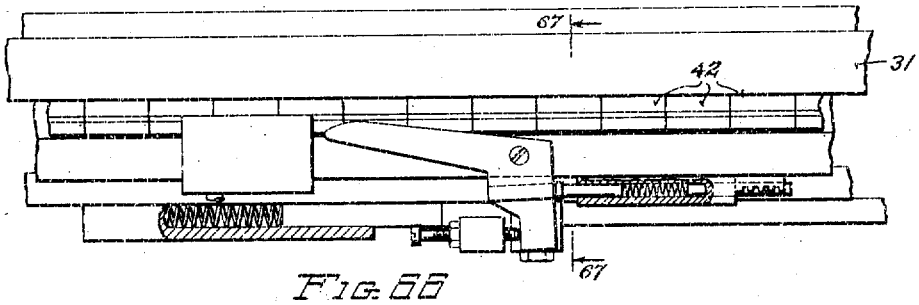
Fig. 66 is an enlarged horizontal sectional view on the line 66—66 of Fig. 10 showing mechanical means for engaging a moving signature to apply transverse pressure on the signature.
Figure 70:
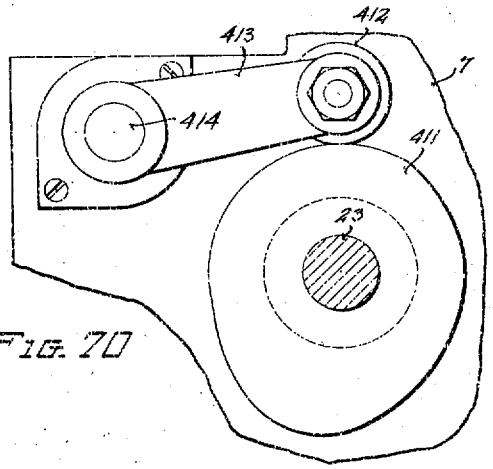
Fig. 70 is an enlarged vertical sectional view on the line 70—70 of Fig. 7 showing cam actuated means for effecting movement of the signature caliper elements.
Figure 67:
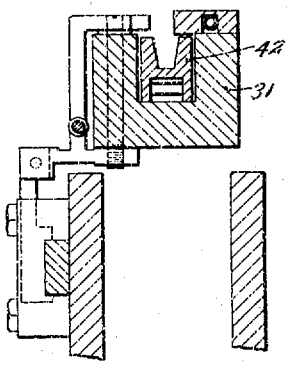
Fig. 67 is a detail vertical sectional view on the line 67—67 of Fig. 66.
Figure 68:
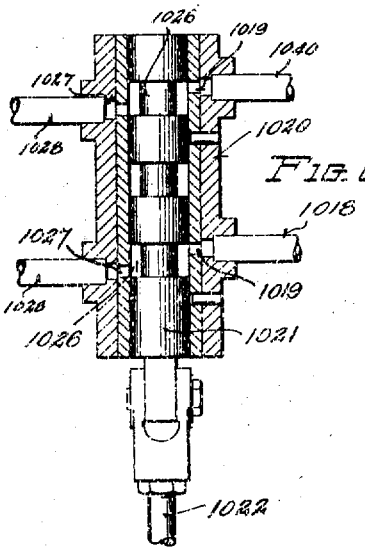
Fig. 68 is an enlarged vertical sectional view on the line 68—68 of Fig. 4 showing the structure of the valve mechanism located between the first and second sheet feed stations.
Figure 69:
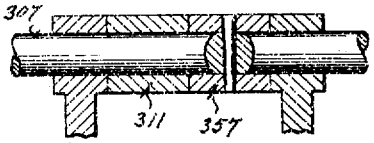
Fig. 69 is an enlarged vertical sectional view on the line 69—69 of Fig. 28 showing a means for transmitting motion to the shaft carrying the presser foot actuating mechanism in the sheet feed stations.
Figure 71:
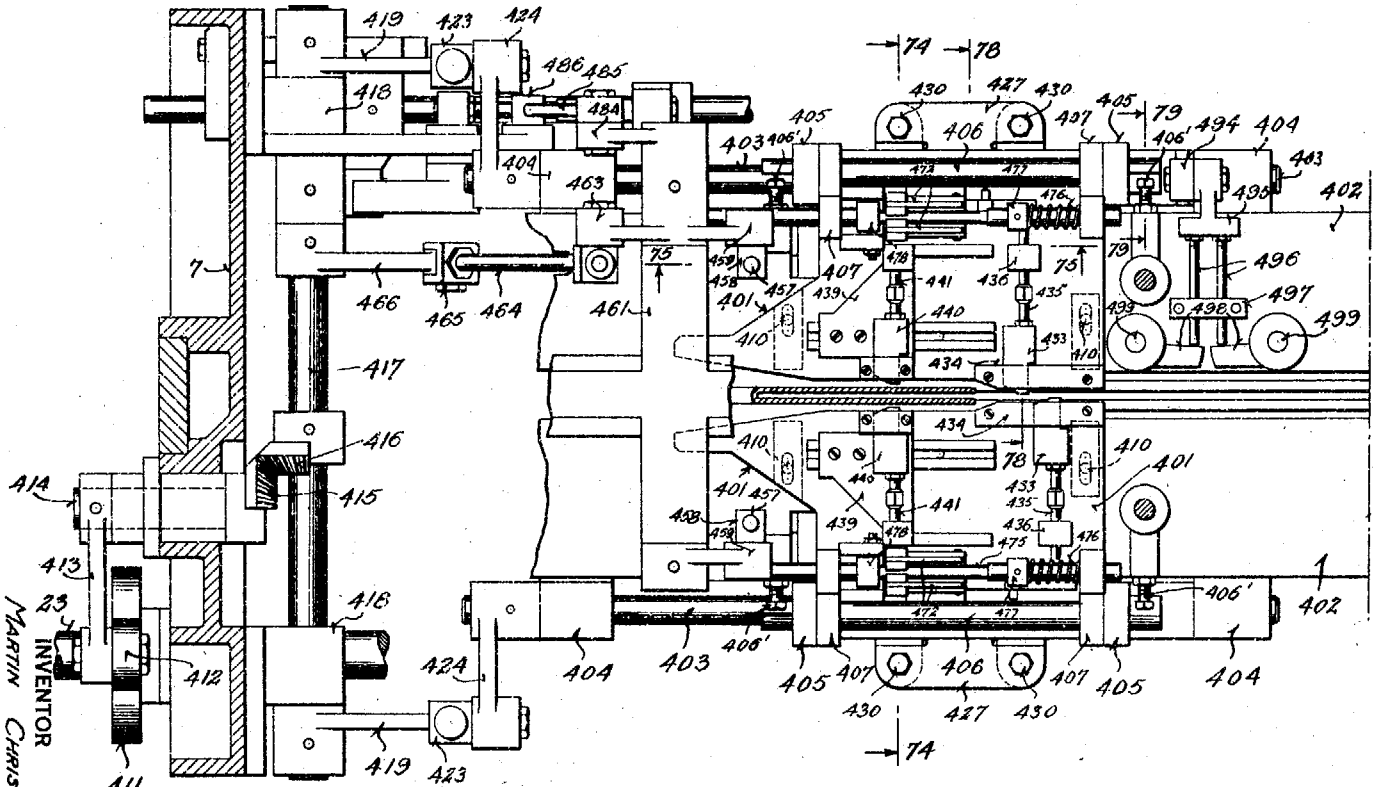
Fig. 71 is a top plan view of the signature gauging or caliper mechanism with the operating mechanism therefor.
Figure 72:
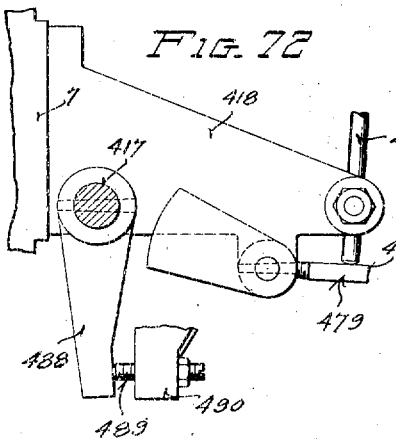
Fig. 72 is an enlarged vertical sectional view on the line 72—72 of Fig. 29 showing a portion of the caliper actuated signature discharge controlling mechanism.
Figure 73:
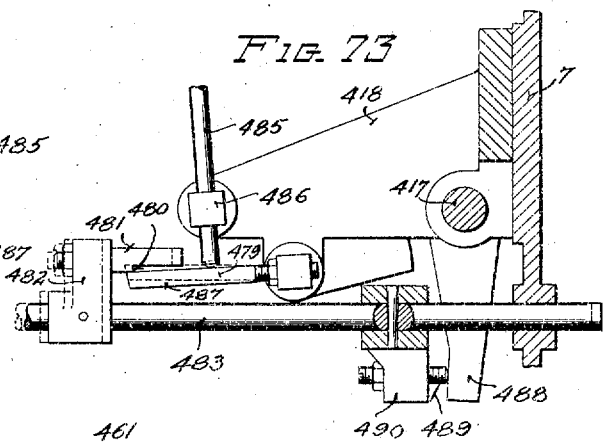
Fig. 73 is an enlarged vertical sectional view on the line 73—73 of Fig. 29 showing an additional portion of the caliper actuated signature discharge controlling mechanism.
Figure 74:
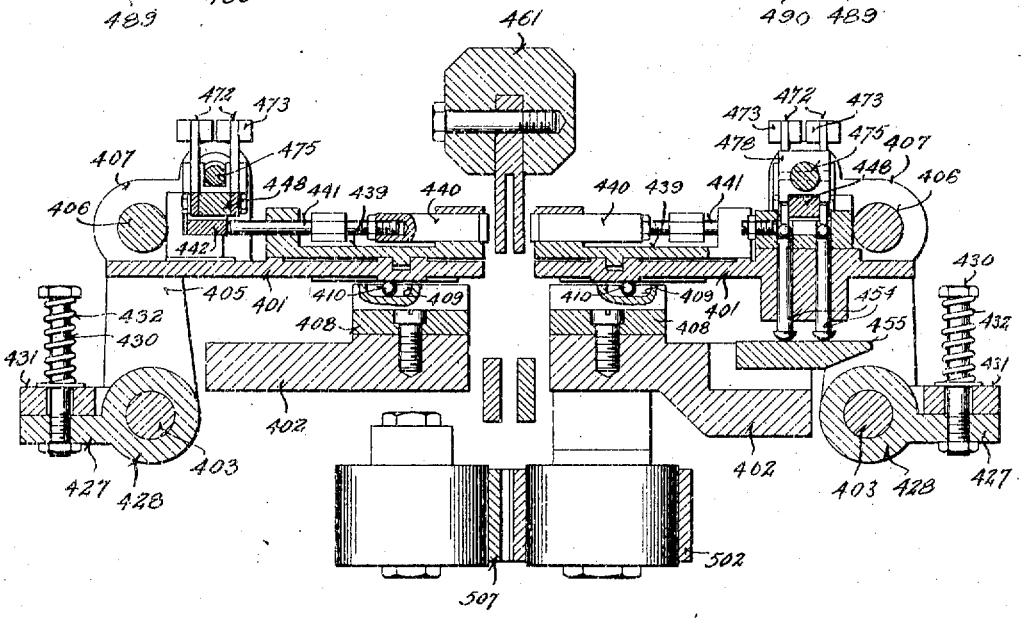
Fig. 74 is an enlarged vertical transverse sectional view on the line 74—74 of Fig. 71 showing structural details of a portion of the caliper mechanism.
Figure 75:
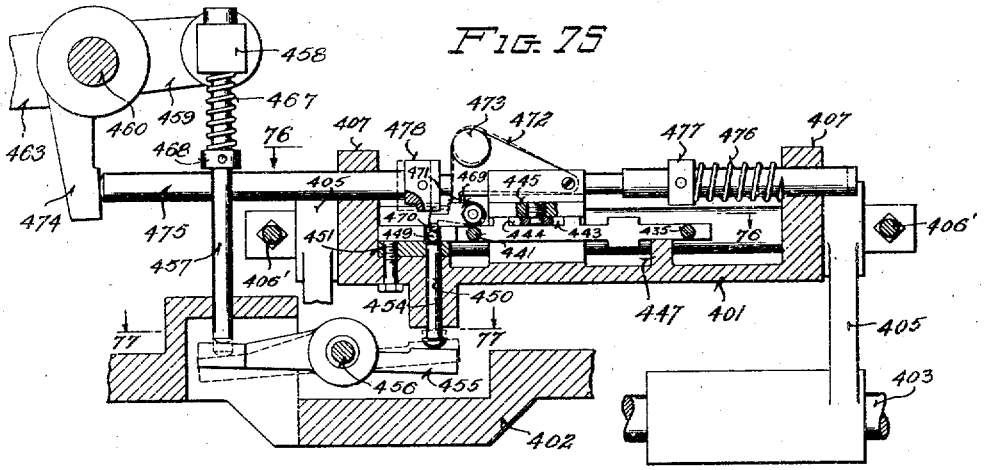
Fig. 75 is a vertical longitudinal sectional view on the line 75—75 of Fig. 71 showing structural details of a portion of the caliper mechanism.
Figure 76:
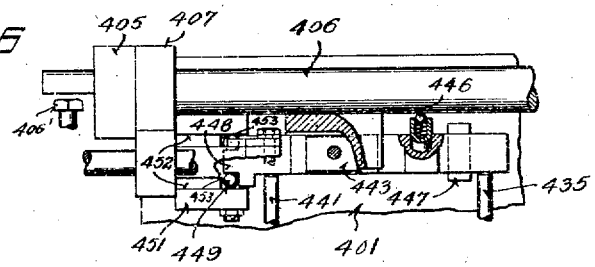
Fig. 76 is a horizontal sectional view on the line 76—76 of Fig. 75 showing the floating bar and associated mechanism of the signature gauging device.
Figure 77:
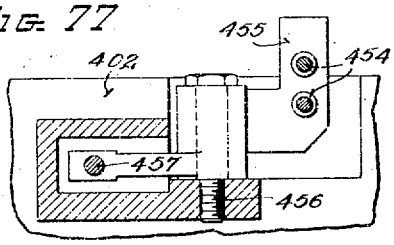
Fig. 77 is a horizontal sectional detail view on the line 77—77 of Fig. 75 showing a lever operative to effect movement of feeler balls in the caliper mechanism.
Figure 79:
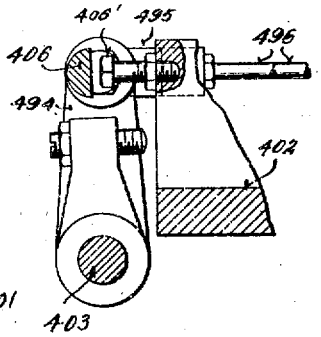
Fig. 79 is an enlarged vertical transverse sectional view on the line 79—79 of Fig. 71 showing adjustable stop mechanism for limiting the inward movement of certain portions of the caliper mechanism.
Figure 78:
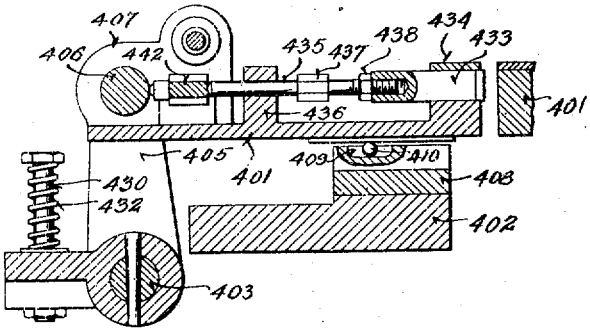
Fig. 78 is a transverse sectional view on the line 78—78 of Fig. 71 showing the structural detail of a signature contacting element of the caliper mechanism.
Figure 80:
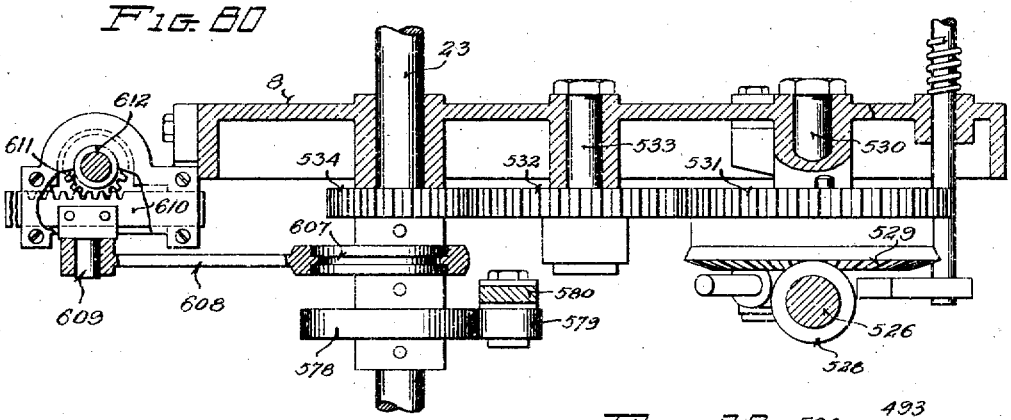
Fig. 80 is a horizontal sectional view on the line 80—80 of Fig. 32 showing a portion of the mechanical transmission for effecting movement of the signature discharge and associated mechanisms.
Figure 81:
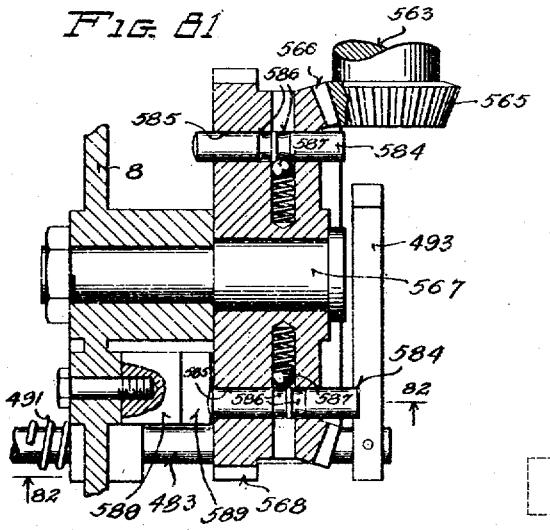
Fig. 81 is a vertical sectional view on the line 81—81 of Fig. 32 showing cam actuated means for effecting the movement of detent pins operative to control the signature discharging mechanism.
Figure 82:
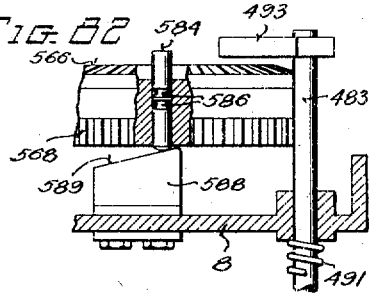
Fig. 82 is a sectional view on the line 82—82 of Fig. 81 showing the contour of the cam for effecting movement of the detent pins which control the movement of the signature discharge mechanism.
Figure 83:
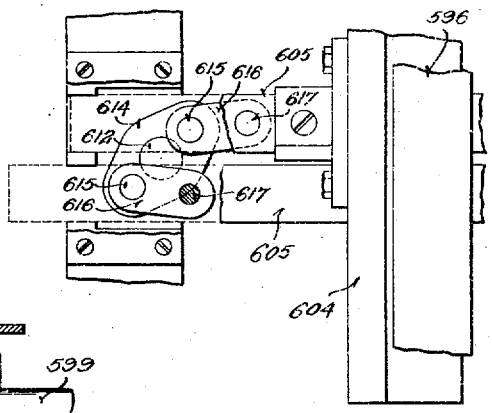
Fig. 83 is an enlarged horizontal sectional view on line 83—83 of Fig. 32 showing means for effecting the reciprocating movement of jogger means located in the signature discharge station.
Figure 84:
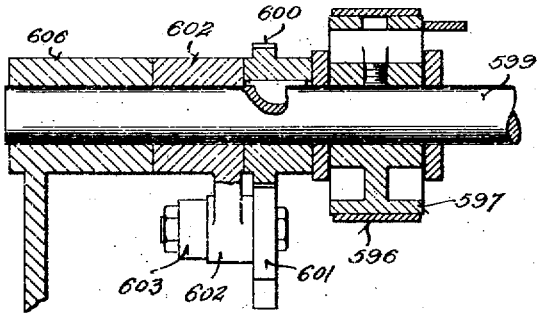
Fig. 84 is a vertical sectional view on the line 84—84 of Fig. 32 showing the pawl and ratchet for effecting the intermittent advance of signature conveyor belts on the discharge station.

The main signature conveyor assembly includes the conveyor frame 10 and the conveyor chain 11 trained about a pair of sprockets 27 and 28. Sprocket 28 is journalled in a yoke 29 provided with manually operable means in the form of a screw and nut 30 to permit adjustment of the conveyor chain to proper tautness. The upper and lower runs of the chain are supported and guided respectively in members 31 and 32. Upright frame members 2, 7 and 9 are provided with slots for guiding the conveyor in its vertical adjustment and preventing lateral displacement thereof. The remaining upright frame members through which the conveyor frame passes are provided with cut out portions to permit its vertical movement. A hand crank 33 fixed on a shaft 34, which is journalled in suitable bearing brackets on the frame 2 (see Fig. 18), provides means for elevating and lowering the signature conveyor 10. As the crank 33 is rotated, a worm 35, fixed on shaft 34, effects rotation of a worm wheel 36 fixed on a shaft 37 which is disposed in parallel relationship with the conveyor. A pair of pinions 38 and 39 carried by the shaft 37 mesh respectively with rack elements 40 and 41 (see Fig. 34) secured to the conveyor frame 10. Thus the entire conveyor may be elevated or lowered, at will by rotating the crank 33, to adjust its elevation to accommodate signatures of various widths. The conveyor chain 11 comprises a plurality of links provided with grooved signature supporting elements 42 which cooperate to form a continuous groove adapted to receive and support the signatures in upright position. Signature contacting pusher blocks 43, which impart conveyor movement to the signatures, are inserted at equally spaced intervals along the conveyor chain 11. These blocks 43 also serve to maintain the advance of the signatures in proper spaced relationship.

Figure 19:
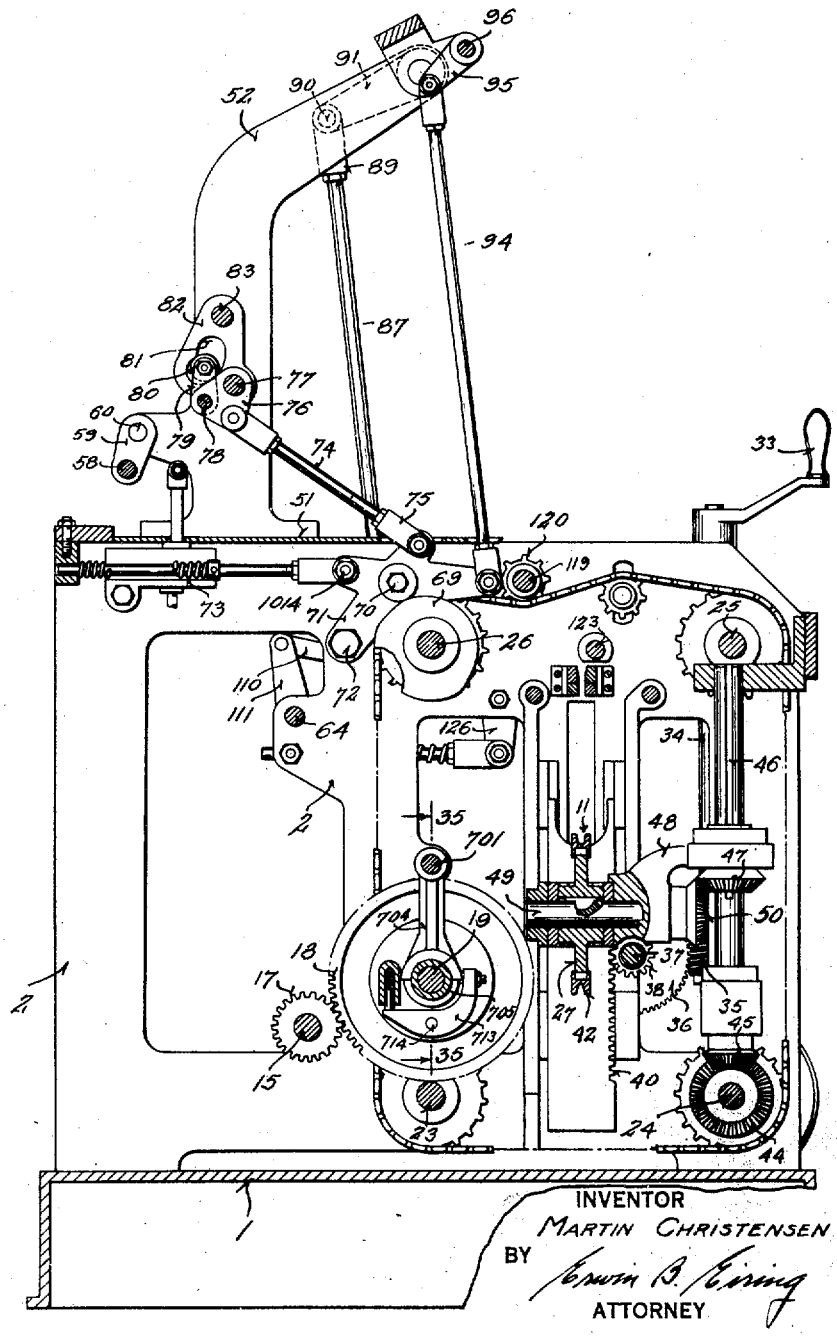
Fig. 19 is a vertical transverse sectional view through the signature feed station on line 19—19 of Fig. 3.
Figure 20:
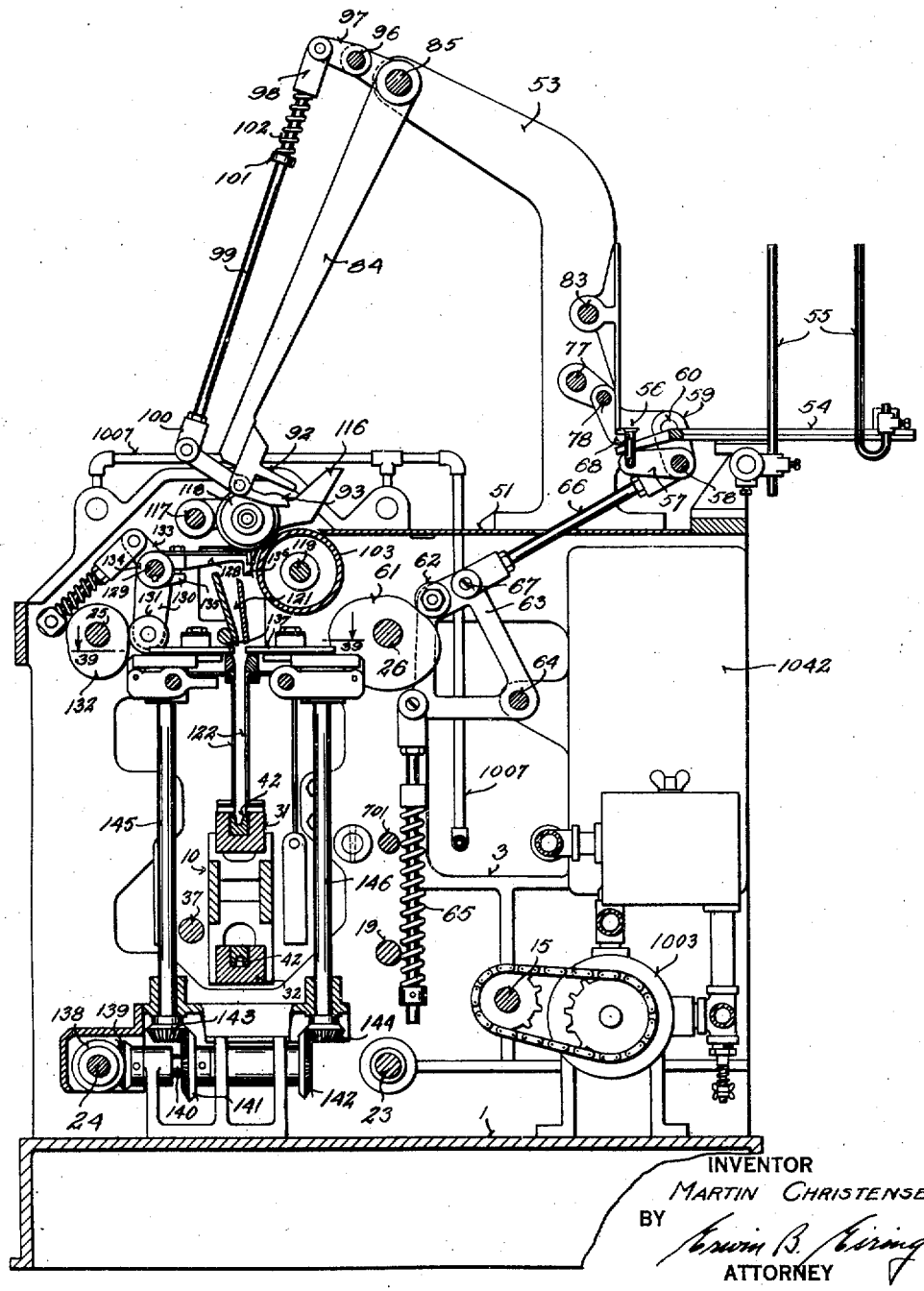
Fig. 20 is a vertical transverse sectional view through the signature feed station showing an auxiliary signature drive taken on the line 20—20 of Fig. 3.
Figure 21:
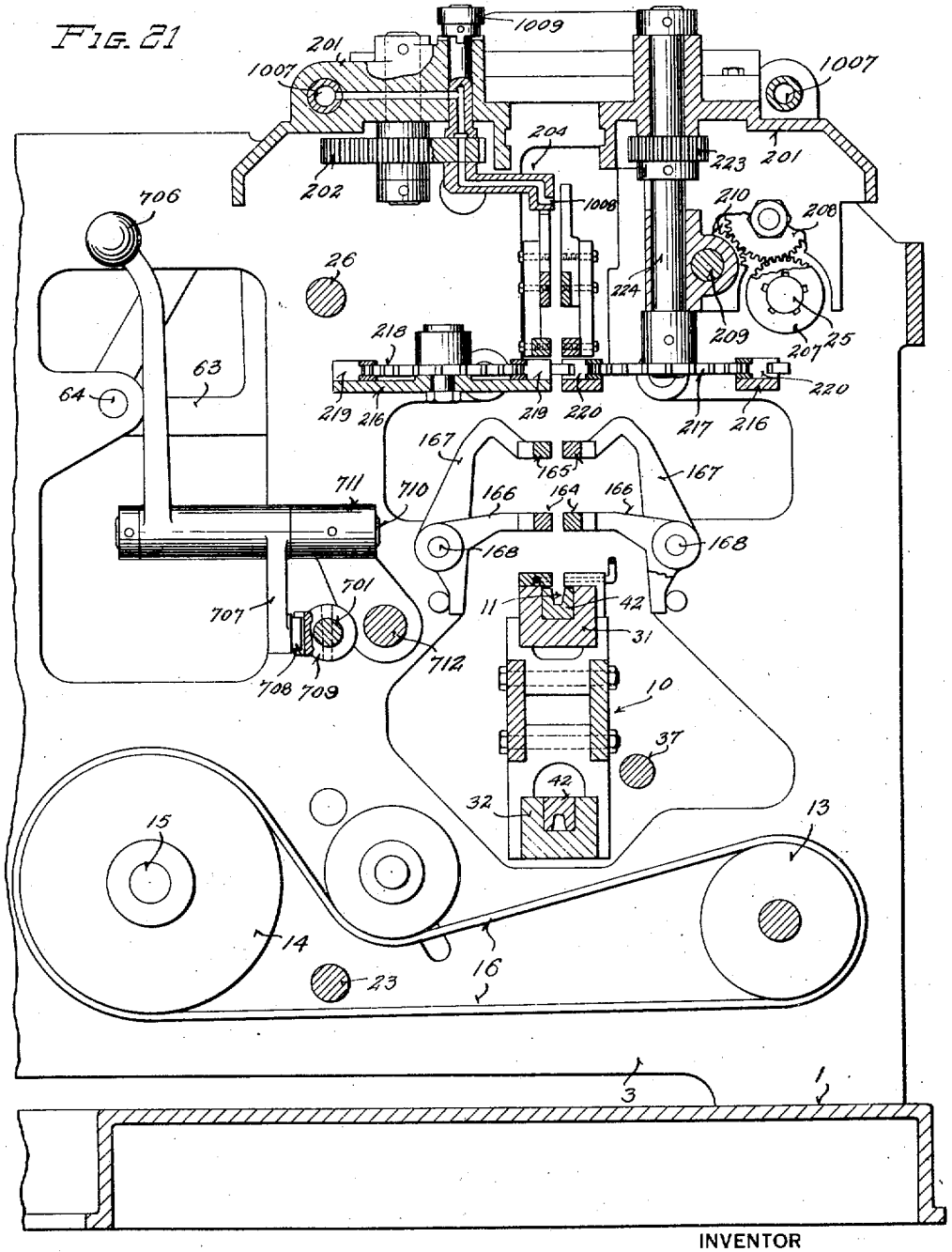
Fig. 21 is a vertical transverse sectional view through the signature opener mechanism looking toward the signature feed station on the line 21—21 of Fig. 3.
Figure 27:
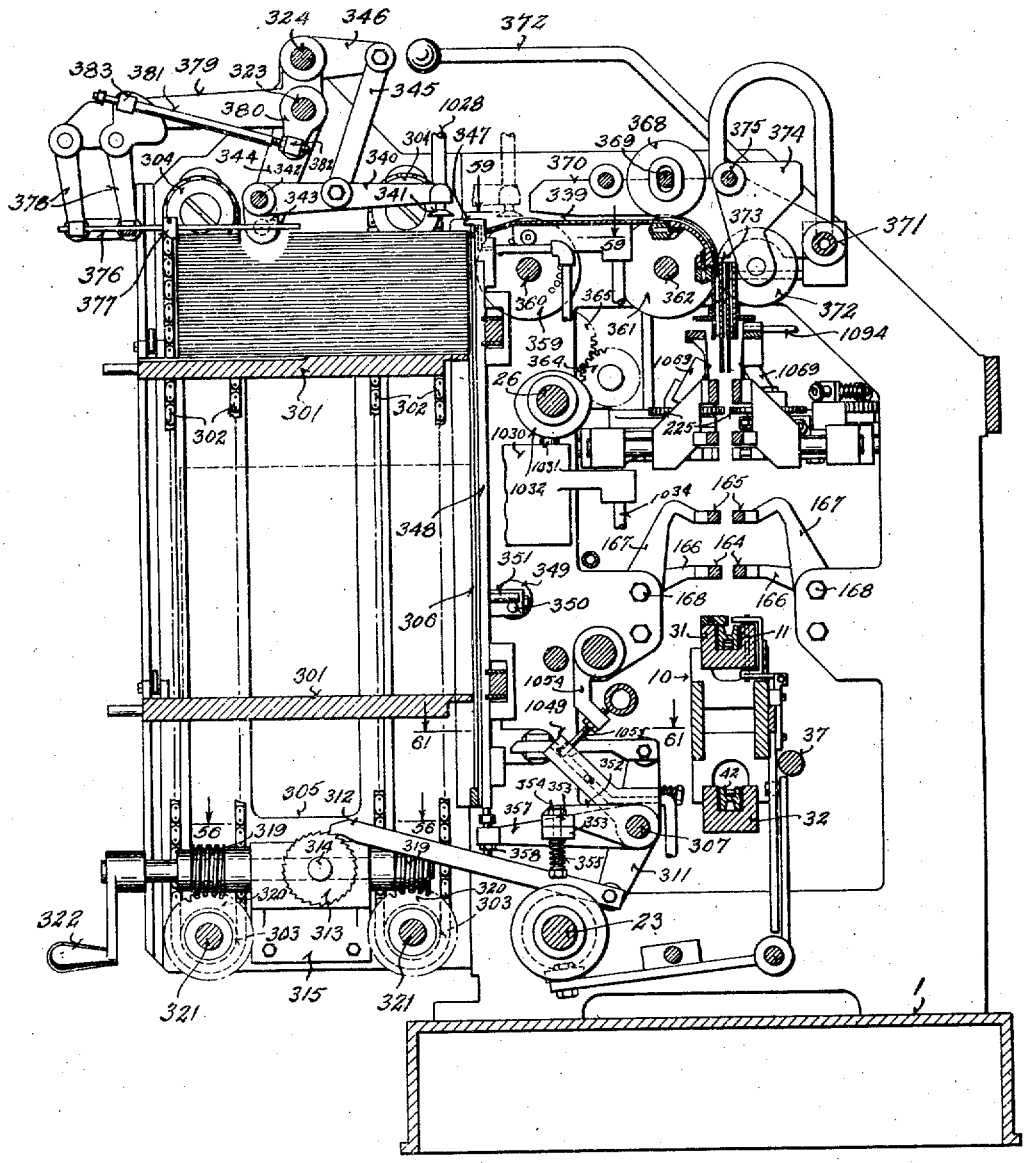
Fig. 27 is a vertical transverse sectional view on the line 27—27 of Fig. 4 through the first sheet feed station looking toward the signature opener station.

The signature conveyor drive (Fig. 19) comprises a bevel gear 44, fixed on the power take-off shaft 24, which meshes with and drives a bevel gear 45 fixed on a vertically disposed splined shaft 46. The splined portion of shaft 46 carries a bevel gear 47 journalled in a bracket 48, attached to the conveyor frame 10, which also provides a journal for a conveyor drive shaft 49 carrying at its outer end a bevel gear 50, in constant mesh with the gear 47, and intermediate its ends has keyed thereon the driving sprocket 27 of the conveyor 11. When the clutch 20 is engaged, the conveyor is continuously driven through the transmission just described to effect advance of the upper run of the conveyor from the signature feed station through the signature opener, sheet feed and into the caliper station.

Signature Feed Station

*Figures 1, 2, 3, 6, 9, 12, 15, 18-20, and 34-41 incl.*
*Sheets 1, 2, 3, 5, 8, 11, 14, 17, 18, 19, 27 and 28.*

The signature feed station comprises the first station of the machine and includes, generally that mechanism adjacent frame upright 2 or disposed between and supported by frames 2 and 3. A plate 51 mounted on and lying between members 2 and 3 forms a signature feed table. A pair of auxiliary upright frame members 52 and 53, mounted respectively on members 2 and 3 serve to support the mechanism to transfer signatures from a stack to the table 51. The signature stack support comprises the horizontally disposed plate 54 positioned above, and between members 2 and 3 and located on the front, or operator's side, of the machine. The plurality of vertically disposed adjustable guide rods 55 serve to align a stack of signatures placed upon the plate 54. The first step in effecting transfer of successive signatures beginning at the bottom of the stack comprises means for engaging the bottom signature to lower the front folded edge thereof. This mechanism (see Fig. 20) comprises a pair of vacuum cup signature engaging elements 56 supported on an arm 57 pinned to shaft 58 which is journalled adjacent its extremities in a pair of links 59 which in turn are rockably mounted adjacent their outer extremities on pins 60 supported in brackets 52 and 53. The mechanisms for effecting the required rocking movement of the vacuum cups toward and from the lowermost signature of the stack comprises a cam 61 keyed to shaft 26. A cam follower 62 is carried by an arm 63 mounted on a shaft 64 carried by frame member 3. The cam follower 62 is retained in contact with cam 61 by means of a spring mechanism 65. A connecting rod 66 is rockably mounted at one end on a pin 67 carried by the arm 63. The other end of the connecting rod 66 is received in a member which is journalled on the shaft 58. The ends of rod 66 are provided with screw threads and nuts to permit proper adjustment of its length in order that the correct movement of the vacuum cups toward and from the signature may be had. After the forward edge of the bottom signature has been lowered from the remaining signatures on the stack, a pair of stack engaging feet 68 are rocked inwardly between the lowered signature and the remaining signatures in the stack. The mechanism for effecting the rocking movement of the feet is operated by another cam 69 (see Fig. 19) keyed to shaft 26. A cam follower 70 is carried by an arm 71 which is pivoted on a pin 72 mounted on frame 2. The cam follower 70 is maintained in contact with the cam 69 by the action of a coil spring 73. A connecting rod 74 has one end thereof connected to the arm 71 by means of the yoke 75. The other end of the rod 74 is attached to plate 76 through a similar connection. The rod 74 is provided with screw threads and nuts to permit adjustment as to length so that the proper movement of the feet 68 may be imparted through rotation of the cam 69. The plate 76 is pivotally mounted on a shaft 77 and carries an auxiliary shaft 78 to which the feet 68 are pinned. An arm 79 which is also pinned to the shaft 78 extends upwardly therefrom and carries on one extremity a roller 80 adapted to be received in and follow the contour of a cam groove 81 formed in a plate 82 which is fixedly mounted on rods 77 and 83 supported between the uprights 52 and 53. Rotation of the cam 69 imparts a rocking movement to the arm 71. This rocking movement is transmitted to the plate 76 through the connecting rod 74 and results in the raising and lowering of the roller 80 in the groove 81. Since the arm carrying the rollers and the feet 68 are pinned to the common shaft 78, the rocking motion of the plate 76 imparts the advancing and retracting movement required to place the feet 68 in stack supporting position when the lowermost signature has been removed, and retract the feet after the lowermost signature has been withdrawn to permit the stack to be supported wholly by the plate 54.

After the forward edge of the lowermost signature has been lowered from the stack by means of the vacuum cups 56 and the feet 68 have moved into a position to support the remaining signatures in the stack, signature picker mechanism becomes effective to engage and remove the lowermost signature from those remaining in the stack. This signature picker mechanism comprises an arm 84 which is pinned to a shaft 85 which in turn is journalled adjacent the uppermost extremities of auxiliary frame members 52 and 53. Timed rocking movement is imparted to the arm 84 from the power take-off shaft 23 (see Fig. 18) through a crank pin 86 mounted on the gear 22 and a connecting rod 87 which has its lowermost end mounted in a member 88 which is retained on the crank pin 86. The upper extremity of the connecting rod 87 is connected by means of a yoke 89 to a pin 90 carried by the outer extremity of an arm 91 which in turn is pinned to the shaft 85. As the gear 22 rotates, the arm 84 moves from the outer extreme position (shown in Fig. 18) to the inner extreme position wherein a foot portion 92 of the arm 84 lies between the lowered forward edge of the lowermost signature and remaining signatures of the stack. A signature gripping jaw 93 is rockably mounted adjacent the foot 92 on a pin. Motion is imparted to the jaw 93, to urge it toward the foot 92 with which it cooperates to grip the lowered signature, by means of the cam 69, previously referred to (see Fig. 19), through an extending portion of the arm 71 which provides a pivotal connection for a connecting rod 94, the upper extremity of which is pivotally connected to the free end of an arm 95. The other extremity of the arm 95 is pinned to a shaft 96 which is journalled in suitable bracket members carried on the shaft 85. A second arm 97 (see Fig 18) which is also pinned to the shaft 96 is provided at its free end with a pivotal connection for a yoke 98 in which the upper extremity of a connecting rod 99 is journalled for axial sliding movement. The lower extremity of the connecting rod 99 is adjustably mounted in a yoke 100 which is pivotally mounted on a rearwardly extending portion of the jaw 93. A lost motion mechanism, in the form of a collar 101 pinned to the rod 99 and a coil spring 102 surrounding the rod 99 and disposed between the collar 101 and the yoke 98, normally tends to retain the movable jaw 93 in contact with the foot 92 formed at the lower end of arm 84. The contour of cam 69 is such that the movable jaw 93 remains open throughout the movement of the arm 84 toward the signature stack. The jaw 93 closes under action of the cam 69 when the arm has reached its forwardmost, or signature gripping position. The jaw remains in closed position until such time as the signature has been withdrawn from the stack and swung forwardly and downwardly to a position on the signature feed table 51 where it is released by operation of the cam 69 which effects the opening of the jaw 93 to release the gripping contact between the picker arm 84 and removed signature.

After the signature has been deposited on the table 51 it is advanced on to a feed roll 103 by means of a pusher plate 104 (see Fig. 37) which is adjustably secured to a slide block 105 guided for reciprocating movement along a channel 106 formed in a supporting member 107. Motion transmitting connections for effecting the reciprocation of the pusher plate 104 comprises a crank pin 108 (see Fig. 18) formed on the outer face of a cam 109 secured to the power take-off shaft 26. A connecting rod 110 has one end thereof journalled on the pin 108 and the other end thereof is pivotally mounted on the free end of an arm 111 which is pinned to the rockable shaft 64 provided intermediate its ends with an upwardly directed arm 112 (see Fig. 37) which is also pinned to the rock shaft 64. A connecting link 113 is pivotally mounted at one end to the upper extremity of arm 112 while the other end thereof is pivotally mounted on a pin 114 secured to a depending boss 115 formed integral with the slide block 105. As the power take-off shaft 26 is rotated the crank pin 108 effects the rocking action of shaft 64 which in turn is transmitted to arm 112 and link 113 to effect reciprocation of pusher plate 104 toward and from the feed roll 103. The adjustment of the pusher plate 104 on the slide block 105 is provided to permit the signature to drop freely ahead of the plate 104 as it is deposited on the table 51 through the action of the signature picker arm 84. The amount of movement of the pusher plate 104 is such that the forward or folded edge of the signature is advanced beneath a plurality of guide fingers 116 (see Fig. 20) which are pivotally mounted on a shaft 117 journalled in frame members 2 and 3. Each guiding finger carries a rubber tired friction roller 118 which normally lies in contact with the feed roll 103. The feed roll 103 is carried by a shaft 119 which is journalled in frame members 2 and 3. The outer extremity of the shaft 119 is provided with a sprocket wheel 120 (see Fig. 19) which meshes with the chain trained around the sprocket wheels on each of the power take-off shafts 23, 24, 25 and 26. The feed roll 103 is therefore constantly driven when the machine is in operation, so that when the pusher plate 104 moves the signature over the roll 103 and in contact with the rubber tired rollers 118 the signature is gripped therebetween and fed forwardly and downwardly into and through a signature delivery chute 121, and between a plurality of signature guide straps 122 on to the conveyor chain 11.

The signature chute 121 is mounted on a shaft 123 which is journalled in frame members 2 and 3. The outer extremity of shaft 123 is adapted to receive an arm 124 (see Fig. 18) which is pinned thereto. The cam 109 on power-take-off shaft 26 provides means for oscillating the signature chute through a cam follower 125 carried by a pivoted arm 126. The lower end of the arm 126 is provided with spring urged means for retaining the follower 125 in contact with the cam 109. An adjustable connecting link 127 is pivotally mounted at its extremities to the free end of the arms 124 and 126. The chute 121 is rocked with the shaft 123 so as to present itself adjacent the feed roll 103 to receive the oncoming signature and then to rock outwardly so as to move the signature away from the roll 103. A plurality of signature engaging fingers 128 (see Fig. 20) are disposed on a shaft 129 which is journalled in frame members 2 and 3. An arm 130 keyed to the shaft 129 carries a cam follower 131 adapted to follow a cam 132 keyed to the power take-off shaft 25. A second arm 133 is also pinned to the shaft 129 and is provided at its outer extremity with spring urged means for retaining the cam follower 131 in contact with the cam 132. A plurality of collars 134 serve to position the fingers 128. Each collar is provided with an outwardly extending ear 135. This ear is adapted to be contacted by an adjusting screw on each of the fingers 128 so that the elevation of a downwardly extending tip 136 on the fingers may be properly adjusted. As the cam 132 rotates with the power take-off shaft 25, the shaft 129 is rocked to cause the fingers to drop behind the signature lying in the chute when the chute is in its outermost position. As the chute moves inwardly to receive the next succeeding signature the fingers retain the first signature so that progress of the oncoming signature will not be impeded.

An auxiliary signature drive mechanism comprising a pair of discs 137 (see Fig. 20) provide means for initiating forward movement of the signature prior to the time that the signature pusher block 43 of the chain 11 contacts the rearward edge of the signature. This auxiliary drive mechanism is provided for the purpose of eliminating the forceful impact of the pusher block 43 with the signature which, in the absence of this drive would be at rest. The discs 137 (see Figs. 20 and 39) are driven from the power take-off shaft 24 through a pair of bevel gears 138 and 139 keyed respectively to shafts 24 and 140. Shaft 140 is provided with a pair of oppositely faced bevel gears 141 and 142. These gears mesh respectively with bevel gears 143 and 144 carried by vertically disposed shafts 145 and 146 respectively. Shafts 145 and 146 are respectively provided with spur gears 147 and 148 which mesh with and drive a spur gear 149 formed integral with each disc 137. By reason of the oppositely faced bevel gears 141 and 142, the discs 137 will be rotated in opposite directions. Each disc is provided with a signature contacting surface. This surface extends through only a portion of the circumference of each disc. As these portions engage the signature to initiate its movement in the direction of the conveyor travel the distance between the centers of the discs 137 will tend to be increased. In order to facilitate this action, the disc mounting means which comprises a casting 152 is permitted some movement about shafts 145 and 146. Each disc mounting means is provided with an ear 153 which lies between an adjusting screw 154 and a spring urged plunger 155 (see Fig. 39). The adjusting screw 154 serves to limit the inward movement of the discs 137 and the spring urged plunger 155 provides a resilient means for maintaining pressure between the signature contacting faces of the discs. As the signatures are received upon the conveyor 11 they pass between the cut away portions of the discs 137 so that no interference can be had between the rotating discs and the downward travel of the oncoming signature. As the bottom edge of the signature reaches the conveyor, the signature contact surface of the discs engage the signature adjacent the upward and forward edge thereof and the friction between the discs and the signature is sufficient to initiate its forward movement so that the signature is traveling at approximately the same speed as the conveyor 11 when the pusher blocks 43 contact it.

It will be understood that the mechanisms which have been described up to this point for removing the signature from the stack in the signature feed station and advancing it to the point where it is deposited on conveyor 11 are adjusted to function in synchronized relationship by reason of proper adjustment of the several actuating mechanisms and the proper angular displacement of each of the cams on their respective power take-off shafts.

As the signature is contacted by the pusher elements 43 of the conveyor chain 11 and advanced toward the signature opener station, it will pass between vertically spaced parallelly disposed signature guide bars 164 and 165 so as to maintain the signature in upright position throughout its travel through the remaining stations of the machine. These guide bars 164 and 165 are supported by mounting brackets 166 and 167 respectively. As the conveyor is adapted for vertical adjustment to compensate for various widths of the signatures the guide bar brackets 166 and 167 are adapted to be mounted on pins 168 so that the bars 164 and 165 may be swung outwardly as the conveyor frame 10 is elevated for the receipt of a narrower signature. The provision of means for displacing the guide bars in accordance with elevation of the conveyor assures the maintainence of lateral support for the upright signature during its travel through the machine.

As the signature is moved forwardly by the conveyor 11 it passes from the signature feed station into the signature opener station.

Signature Opener Station

*Figs. 1–4, 6, 7, 9, 10, 12, 13, 15, 16, 21, 22–25, 42–52 inclusive*

*Sheets 1, 2, 3, 5, 6, 8, 9, 11, 12, 14, 15, 20, 21, 29–32 inclusive*

The signature opener station comprises the second station of the machine and includes that mechanism lying between upright frame members 3 and 4. The opener mechanism comprises generally two banks of signature contacting elements disposed above and on opposite sides of the signature conveyor 11. The mechanisms in each bank of opener devices are identical in structure and operation and are distinguishable merely in the staggered relationship of the signature contacting elements. Each bank of opener devices is driven independently from separate power take-off shafts, however, they are driven in properly adjusted phase relationship so that each signature contacting element will contact an oncoming signature adjacent the top and forward edge as the conveyor urges the signature through the opener station. A pair of opener supporting castings 201 which are horizontally disposed and in spaced relationship above the conveyor 11, extend between frame members 3 and 4 to which they are secured in any suitable manner. Each casting 201 serves to support one bank of opener mechanisms together with an associated auxiliary signature conveyor mechanism. A plurality of mating gears 202 and 203 (see Fig. 42) are rotatably mounted on stub shafts anchored in and extending downwardly from the castings 201. Gears 202 are each provided with an extended arm 204 which constitutes the signature engaging member. The mating gears 203 are idler gears interposed between adjacent operating gears so that the direction of rotation of the operating gears and arms 204 carried thereby will be in the same direction as the movement of the signature which passes therebetween. The arms 204 are preferably fixedly mounted to the bottom surface of the gears 202 although they may be formed integral therewith. Each arm 204 lies beneath the gears 202 and extends outwardly therefrom a sufficient distance to contact the passing signature as it travels through the opener station. Each arm 204 is further provided with vacuum means adapted to be energized as the arm approaches the oncoming signature so as to contact the outer sheet thereof and draw it outwardly away from the remaining sheets of the signature to form an opening therein as the signature passes the opener device.

A plurality of sheet deflecting elements 200 are mounted in spaced relationship along a groove disposed longitudinally along the inner edges of the castings 201. The sheet deflecting members 200 are positioned adjacent the path of travel of the signature engaging arms 204 so as to form abutment means which will direct the deflected sheet in a path rearwardly and below the next succeeding signature engaging member 204. The elements 200 may be provided with signature slitting knives adapted to be removably attached to the forward end of the members. The signature slitter blades may be applied and utilized in instances where the signature to be opened is of the closed end type.

A pair of blower bars (see Fig. 22), to be hereinafter more specifically described, are mounted on brackets supported by the plates 216. These bars are angularly disposed with respect to a vertical plane and in spaced relationship parallel to the path of travel of the signature and lie between the banks of signature openers. Each bar is provided with a plurality of orifices adapted to project a jet of air in a direction obliquely against the leading edge of the signature as it approaches and is acted upon by the signature engaging arm 204.

The bank of signature opener devices on the operator's side of the machine is driven from the power take-off shaft 26. The bank of signature opener devices on the far side of the machine is driven from the power take-off shaft 25. The drive from the power take-off shaft 26 to the opener devices on the operator's side of the machine comprises (see Fig. 42) a spur gear 205 which lies adjacent upright frame member 4. The gear 205 is provided with a series of clutch teeth 206 (see Fig. 24) which are adapted to receive cooperating clutch teeth on a collar 207 which is provided with five equally spaced keyways adapted to receive a key to adjustably fix the collar in desired angular position on the shaft 26. The gear 205 meshes with idler gear 208 which drives a horizontally disposed shaft 209 through gear 210. The opposite end of shaft 209 carries a bevel gear 211 which meshes with a mating gear 212 fixedly mounted on a vertically disposed shaft 213 on which one of the gears 202 is fixedly mounted. With one gear 202 driven, the mating idler gear 203 and remaining gears in the train will also be driven. Power take-off shaft 25 is provided with an identical driving train to furnish power for driving the other bank of signature opener devices. An auxiliary signature conveyor mechanism 214 is supported below castings 201 by means of rods 215. This auxiliary signature conveyor (see Fig. 43) comprises a pair of plates 216 lying in a horizontal plane above and in parallel relationship with the conveyor 11. Each plate 216 carries a driving sprocket 217 and an idler sprocket 218 about which are trained conveyors 219 and 220. The links of conveyor 220 are provided with rockable spring urged fingers 221 adapted to hold the signature firmly between conveyor chains 219 and 220 as the signature is carried through the opener station. The drive for each side of the auxiliary conveyor is taken from the opener mechanism lying directly above by means of an idler gear 222 in mesh with the gear 202. The idler gear 222 meshes with a gear 223 fixed to the upper end of a shaft 224. The lower end of the shaft 224 carries the driving sprocket 217. The speed of the auxiliary conveyor chains 219 and 220 is slightly higher than the speed of the main conveyor 11 so that the signature is drawn away from the pusher blocks 43 carried by the main conveyor 11 during its travel through the signature opener station. In order to return the signature to the control of the main conveyor it is desirable to retard its speed and effect proper reregister of the signaure with the main conveyor. The mechanism for effecting the reregister of the signature comprises a pair of driven discs 225 (see Fig. 48). These discs 225 are disposed on opposite sides of the path of signature travel. One-half of the reregister mechanism is maintained in fixed relationship with the conveyor while the other half thereof is provided with means for moving the disc toward and from its companion disc in times relationship with the advance of an oncoming signature so that the oncoming signature is gripped between the faces of the discs after the signature has been discharged from the auxiliary conveyor. The linear speed of the signature is then reduced to that of the discs until such time as the pusher block 43 on the main conveyor 11 gently abuts the rearward edge of the signature to again control its forward motion, at which time the movable disc is withdrawn from frictional contact with the signature to nullify its effect on the same. The drive for the disc on the stationary member of the reregister mechanism comprises a spur gear 226 attached to or formed integral with sprocket 217. The shaft carrying disc 225 is also provided with a spur gear 227 which is driven from gear 226 through an idler 228. The drive for the laterally movable disc 225 is effected through a sprocket 229 carried by or secured to sprocket 218 of the conveyor chain 220 and a similar sprocket carried by the shaft on which disc 225 is fixedly mounted. A chain 230 which passes over an idler roller serves to provide the drive for the laterally movable disc 225. The means for effecting movement of one of the discs 225 toward and from the path of signature travel comprises a spur gear 231 mounted on a shaft carrying the sprocket 218 and sprocket 229. This gear 231 meshes with a mating gear 232 which is provided with a crank pin 233. Motion of the crank pin is transmitted to a bell crank arm 234 through a rod 235 which passes through one arm of the bell crank 234. The other arm of the bell crank 234 carries a pin 236 on which the disc 225 is mounted. A lost motion connection is provided on the rod 235 by reason of the fact that the throw of the crank pin is greater than the required movement of the disc to effect its contact with or withdrawal from the signature on which it is operating. This lost motion mechanism comprises a collar 237 pinned to the rod 235 between its connection to the crank pin 233 and the arm of the bell crank 234. A coil spring 238 surrounds the rod 235 between collar 237 and the arm of the bell crank 234. A second collar 239 is pinned adjacent the free end of the rod 235 beyond the arm of the bell crank 234. A coil spring 240 surrounds the outer portion of the rod 235 and is adapted to contact the arm of the bell crank 234 to provide a resilient take-up for the over travel of the crank pin 233 beyond that required to effect the signature gripping action between the driven discs 225. A bracket 241 which serves as a mounting means for the bell crank 234 is provided with a pair of upstanding ears 242 adapted to receive adjusting screws 243 which limit movement of one disc 225 toward and from its companion disc by reason of abutment with one arm of the bell crank 234.

After the reregistering operation of the signature has been completed and it is again under control of the main conveyor 11 it passes into the first of two sheet feed stations.

Sheet Feed Station

*Figs. 1, 2, 4, 7, 10, 13, 16, 27, 28, 53–65, 67–70 inclusive*

*Sheets 1, 3, 6, 9, 12, 15, 22, 23, 33–35 inclusive*

The sheet feed stations, two of which are shown, comprise together the third station of the machine and include respectively the mechanism lying between or supported by upright frame members 4 and 5, and 6 and 7. The operating mechanism common to both stations lies between frame members 5 and 6. The two stations are identical in mechanism and operation and therefore a description of one will suffice for both, identical reference characters are applied to like elements in each.

A sheet pile supporting member 301 is adapted for removable application on a plurality of elevating chains 302 (see Fig. 27) which are trained on driving and driven sprockets 303 and 304 respectively. These sprockets are journalled in frame members 305 adapted to be secured individually to the forward upright faces of main frame members 4, 5, 6 and 7. A plurality of vertically disposed spaced sheet pile guide bars 306 are supported on cross members attached to frames 4, 5, 6 and 7; the outer bars are laterally adjustable with respect to the remaining bars and are provided with outwardly extending flanges which serve to position and guide the sheet pile on the member 301. Means is provided for effecting automatic elevation of the stack supporting member 301 as successive sheets are withdrawn from the top of the pile. The elevating movement of the pile support is obviously a very slow one and is effected by the following mechanism. A countershaft 307 is journalled for rocking movement in frame members 4, 5, 6 and 7. A cam 308 keyed to shaft 23 (see Fig. 28) effects the rocking movement of shaft 307 through a cam follower roller 309 which is carried intermediate the ends of an arm 310 which is pinned to shaft 307. As the cam follower 309 raises and lowers with the contour of the cam 308, the shaft 307 is rocked. An arm 311 rockably mounted on shaft 307 (see Fig. 27) extends both upwardly and downwardly from the shaft. One end of a pawl 312 is pivotally mounted on a pin carried by the lower extremity of the arm 311. The free end of the pawl is supported on the face of a ratchet 313 which is pinned to one end of a shaft 314 journalled in a bracket 315 supported by one of the frame members 305. A bevel gear 316 (see Fig. 56) is pinned to the other end of shaft 314 and meshes with a mating gear 317 pinned on shaft 318 which is also journalled in the bracket 315. Shaft 318 is provided with a pair of worm elements 319 disposed on either side of the bracket 315. The worm elements 319 mesh with worm wheels 320 which are keyed to shafts 321 that also carry the driving sprockets 303 for chains 302. The shaft 318 is provided at its outer extremity with a hand crank 322 to provide means for rapid manual elevation of the sheet pile supporting member 301. From the foregoing description of the mechanical means for effecting movement of the elevating chains 302, it will be noted that the intermittent operation of the pawl 312 on the ratchet 313 is reduced through the worm and worm wheel 319 and 320. The elevation of the pile supporting member 301 is measured in thousandths of an inch per revolution of the power take-off shaft 23.

Mechanism for effecting the removal of successive sheets from the top of the pile is supported by and moved through the operation of a pair of shafts 323 and 324 which are journalled for rocking movement in frame members 305. The rocking movement for shaft 323 is imparted through the actuating mechanism from cam 308 (see Fig. 28) and follower 309 carried by the arm 310. The extremity of the arm 310 is provided with means for pivotally mounting one end of a connecting rod 325. The other end of rod 325 is pivotally mounted on the free end of an arm 326 which in turn is pinned to the shaft 323. A guide block 327 fixed to one of the frame members 305 serves to guide the rod 325 in its axial movement. In addition to the guiding function of the block 327, it serves as an abutment for one end of the coil spring 328 which surrounds the rod 325. A collar 329 which is adjustably secured to the rod 325 provides an abutment for the other end of the spring 328 which serves to retain the cam follower 309 in constant contact with the cam 308.

Figure 28:
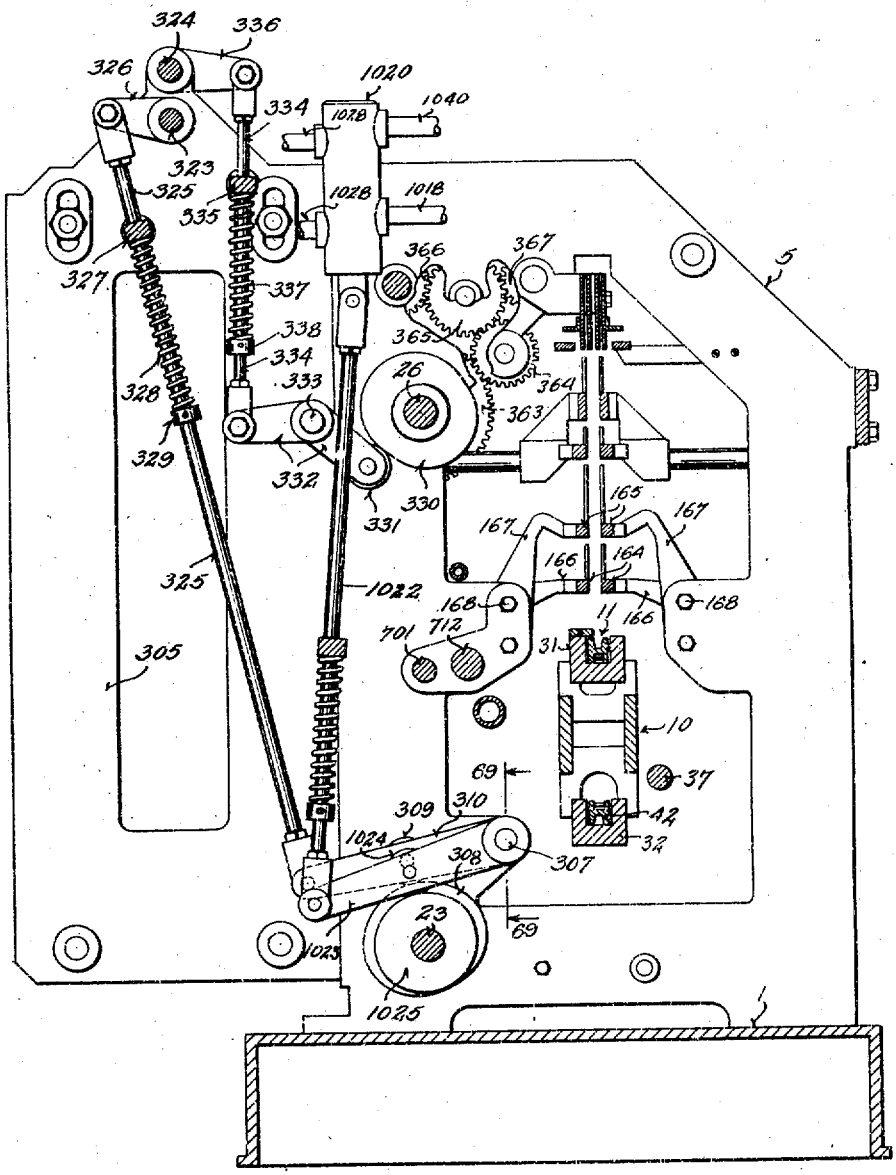
Fig. 28 is a vertical transverse sectional view on the line 28—28 of Fig. 4 looking toward the first sheet feed station.
Figure 29:
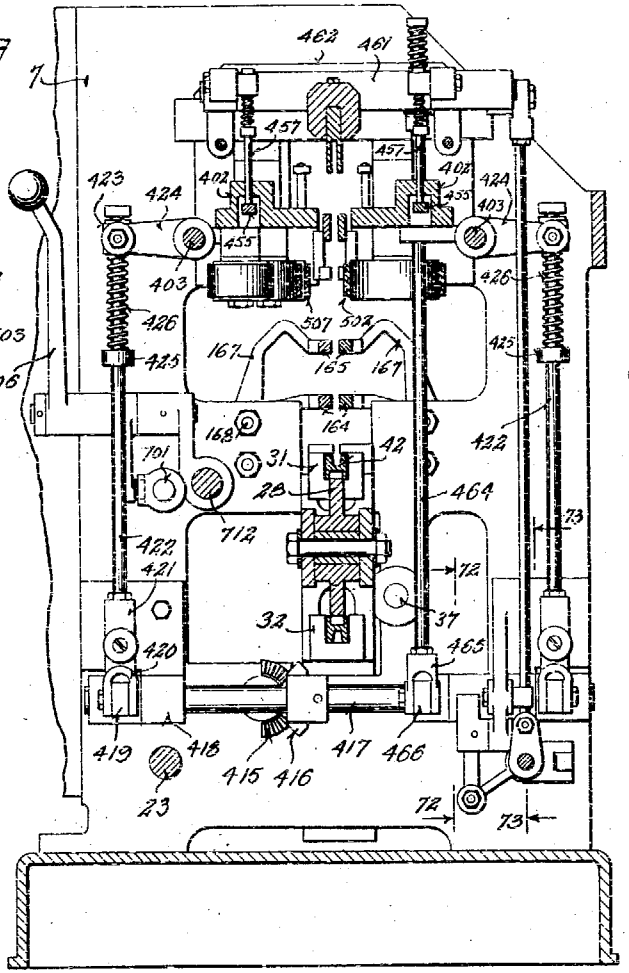
Fig. 29 is a vertical transverse sectional view taken on the line 29—29 of Fig. 5 through the gauging mechanism looking toward the second sheet feed station.
Figure 30:
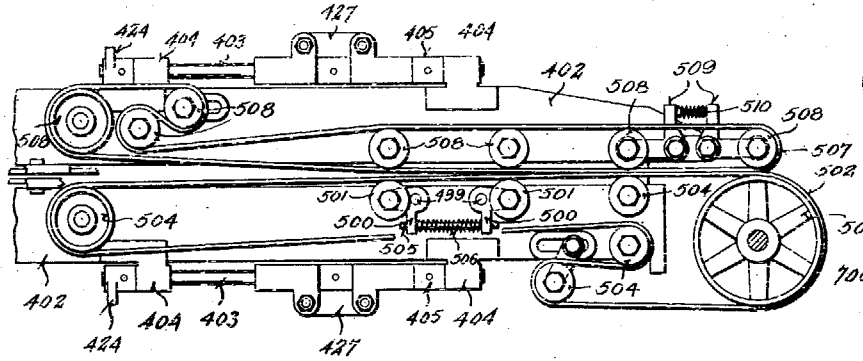
Fig. 30 is a bottom plan view of the signature conveyor belt located in the signature gauging station and taken on the line 30—30 of Fig. 8.
Figure 31:
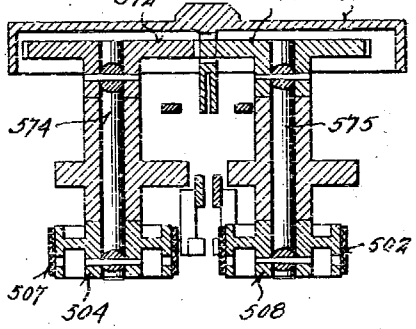
Fig. 31 is a vertical sectional detail view on the line 31—31 of Fig. 5 showing a portion of an auxiliary signature conveyor belt drive mechanism.
Figure 32:
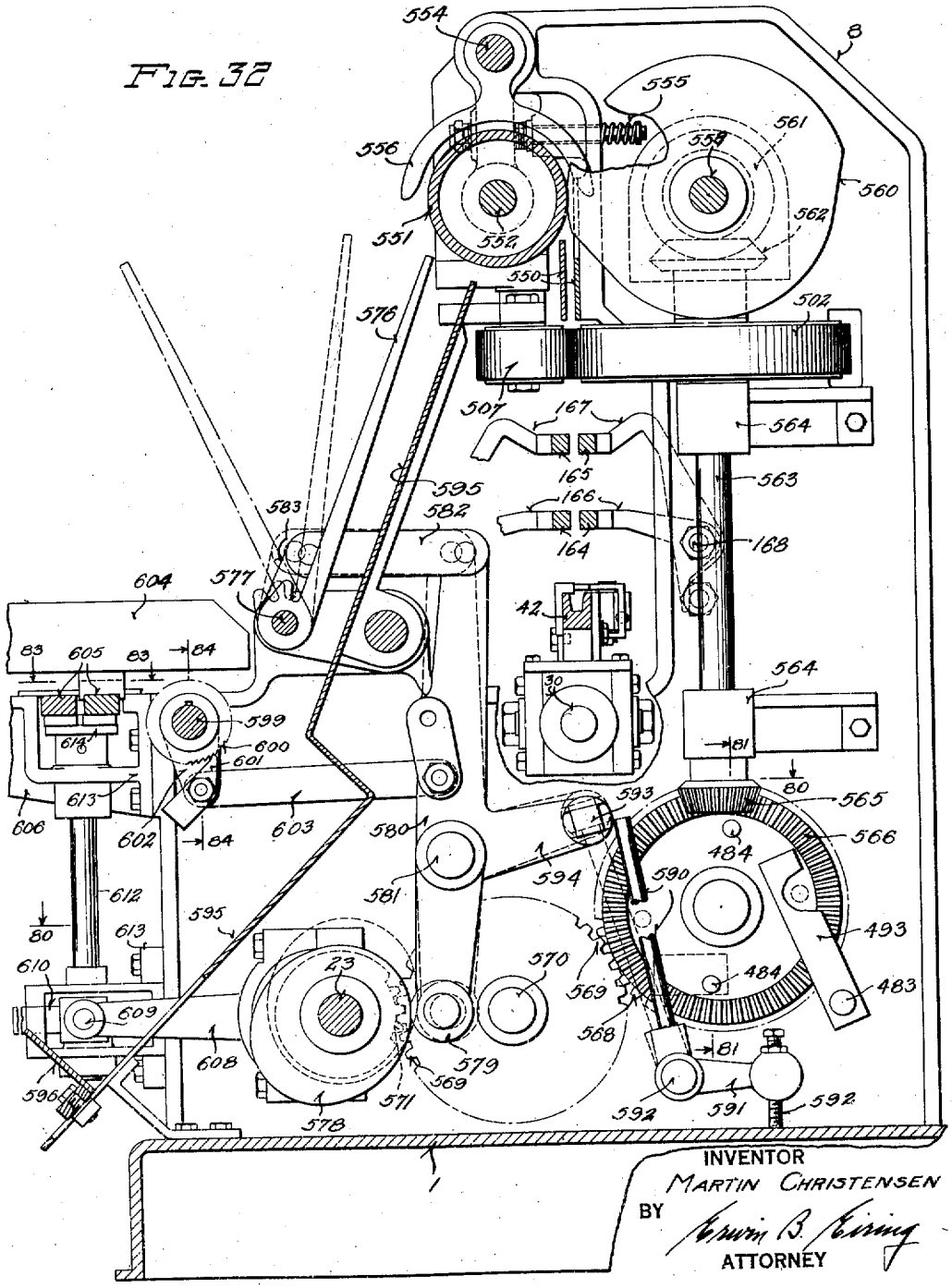
Fig. 32 is a vertical transverse sectional view on the line 32—32 of Fig. 5 through the signature discharge station looking toward the signature gauging station.
Figure 33:
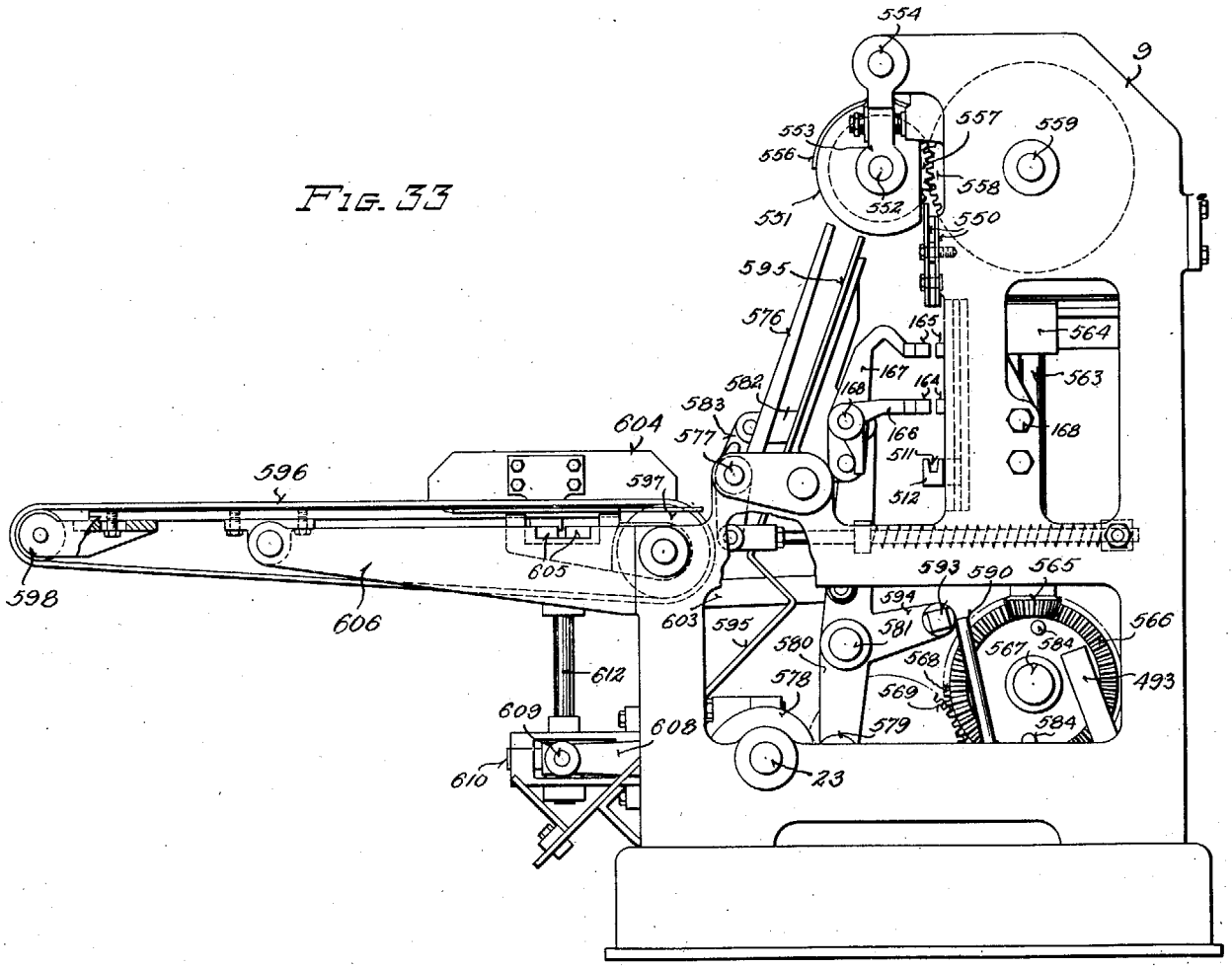
Fig. 33 is an elevational view of the signature discharge end of the machine.

The means for imparting the rocking action to the shaft 324 comprises a cam 330 fixedly mounted on power take-off shaft 26 (see Fig. 28). A cam follower 331 is rotatably mounted on one arm of a bell crank 332 which in turn is rockably mounted on a pin 333 carried by one of the frame members 305. The other arm of a bell crank 332 provides a pivotal mounting for one end of a connecting rod 334 which passes through a guide block 335 and terminates at its upper end in a pivotal mounting on the free end of an arm 336 which is pinned to shaft 324. A coil spring 337 surrounds the rod 334 and is retained between the guide block 335 and a collar 338 to provide spring urged means for retaining the follower 331 in contact with the cam 330.

The means for elevating successive sheets from the pile and transferring them forwardly to deposit them on a table portion 339 which is supported between frame members 4 and 5 or 6 and 7 comprises an arm 340 (see Fig. 27) provided with vacuum cups 341 adapted to engage the uppermost sheet and, by reason of the vacuum, elevate the sheet upon movement of the arm 340. Two separate movements are imparted to the arm 340; one, a forward and rearward movement is imparted from the shaft 323, and the other, an upward and downward movement is imparted from the rocking action of the shaft 324. The rearward end of the arm 340 is supported by a shaft 342 which is journalled in a pair of links 343 which in turn are pivotally mounted on pins carried by the lower extremity of arms 344 which in turn are pinned to the shaft 323. The rocking action of the shaft 323 imparts a rocking motion to the arm 344 which in turn moves the arm 340 forwardly and rearwardly. A connecting link 345 is pivotally attached at its lower end to the arm 340 between the shaft 342 and the vacuum means 341. The upper end of the link 345 is pivotally connected to the free end of an arm 346 which in turn is pinned to the shaft 324. Rocking motion of the shaft 324 imparts a vertical movement to the arm 346 and also to the arm 340 through the link 345. By reason of the above mentioned connections to the arm 340, it will be understood that the path of travel of the sheet engaging vacuum means describes an arcuate path in traversing its forward and rearward movement. In each instance the lowermost path of travel lies at the extremities of the forward and rearward motions. By reason of this condition it is possible to engage the uppermost sheet of the pile at the rearward end of the path of travel of the arm 340 to elevate the same from the pile when vertical movement of the arm 340 is initiated. The elevated advancing movement of the arm 340 will transfer the removed sheet from the top of the pile on the table 339 where it will be deposited at the forwardmost and downwardmost end of travel of the arm 340 (as indicated in the dotted showing Fig. 27).

Means is provided for injecting air between the uppermost sheets of the pile to assist in separating the upper sheets to facilitate the action of the vacuum cups 341 in effecting the removal of the uppermost sheet. Additional means in the form of a foot 347 is provided to resist the action of the vacuum picker means in the event of the absence of an oncoming opened signature to receive the sheet. This foot 347 extends outwardly from the uppermost end of a vertically movable bar 348 which is guided on cross bars supported by frame members 4 and 5. The weight of the bar 348 is sufficient to normally retain the foot in pressure contact with the top of the sheet pile adjacent the forward edge thereof. A counterweight 349 is slidably mounted on a rod 350 (see Fig. 10) which is pivotally mounted intermediate its ends on a pin carried by one of the bars 306. The end of the bar opposite the counterweight 349 extends beneath a pin 351 anchored in the bar 348 to normally urge the same upwardly an amount proportionate to the distance of the counterweight from the pivot pin. The counterweight is so adjusted on the rod 350 that only sufficient pressure is applied by the foot 347 to the top of the pile to retain the uppermost sheet against the action of the vacuum picker means when the bar 348 is not urged upwardly by mechanical means. The mechanical means for urging the bar 348 upwardly comprises an arm 352 pinned to the rocking countershaft 307. The free end of the arm 352 is provided with an outwardly extending ear 353 through which a bolt 354 is passed. A coil spring 355 surrounds the bolt 354 and is retained in pressure contact with an ear 356 formed on member 357 which is rockably mounted on the shaft 307. The forward end of the arm 357 is threaded to receive an adjusting screw 358 the upper end of which is adapted to contact the lower extremity of the bar 348 and urge the bar 348 and pressure foot 347 upwardly away from the sheet pile when the shaft 307 is rocked through the action of the cam 308 on the cam follower 309 and arm 310. The bolt 354 and coil spring 355 permit over-travel of the arm 352 with respect to the movement of the bar 348 by providing a suitable lost motion connection between arms 352 and 357.

After the uppermost sheet has been transferred from the pile to the table 339, it is gripped and urged forwardly by means of a pair of vacuum rolls 359 fixed on a shaft 360. Additional sheet delivery rolls 361 lie in suitable slots formed in the table 339 at the forward downwardly turned edge thereof. These rolls 361 are fixed on a shaft 362. Shafts 360 and 362 are rotated at a constant speed through a gear train comprising a gear 363 (see Fig. 53) keyed to shaft 26, an idler gear 364, a gear 465 which meshes with gears 366 and 367 carried respectively by shafts 360 and 362. The sheets are retained in contact with the feed rolls 361 by means of a pair of rubber tired rolls 368 which are rotatably mounted on a shaft 369 carried in vertically disposed slots formed in finger elements 370 which lie adjacent the table 339 to prevent the forwardly moving sheet from buckling. The finger elements 370 are secured to a sleeve 371 which is provided with a handle 372 to permit the entire assembly being swung upwardly away from the table 339 for the purpose of inspection or the removal of sheets which may come to rest on the table 339. Additional rubber tired rollers 372 serve to retain the oncoming sheets in contact with the rollers 361 and direct the forward edge thereof downwardly into a slot formed in a signature guide rail 373. These rollers 372 are pivotally mounted adjacent the lower extremity of counterweighted arms 374 which in turn are pivoted on a shaft 375 which is fixed in fingers 370. The counterweighted arms 374 retain the rollers 372 in contact with the rollers 361.

A sheet jogger mechanism is also provided to facilitate the operation of separating the uppermost sheets of the piles in each sheet feed station. This mechanism comprises a plurality of horizontally disposed bars 376 (see Fig. 27) adapted overlie the uppermost rearward edge of the sheet pile. Each bar is provided with a depending foot 377, adjustably mounted on the bar 376 and adapted to abut the rearward edge of the pile when the bars are reciprocated forwardly. These bars 376 are supported, guided, and actuated by a pair of depending arms 378 which are pivotally mounted at their upper extremity adjacent the rearward end of an arm 379 which in turn is supported at its forward end on the rock shafts 323 and 324. The means for effecting reciprocation of the bars 376 comprises an arm 380 which is pinned to the shaft 323. A connecting rod 381 is adjustably mounted at one end in a block 382 which is pivotally mounted on the free end of the arm 380. The other end of the rod 381 is of a reduced diameter adapted to be received through and guided in a block 383 which is pivotally mounted on an upwardly extending portion of one of the arms 378. The upwardly extending portion of the arm 378, last referred to, comprises a counterweight which normally tends to urge the bars 376 toward their rearwardmost position. A nut which is adjustably mounted on the reduced end of the connecting rod 381 serves to limit the movement of the rod 381 in the guide block 383 in one direction. The shoulder formed by the reduced portion of the rod serves to abut the guide block 383 to urge the bars 376 in a forward direction when the rock shaft 323 is moved in a clockwise direction (see Fig. 27). Each of the feet 377 on the rods 376 abut the rearward edge of the uppermost sheets of the pile and will cause a slight buckling action of the sheets against the vertically disposed guide bars adjacent the forward edges of the sheets when the rods 376 are urged forwardly. This slight buckling action together with the jet of air under pressure which is directed rearwardly against the forward edges of the uppermost sheets serves to insure the ready separation of the top sheet from the remaining sheets so that the vacuum cups 341 may effect the ready removal of a single topmost sheet in the pile.

The operations of the several sheet elevating, contacting and advancing means described in conjunction with the sheet feeding stations are adapted to be driven or actuated in synchronism with the advance of the opened signature along the conveyor 11. The timing of the several operations is such that the sheet is presented into the opening of the signature as it passes beneath the sheet feeding means without requiring any interruption in the continuous advance of the signature along the conveyor.

After the signature has passed through the first sheet feed station it is carried through the second sheet feed station where the identical series of operations is repeated to insert a second sheet into the second opening in the signature formed on the opposite side of the centerfold thereof. After the sheets have been inserted into the openings in the signature, the conveyor 11 advances the filled signature into the gauging or calipering station of the machine.

Caliper Station

*Figs. 1, 2, 5, 8, 11, 14, 17, 29–31, 70–79 inclusive*

*Sheets 1, 4, 7, 10, 13, 16, 24, 35–38 inclusive*

The signature caliper station comprises the fourth station of the machine and includes the mechanism lying between or supported by upright frame members 7 and 8.

The novel principle upon which the caliper mechanism functions will be stated briefly at this point prior to the detailed description of the mechanism comprising the gauging or calipering station of the machine.

The gauging mechanism is disposed at a position where the progress of each of the filled signatures is momentarily arrested. The signature has been opened at one or more places and the untouched sheets are disposed within a channel formed by a plurality of signature guide members 373. This channel terminates between the forward and rearward signature contacting elements carried upon each of the movable plates so that the forward end of the complete filled signature lies between the plates while only the outer or removed sheets together with the insets lie outside of the channels toward the rearward portion of the signature. For this reason the rearward contacts are adapted to gauge only those portions of the signature which are disposed between the channel and the signature contacting elements; while the forward signature contacts gauge the entire signature plus the inset or insets which have been introduced into the opening or openings in the signature. Suitable adjusting mechanisms, to be hereinafter more specifically described, are provided whereby the necessary adjustments may be made so that the equalizer bar on either side of the gauging mechanism will lie in a plane exactly parallel with the center line of the signature travel when the signature has been correctly opened and filled. With this condition existing the feeler mechanism is free to be introduced and removed from the sides of the equalizer bar without being impeded in its movement and the signature is therefore correctly filled and will be discharged into the group of correctly filled signatures. Should an incorrect number of sheets be withdrawn forming the opening, or should the insert be either omitted or doubled the equalizer bar will be displaced from a true parallel relationship with the center line of the signature and result in the impeding of the free travel of the feeler mechanism between a fixed abutment and a portion of the equalizer bar. The impeded movement of the feeler mechanism will indicate that the signature opening is incorrectly positioned or that the signature is incorrectly filled and transmit this finding through mechanical means, to be hereinafter more specifically described, to effect the segregated discharge of the incorrectly filled signature from those which are properly filled.

The general principle upon which this calipering or gauging mechanism is designed is one of proportional measurement. The distance between the laterally fixed and parallelly disposed adjustable signature contact elements on either side of the machine is arranged in such manner that adjustment of the movable element with respect to the fixed element can be set so that the equalizer bar on either side of the signature will remain in parallel relationship with the center line of the signature when a preselected number of signature pages and inset sheets lie between the fixed abutment and signature channel adjacent the rearward edge of the signature where the laterally adjustable signature contact element is adapted to abut and the laterally fixed signature contacting element disposed forwardly of the adjustable abutment is adapted to measure the thickness of the signature including the inset sheet or sheets. The distance between the two signature contact elements on each side of the signature is calculated mathematically for the purpose of determining the proper setup for the calipering device. For example, if the filled signature contains sixteen pages plus two insets and the number of sheets opened on one side of the center fold in the signature numbers four, the thickness of the inset sheet is added to the thickness of the four sheets which have been opened and the proportion between the thickness of the amount of the signature opened plus the thickness of one inset, to the entire thickness of the signature plus the two inset sheets can determine a proportion for the adjusted distance between the fixed and laterally movable signature contact element. This proportion will be part of the maximum distance between the fixed and adjustable signature contact element. By way of different example, let us assume that the maximum distance between signature contact elements is four inches and that the thickness of the signature plus insets is forty-thousandths of an inch and that the number of sheets removed plus the inset on one side of the center fold measures fifteen-thousandths of an inch; then the proportion required for setting up the distance between the fixed and laterally movable signature contact element will read as follows: forty is to fifteen as four is to X. The answer will be 2.66" which will represent the required distance between centers of the signature contact elements to effect proper calipering of a signature under the conditions above stated. When the distance of 2.66" has been carefully adjusted the operator is required to make additional adjustments in the lengths of the two signature contacting elements so as to maintain the parallel position between the equalizer bar and the center line of the signature so that feeler balls may be elevated to positions adjacent the sides of the equalizer bar and drop freely therefrom without having their movement impeded by frictional contact with either of the cooperating laterally disposed abutments. When this condition has been set-up one of the sides of the caliper gauge is ready for proper operation. The other side of the caliper gauge may be similarly set-up to accommodate the required conditions and the gauging device will then be ready for operation to gauge filled signatures having the same or different number of sheets removed from either or both sides of the signature.

The caliper mechanism comprises generally a pair of plates 401 (see Fig. 71) each carrying a plurality of adjustable signature contacting elements. The plates 401 are mounted for slidable movement toward and from each other on a pair of supporting castings 402 which are disposed in a horizontal plane in spaced relationship above the conveyor 11 and attached to frames 7 and 8.

For the purpose of facilitating the description of the calipering mechanism which comprises two elements which are substantially identical in structure, and perform duplicate operations on opposite sides of the filled signature, only one calipering device need be described. It is to be understood that the remaining element of the calipering device functions in the identical manner.

A rock shaft 403 is journalled in a pair of brackets 404 fixed to the casting 402 adjacent its outer edge. A pair of vertically disposed arms 405 are pinned in spaced relationship to the shaft 403. A shaft 406 is journalled in the free ends of arms 405. A pair of ears 407 which are formed integral with the plates 401 extend upwardly and outwardly from the outer edge of the plate. The ears 407 are drilled to receive the shaft 406 so that the shaft 406 forms the outer support for the plate 401. A pair of guide blocks 408 (see Fig. 74) fixed to the casting 402 beneath the plate 401 are provided with grooves 409 adapted to receive ball bearings 410 which support the inner portion of the plate 401. As previously stated, the plates 401 are horizontally disposed and movable toward and from each other. The means for effecting movement of the plates (see Fig. 71) comprises a cam 411 fixed on shaft 23 adjacent upright frame member 7 in the sheet feed station. A cam follower 412 is mounted on the free end of an arm 413 which is pinned to one end of a rock shaft 414 journalled in the frame member 7. A segmental bevel gear 415 fixed to the other end of shaft 414 meshes with a mating segmental bevel gear 416 pinned to a rockshaft 417 which lies in a horizontal plane disposed transversely of the machine and is journalled in a pair of brackets 418 carried by the frame 7. An arm 419 that extends substantially horizontally is pinned to each end of the shaft 417. The forward or free end of the arm 419 is provided with a pivotal mounting for a yoke 420 (see Fig. 8) which in turn provides a pivotal mounting for a second yoke 421. The lower extremity of a connecting rod 422 is provided with screw threads and a jam nut to permit receipt in and adjustment with respect to the yoke 421. The upper extremity of the rod 422 passes through a guide block 423 pivotally mounted on the free end of an arm 424 pinned to the shaft 403. The rod 422 is provided with a lost motion connection in a form of a collar 425 adjustably mounted on the rod 422. A coil spring 426 surrounds the rod 422 and lies between the collar 425 and the guide block 423 to provide a resilient connection through which movement of the rock shaft 417 is imparted to the shaft 403. Movement of the shaft 403 is transmitted to the plate 401 through an ear 427 (see Fig. 74) formed on a collar 428 pinned to the shaft 403. The ear 427 is threaded to receive and support a bolt 430 which extends through an ear 431 formed on the arm 405. A coil spring 432 forms a lost motion connection in one direction between ears 427 and 431 since it lies between the head of the bolt 430 and the upper surface of the ear 431. It will be noted that the plate 401 is urged inwardly as the cam follower 412 follows a rise of the cam 411. This movement imparts a partial rotation to the shaft 414 which is transmitted through bevel gears 415 and 416 to the shaft 417 thence through arms 419, rods 422, coil springs 426, to cause the arms 424 to rock upwardly which movement urges the arms 405 inwardly through contact between the ears 427 and 431. The inward movement of the arms 405 is limited by contact between the rod 406 and adjustable limit screws 406' (see Fig. 79) in bosses formed on the members 402. Ball bearings 410 which support the inner portion of the plate 401 provide an anti-friction bearing on which the plate 401 is free to move.

A signature contacting element 433 (see Fig. 78) is slidably mounted for horizontal movement in an upstanding ear 434 formed along the inner side and adjacent the forward end of the plate 401. A tail rod 435 is journalled for axial movement in an ear 436 formed integral with the plate 401. The forward end of the rod 435 is threaded for receipt in the signature contacting element 433 and is provided with a hexagonal portion 437 to facilitate adjustment in the signature contacting element 433. A jam nut 438 serves to lock the rod 435 in adjusted position with the signature contacting element 433. An auxiliary plate 439 (see Fig. 74) which is mounted for lateral adjustment with respect to the signature contacting element 433 on the plate 401 carries a second signature contacting element 440 which is slidably mounted in an upstanding ear adjacent the forward edge of the plate 439. The element 440 is provided with a tail rod 441 which is similar in all respects to rod 435 previously described. The rearward extremities of each of the rods 435 and 441 abut the forward side of an equalizer bar 442 retained against longitudinal movement by a block 443 (see Fig. 75) receivable in a groove 444 formed in the bar 442. The block 443 is retained in a slotted portion of an upstanding lug 445 formed integral with the plate 401 and lug 445 is also slotted to receive the equalizer bar 442 to permit lateral movement of the same. A spring urged ball 446 (see Fig. 76) housed within a sleeve fixed in the equalizer bar between rods 435 and 441 abuts the shaft 406 to normally urge the equalizer bar away from the shaft 406 to retain the signature contacting elements in their forwardmost position. One end of the bar 442 is guided upon and supported by an ear 447 also formed on the plate 401. The other end of the equalizer bar 442 is provided with an extended tongue portion 448 (see Fig. 76). A pair of ears extend outwardly from either side of the bar 442 adjacent the tongue 448. A pair of feeler balls 449 are freely movable in vertically disposed drilled holes 450 formed in the plate 401 and disposed beneath the equalizer bar 442 adjacent each side of the tongue 448 thereof. The balls 449 are moved upwardly intermittently to a position where they lie adjacent the side surfaces of the tongue 448 on the equalizer bar 442. A guide block 451 secured to the plate 401 is provided with a pair of vertically disposed wall surfaces 452 rising from the outer side wall of the drilled holes 450. A second pair of surfaces 453 disposed at right angles to surfaces 452 cooperate with the last named faces to provide two surfaces for retaining the elevated ball against lateral or transverse movement. The two other cooperating surfaces are those formed on the outer sides of the tongue 448 and the adjacent ear surfaces of the bar 442. The means for elevating the balls 449 comprise a pair of push rods 454 (see Fig. 75) which extend upwardly through the drilled holes 450. These rods are provided at their lower extremity with head portions adapted to rest upon the top surface of an arm 455 rockably mounted intermediate its ends on a pin 456 secured in the casting 402. The other end of the arm 455 supports a push rod 457 guided for vertical movement through a block 458 rockably mounted on one extremity of a bell crank 459 pivotally mounted on a shaft 460 journalled in a bracket 461 formed integral with a hood element 462. Another horizontally disposed arm 463 of the bell crank extends rearwardly and is provided with pivotal mounting means for the upper extremity of a connecting rod 464 (see Fig. 71). The lower extremity of the rod 464 is in screw threaded engagement with a yoke 465 pivotally mounted on the free end of an arm 466 which in turn is pinned to the rock shaft 417. The rocking movement of the shaft 417 is transmitted through the arm 466, rod 464, arm 463, bell crank arm 459 thence through the coil spring 467 which surrounds the push rod 457 and lies between the guide block 458 and collar 468 to urge the rod downwardly to effect a rocking action of the arm 455 and urge the pins 454 upwardly to effect the elevating movement of the balls 449 to a position where they are disposed adjacent the lateral sides of the tongue 448 and between these surfaces and the vertically disposed walls 452 which lie substantially parallel to the equalizer bar 442. In the event that the equalizer bar has assumed a position which is parallel to the centerline of the path of travel of the signature, the balls 449 will drop freely when the rods 454 which are loosely fitted in the holes 450 are lowered in response to a rocking movement of the bell crank 459 in the direction opposite to that which actuated the rods upwardly. In order to facilitate the downward movement of the balls 449, a pair of pawls 469 (see Fig. 75) are provided with feet 470 adapted to contact the top surface of the balls 449. The pawls are provided with a notch 471 adjacent their forward extremity to provide an abutment for a control mechanism to be hereinafter more specifically described. Additional means in the form of an arm 472 is provided to retain the pawls 469 in contact with the upper surface of the balls 449. The arm 472 is pivoted at its rearward end to a horizontally disposed pin and carries a plurality of discs 473 for counterweights which lie above the forward end of the arm which terminates in a foot adapted to lie in contact with the upper edge of the pawl 469 forwardly of its pivot point. The bell crank 459 is provided with a depending arm 474 which serves to actuate a rod 475 journalled in ears 497 of the plate 401. A coil spring 476 lies between one of the ears 497 and an adjustable collar 477 serves to normally urge the rod 475 into contact with the face of the arm 474. A block 478 pinned to the rod 475 lies adjacent and above the notch 471 formed on the pawl 469. As the balls 449 are moved upwardly under action of the bell crank 459 the rod 475 is retracted to a position which permits the pawls to be moved upwardly. As the bell crank 459 moves in the opposite direction the block 478 and the rod 475 moves forwardly toward the pawls 469. In the event that either pawl has remained in its elevated position due to a binding action between the ball 449 and the side wall of the tongue 448 and face 452, the block will engage the elevated portion of the pawl and preclude further movement of the rod 475. This limited movement of the rod 475 indicates that the signature being calipered has been incorrectly filled and therefore should be segregated from those which are properly filled. The limited movement of the rod 475 is transmitted to a counterweighted arm 479 (see Figs. 72 and 73) which engages an abutment 480 carried by a rod 481 secured in an arm 482 pinned to a control rod 483. An arm 484 also formed on the bell crank 459 provides a pivotal mounting for the upper extremity of a connecting rod 485 journalled adjacent its lower extremity in a guide block 486 secured to the extended portion of the bracket 418. The lower extremity of the rod 485 overlies the forward portion 487 of the counterweighted arm 479.

A depending arm 488 pinned to the rock shaft 417 provides a means for actuating the control rod 483 through contact with an adjusting screw 489 which is carried by the outer extremity of an arm 490 pinned to the control rod 483. A coil spring 491 surrounds the control rod 483 (see Fig. 11) and abuts the frame member 8 and an adjustable collar 492 to normally urge the control rod and adjusting screw against the free end of the arm 488. The forward end of the control rod 483 carries an arm 493 which serves to actuate means for effecting segregation of the improperly filled signatures from those which are properly filled. As the shaft 417 rocks to effect the above mentioned caliper movements it also urges the control rod 483 forwardly. When the urging pressure of the lever 488 is removed the spring 491 urges the control shaft 483 back toward its normal position. In the event that one or more of the feeler balls have been retained between the tongue 448 of the equalizer bar 442 and the adjacent walls 452 of the block 451; the arm 487 and the counterweight 479 will remain in an elevated position such that the forward end of the same will engage the shoulder 480 formed on the member 481 and limit the rearward movement of the control rod 483.

The caliper mechanism is provided with means for establishing frictional contact between a pair of running belts and the stationary calipered signature to effect its removal from the caliper station and its delivery into the signature discharge station. Frictional driving contact between the running belts and the signature is effected, after completion of the signature calipering operation, by the action of the mechanism which effects the withdrawal or rearward movement of caliper supporting plate 401 away from the calipered signature. An arm 494 (see Figs. 71 and 79) pinned to the shaft 403 is provided with pivotal means at its upper extremity to support a block 495 provided with a pair of threaded apertures to receive a pair of push rods 496 journalled for sliding movement in an ear 497 formed integral with the casting 402. The free extremity of each rod 496 lies in abutting relationship with an arm 498 pinned respectively to one of a pair of stub shafts 499 lying on opposite sides of the rods 496. A bell crank 500 (see Fig. 30) is pinned to the lower extremity of each shaft 499 which lies beneath the casting 402 and adjacent the path of travel of the signature. One arm of each ball crank carries an idler roller 501 adapted to engage the surface of a belt 502 which is trained about a driving pulley 503 and a plurality of idler pulleys 504. One of said idler pulleys is adjustably mounted to provide a means for maintaining the belt 502 taut. The other arm of each bell crank 500 is provided with an aperture adapted to receive a tie rod 505 which supports a coil spring 506 between the last mentioned arms of the bell cranks 500 to normally urge them apart which results in the application of pressure against the inner run of the belt 502 to urge it toward the inner run of a belt 507 trained about a plurality of idler pulleys 508. One of the pulleys 508 is adjustably mounted to provide a means for taking up slack in the belt 507 and a pair of pulleys 508 are mounted on bell cranks 509, the parallel arms of which are urged apart by the action of a coil spring 510 retained therebetween. The pressure of the coil spring serves to retain a portion of the run of the belt 507 in frictional contact with a similar portion of belt 502. It will be noted that a space is provided between belts 502 and 507 at the end of their runs where the signature is admitted into the calipering station so that the signature may remain at rest during the calipering operation of the same.

Upon completion of the calipering operation, when the plate 401 moves away from the signature, the shaft 403 effects the rocking action of the arm 494 to release pressure between the rods 496 and arms 498 carried by the shaft 499. The releasing of this pressure results in the movement of idler pulleys 501 and belt 502 toward the belt 507 through action of the coil spring 506 against the parallel arms of the bell cranks 500. The movement of the belt 502 toward the belt 507 results in the engagement of the signature between the belts to cause it to be carried forwardly into the signature discharge station along a groove 511 formed in a guide bar 512 which extends through the signature discharge station and is supported on an extension of the conveyor frame 10.

When the next succeeding signature is advanced to calipering position in the caliper station the plates 401 are moved inwardly, at which time the pressure of the spring 506 is overcome by action of the push rods 496 and associated mechanism which results in the retraction of the idler pulleys 501 and belt 502 from abutting relationship with the belt 507 thereby forming an opening between the belts of sufficient size to permit them to run freely out of contact with a stationary signature.

SIGNATURE DISCHARGE STATION

*Figs. 1, 2, 5, 8, 11, 14, 17, 32, 33, 80–84 inclusive Sheets 1, 4, 7, 10, 13, 16, 25, 26 and 39 inclusive*

The signature discharge station comprises the fifth and last station of the machine and includes the mechanism lying between or supported by upright frame members 8 and 9.

As the signature is delivered into the signature discharge station by belts 502 and 507, it lies in an upright position between guide bars 164, 165 (see Fig. 32) and additional guide plates 550 spaced apart to support the upper portion of the signature. The upper portion of the signature lies adjacent a discharge drum 551 mounted on a shaft 552 journalled in the lower extremity of arms 553 which are pivotally mounted on a shaft 554 fixed in the upright frame members 8 and 9. The drum 551 is urged toward the signature by the action of coil springs 555 on the arms 553. A plurality of signature guide fingers 556 are adjustably mounted on the shaft 554. The guide fingers are provided with arcuate surfaces which lie adjacent the drum 551 to form a passageway through which the signature is guided under the action of the discharge drum 551. The shaft 552 is provided with a spur gear 557 driven from a spur gear 558 mounted on a shaft 559 which lies parallel to the shaft 552. The extremities of shaft 559 are journalled in upright frame members 8 and 9. Shaft 559 carries a plurality of signature engaging discs 560 adapted, during a portion of their rotation, to engage the signature in cooperation with discharge drum 551 to elevate the signature from the conveyor groove 511 and urge it over the drum 551. A bevel gear 561 secured to shaft 559 meshes with a mating bevel gear 562 fixedly mounted on the upper extremity of a vertically disposed drive shaft 563 journalled for rotation in a pair of brackets 564 secured to upright frame member 8. The driving pulley 503, previously referred to, which drives the belt 502 is also secured to the shaft 563. A bevel gear 565 mounted on a lower extremity of a shaft 563 meshes with a mating gear 566 mounted on a stub shaft 567 also carried by the upright frame member 8. The bevel gear 566 includes an extended portion in the form of a spur gear 568. An idler gear 569 rotatably mounted on a pin 570 carried by upright frame member 8 also meshes with a spur gear 571 keyed to the power take-off shafts 23. It will be noted from the foregoing that the spur gear 571 on power take-off shaft 23 provides the power for effecting movement of the discharge drum 551, cooperating discharge discs 560, and belts 502 and 507, the adjacent runs of which move in the same direction by reason of the provision of a pair of mating spur gears 572 and 573 secured to the upper extremities of shafts 574 and 575 (see Fig. 31) which carry driven pulleys 504 and 508 respectively.

As the signature is carried over the top of the drum 551 it is guided by fingers 556 and discharged in a downward direction. When the signature is discharged from the drum it is either received or rejected by a rockable delivery fly mechanism (see Fig. 32) in accordance with the position assumed by the fly mechanism. The fly mechanism comprises a plurality of upwardly extending fingers 576 adjustably secured in spaced relationship on a rock shaft 577 journalled in upright frame members 8 and 9. Movement of the rock shaft 577 is imparted through a cam 578 keyed to power take-off shaft 23. A cam follower roller 579 is mounted on a lower free end of an arm 580 supported by a pin 581 secured in the upright frame member 8. The upper extremity of the arm 580 is provided with a pivotal connection for one end of a connecting link 582. The other end of the link 582 is pivotally connected to the free end of an arm 583 pinned to the rock shaft 577. As the cam follower 579 is moved by contact with the cam 578, motion is imparted to the link 582 through the arm 580. This motion is transmitted to arm 583 to impart a rocking action to the shaft 577 on which the fingers 576 are secured. The amount of throw of the fingers 576 determines whether or not they will lie beneath the signature delivery drum 551 when the signature is discharged therefrom. In the event that an improperly filled signature is about to be discharged from the drum 551, the throw of the fly fingers 576 is materially reduced by the operation of mechanism under control of the equalizer bars 442 so that the signature will fall on a plate behind the fingers and be thereby segregated from the properly filled signatures.

As previously described, an improperly filled signature will result in the retention of a feeler ball 449 between the tongue 448 of the equalizer bar and a face 452 formed on the block 451 as a result of the equalizer bar lying in non-parallel relationship with the center line of the calipered signature. The failure of the ball 449 to drop freely results in the abutment of the forward end 487 of the counterweighted lever 479 with a shoulder 480 (see Fig. 11) formed on the rod 481 secured to the control shaft 483 by means of an arm 482. The abutting relationship between the arm 487 and the shoulder 480 prevents the control shaft 483 from assuming its normally retracted position under action of the coil spring 491. The impeded movement of the control shaft 483 also prevents the arm 493 carried thereby from engaging a pin 584 to move the same into its inner extreme position in the casting which forms the body of bevel gear 566 and spur gear 568. A pair of pins 584 are received in diametrically opposite horizontally disposed bores 585 (see Fig. 81) in the gear member. The pins 584 are of such length that they normally extend beyond both sides of the gear element. The pins 584 are each provided with a pair of grooves 586 adapted to receive a spring urged detent member 587 to normally retain the pins in one or the other of their extreme positions. A cam element 588 lying between one face of the gear member and the upright frame member 8 is secured to the latter member in such position that the face 589 thereof abuts the inner extremity of each pin 584 to urge the same to its outer extreme position as it passes the cam. The cam is located below the center of the gear so that the pin 584 is in its outer extreme position as it passes beneath the arm 493 carried by the control shaft 483. Movement of the control rod 483 is synchronized with the rotation of the last named gear element so that the pin 584 lies in the path of travel of the arm 493 as the arm 493 and rod 483 are normally urged to retracted position by action of the coil spring 491. In the event that an improperly filled signature lies in the caliper station at the time the extended pin 584 passes beneath the arm 493, the limited movement of the arm 493, by reason of the abutting relationship between the arm 487 the shoulder 480, will not move the pin 584 from its outer extreme position as it continues to revolve with the gear element. As the extended pin reaches a position substantially opposite that of the arm 493 it will contact the surface of an arm 590 secured at its lower end in a counterweighted bell crank 591 (see Fig. 32) pivoted on a pin 592 carried by the upright frame member 8. The weighted end of the bell crank 591 is provided with an adjusting screw 592 adapted to contact the surface of the base 1 to limit its rocking movement in one direction so as to insure positioning of the arm 590 in the path of travel of pins 584 when they lie in their outer extreme position. As the extended pin 584 contacts the surface of the arm 590 it is urged forwardly to a position where it will lie beneath a block 593 secured to an outwardly extending portion 594 on the arm 580. As the arm 580 is rocked by action of the cam follower 579, on the cam 578, the block 593 will be engaged by the upper extremity of the arm 590 to prevent continued rocking movement of the arm 580. This abutting relationship between arm 590 and block 593 will prevent further forward movement of the cam follower 579 and therefore cut down the throw of the rock shaft 577 to such an extent that movement of the fly fingers 576 will be terminated prior to the time that they lie beneath the signature delivery drum 551. By reason of this condition, the signature will fall freely from the delivery drum 551 on to a plate 595 and slide downwardly against a plate which retains the signature to eventually form a stack of rejected or improperly filled signatures.

In the event that the signature in the caliper station has been properly filled the arm 493 is urged to its retracted position under the action of coil spring 491 and the extended pin 584 is urged into its retracted, or inner extreme position under the action of the arm 493. The retracted pin, upon further rotation of the gear element, passes freely beneath the arm 590 so that complete movement of the arm 580 under action of the cam 578 and cam follower 579 may be had. The completed movement of the arm 580 will result in the positioning of the fly fingers 576 beneath the delivery drum 551 in a position to receive a properly filled signature. As the signature fly is rocked forwardly under action of the cam 578 the properly filled signature supported thereon will be discharged on to a plurality of belt elements 596 (see Fig. 33) which form the supporting surfaces for properly filled signatures. Discharge belts 596 are trained about a plurality of driving pulleys 597 and idler pulleys 598 which are adjustably secured on a shaft 599. A ratchet element 600 (see Fig. 32) is also secured to the shaft 599 and provides a means for imparting intermittent movement to the belts 596 through the action of a pawl 601 pivotally mounted on one end of an arm 602 journalled for rocking movement on the shaft 599. A connecting link 603 is secured at one end to the arm 602 and its other end is rockably mounted on a pin on the arm 580. As the arm 580 rocks under the action of the cam 578, reciprocating motion is imparted to the arm 602. As the arm travels in one direction the pawl will slide freely over the ratchet teeth while movement in the other direction will effect a partial rotation of the shaft 599 and therefore advance the belts 596 a sufficient distance to fan the discharged properly filled signatures. A jogging mechanism is also provided adjacent the belts 596 to insure proper alignment of the discharged signatures. This jogging mechanism comprises a pair of signature contacting plates 604 adjustably secured to independent supporting bars 605. Bars 605 are journalled for reciprocating movement in forwardly extending arms 606 secured to upright frame members 8 and 9. An eccentric 607 (see Fig. 80) is secured to the power take-off shaft 23. One end of an arm 608 surrounds the eccentric and the other end thereof is rockably mounted on a pin 609 which is secured to a rack element 610. A pinion 611 is secured to the lower extremity of a shaft 612 journalled for rocking movement in a bracket formed integral with arms 606 and a bracket 613 secured to the upright frame member 8. The upper extremity of the shaft 612 (see Fig. 83) supports a member 614 provided with a pair of laterally disposed arms each carrying a pin 615. One end of connecting links 616 is receivable on each of the pins 615 while the other end of each link is receivable on a pin 617 carried by each bar 605. As the eccentric 607 rotates with power take-off shaft 23 the rack 610 is reciprocated under action of the arm 608. This reciprocating movement of the rack imparts a rocking movement to the shaft 612 which effects reciprocation of the bars 605 in opposite directions through member 614 and links 616. The signature contacting jogger elements 604 are adjustably positioned on bars 605 so that the distance between them in their innermost position is slightly less than the length of the signature. As the jogger elements reciprocate toward and from each other, ends of signatures lying between them are engaged to effect alignment of the discharged signatures on the delivery belts 596.

Pneumatically Controlled Automatic Mechanical Clutch Throw-Out Mechanism

*Figs. 2, 7, 85–89 inclusive*

*Sheets 1, 6, 40–41 inclusive*

Pneumatically controlled automatic mechanical clutch throw-out mechanism is provided for the purpose of insuring prompt interruption of the machine operation upon failure of proper advance of the signatures through the machine. The mechanical structure required to accomplish this end (see Fig. 85) comprises mechanism associated with the power take-off shaft 23 and also a clutch actuating shaft 701. A pair of cams 702 and 703 are secured to the power take-off shaft 23 adjacent the upright frame member 4 of the machine. The cams 702 and 703 are single lobed cams disposed oppositely on the power take-off shaft 23. The opposite disposition of the cams 702 and 703 provides means for interrupting operation of the machine by disengaging the clutch 20 within a half revolution of the shaft 23.

Since the mechanism actuated by each cam 702 and 703 is identical in structure and mode of operation, like numbers are applied to similar elements and the operation of only one of the mechanisms will be described. It is to be understood that the other functions in an identical manner save for the difference in phase relationship which is 180° or one-half revolution of the shaft 23.

The clutch actuating shaft 701 (see Figs. 2 and 85) is journalled for axial movement in upright frame members 2, 3, 4, 5 and 6. A clutch actuating arm 704 pinned to the shaft 701 extends downwardly into a groove in a clutch actuating spool 705 mounted on clutch shaft 18. The shaft 701 may be actuated from either of two operating handles 706 positioned respectively adjacent frame members 2 and 7. Handles 706 are each provided with a depending arm 707 which carries a slide block 708. The slide block 708 (see Fig. 21) is adapted to be received in a slot formed in a shaft actuating collar 709 which is pinned to the clutch actuating shaft 701. The supporting means for the rockable handle element 706 comprises a shaft 710 which is fixedly mounted in a stationary bracket 711 supported on a tie rod 712. As handle 706 is rocked in a clockwise direction the clutch actuating shaft 701 moves to the left to effect clutch engagement through the action of the spool 705 upon a finger 713 (see Fig. 35) pinned to a shaft 714 rockably mounted in a bore 715 in the element 716 of the clutch keyed to the clutch shaft 19. The inner end of the shaft 714 is rectangular in contour (see Fig. 36) and lies between faces 717 formed on the ends of a clutch ring 718. As the finger 713 is rocked outwardly by action of the spool 705, the shaft 714 is also rocked. The rocking action of the shaft 714 effects the spread of the clutch ring 718 to contact with a cylindrical wall 719 formed on the driven gear 18. The frictional contact between the ring 718 and the surface 719 comprises the clutching operation so that the gear 18 and element 716 of the clutch rotate as a unit to drive the shaft 19. The clutch actuating shaft 701 is retained in clutch engaging position by the action of a plate 720 (see Fig. 85) fulcrumed on a pin 721 journalled in a bracket 722 fixed to the tie rod 712. The forward portion of the plate is provided with a depending lug 723 which drops into abutting relationship with a shoulder 724 formed on a block 725 pinned to the shaft 701. Coil spring 726 surrounding the rod 701 (see Fig. 6) is retained between a fixed abutment 727 through which the shaft 701 passes and an adjustable collar 728 to normally urge the clutch actuating shaft 701 to a declutching position. The abutment between the lug 723 and the face 724 of the block 725 precludes the normal action of the spring 726 when the plate 720 is in the position shown in Fig. 85. Manually operable means in the form of a handle 729 is provided extending from the forward portion of the plate 720. In the event that it is desired to stop the machine manually, this action may be effected by lifting the handle 729 to a position where the lug 723 is freed from contact with the shoulder 724 on the block 725. The moment that the lug 723 is freed from contact with the shoulder 724, the coil spring 726 will effect the declutching movement of the clutch actuating shaft 701.

Figures 85, 86:
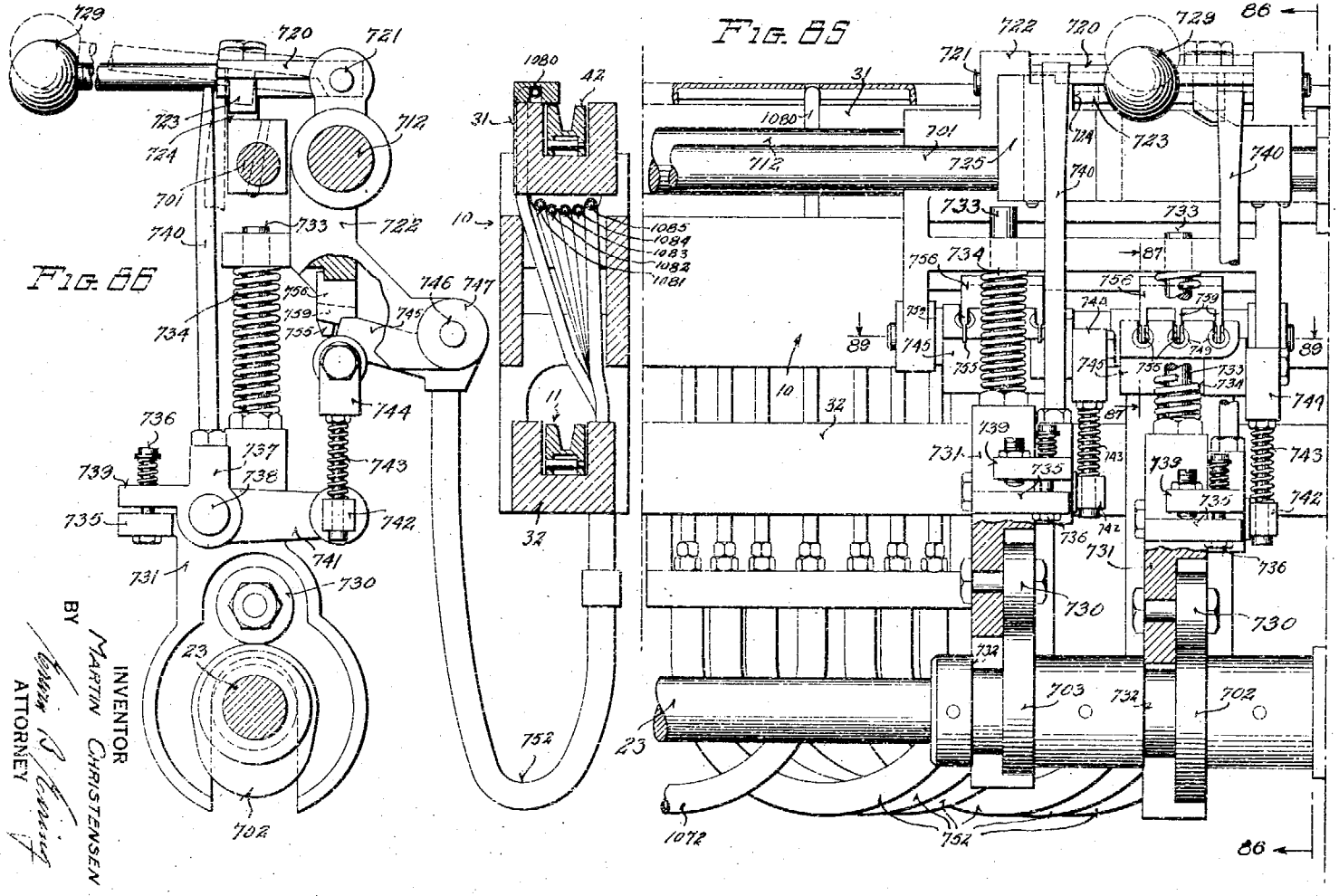
Fig. 85 is an elevational view of the pneumatically operated automatic clutch throwout mechanism.
Fig. 86 is a vertical sectional view on the line 86—86 of Fig. 85 showing a portion of the pneumatically operated automatic clutch throwout mechanism.
Figure 87:
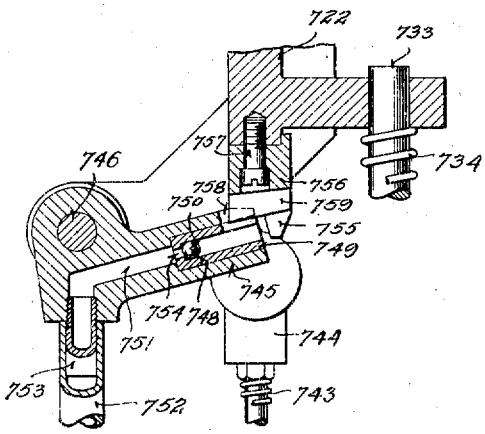
Fig. 87 is an enlarged vertical sectional view on the line 87—87 of Fig. 85 showing a pneumatically actuated ball element in inactive position.
Figure 88:
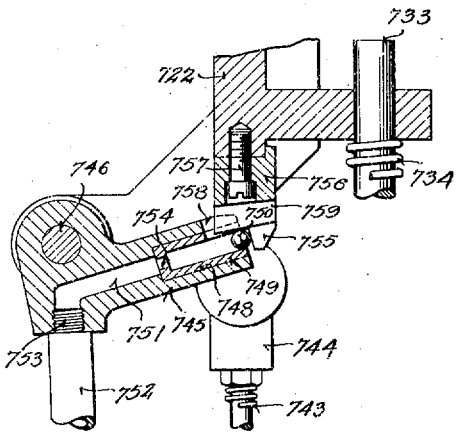
Fig. 88 is a vertical sectional view similar to Fig. 87 showing a pneumatically actuated ball in operative position wherein the clutch mechanism is automatically disengaged as a result of the absence of the signature in proper position along the conveyor.
Figure 89:
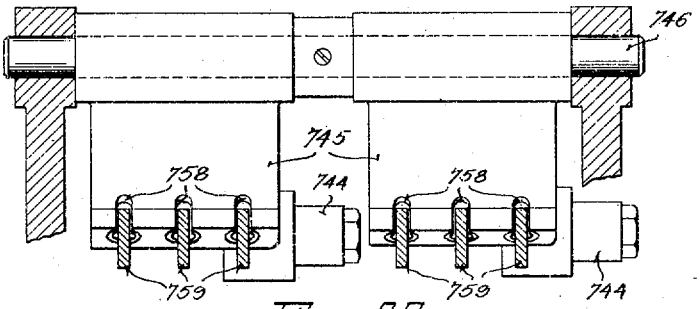
Fig. 89 is a horizontal sectional view on the line 89—89 of Fig. 85 showing the pair of movable ball retaining members and the stationary abutments disposed above the ball retaining members in a position such that the movement of a ball beneath the stationary elements will preclude movement of the ball retaining elements.
Figure 90:
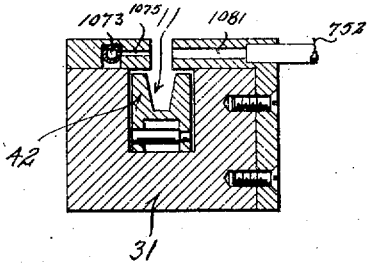
Fig. 90 is an enlarged vertical sectional view on the line 90—90 of Fig. 10 showing an air gap across the conveyor, the air gap being one of several which are associated with and control the pneumatically operated automatic clutch throwout mechanism.

The automatic means for effecting the declutching operation comprises means actuated by the cams 702 and 703 (see Fig. 85). This mechanism includes a cam follower 730 mounted in a vertically movable supporting bracket 731. The lower extremity of the bracket 731 is bifurcated to span a groove 732 formed adjacent the cam 702. The upper extremity of the bracket comprises the rod 733 which is guided for vertical movement in the bracket 722. A coil spring 734 surrounds the rod 733 and lies between a portion of the bracket 722 and the upper surface of the bracket 731 to urge the same downwardly to retain contact between the cam follower 730 and the cam 702. The bracket 731 is provided with an outwardly extending ear 735 which is screw threaded to receive an upstanding bolt 736. An arm 737 is rockably mounted on a pin 738 carried by the bracket 731. The arm 737 includes an extended ear 739 through which the bolt 736 is free to pass. A coil spring surrounds the bolt 736 and abuts the head of the bolt and the upper surface of the ear 739 to urge the ear 739 toward the ear 735 formed on the bracket 731. The arm 737 is provided with an upwardly extending portion adapted to receive and retain a push rod 740 which extends upwardly to a position adjacent the forward edge of the plate 720. The arm 737 is further provided with a rearwardly extended portion 741 which carries a pivotally mounted pressure block 742. A bolt 743 is passed through an opening in the block 742 and has its upper end threaded into a yoke 744 which is pivotally mounted on the forward free end of an arm 745. The other end of the arm 745 is rockably mounted on a pin 746 carried by an ear 747 extending rearwardly from the bracket 722. The arm 745 is provided with three parallel angularly disposed bores 748 each adapted to receive a cylindrical sleeve 749 within which a ball bearing 750 is retained. The bore 748 is provided with a reduced portion 751 (see Fig. 87) which forms a conduit for air under pressure delivered from flexible rubber hose 752 through a fitting 753 threadedly received in the mouth of the passage 751. A passage 754 is drilled through one end of the sleeve 749 to permit the admission of air under pressure into the sleeve to force the ball 750 upwardly and outwardly. The ball 750 is retained in the sleeve 749 through contact with an ear 755 formed on a block 756 anchored on the bracket 722 by means of cap screws 757. A slot 758 is cut through the forward uppermost portion of the arm 745 and the sleeve 749 so that a vertically disposed depending web 759 carried by the block 756 may be admitted into the bore within which the ball 750 is movable when the lobe of the cam 702 is rotated to its uppermost position wherein the bracket 731 is elevated through action of the cam follower 730. As the bracket 731 is elevated the arm 737 and associated mechanism is also elevated. The elevation of the arm 737 results in the upward movement of the rod 743 which effects an upward rocking of the arm 745 on the pin 746. This upward rocking action of the arm 745 results in the introduction of the web 759 into the bore of the sleeve 749 in which the ball 750 is located. In the event that the signatures carried by the conveyor 11 are progressing normally, the air supply to the flexible rubber hose 735 is cut off so that gravity will retain the ball 750 in its lowermost position in the bore of sleeve 749 as shown in Fig. 87. When this condition exists the elevation of the bracket 731 and associated mechanism will be an idle movement. However, should a signature fail to block the supply of air to the flexible rubber conduit 752, the ball 750 will be urged outwardly under air pressure to the position shown in Fig. 88 wherein the upward movement of the arm 745 is impeded by the presence of the ball 750 between the bore in the sleeve 749 and the depending web 759 carried by the bracket 722. The impeded movement of the arm 745 results in the fixing of the rearward end of the arms 741 so that continued elevation of the bracket 731 will effect an inward movement of the upper extremity of the rod 740 to a position where it lies under the lower surface of the plate 720. Continued upward movement of the bracket 731 under action of the cam follower 730 results in the raising of the plate 720 under action of the rod 740 to a position wherein the lug 723 is elevated beyond its blocking contact with the shoulder 724 formed on the bracket 725 pinned to the clutch actuating shaft 701. The instant the contact between the lug 723 and the shoulder 724 is broken, the coil spring 726 will effect a retraction of the clutch actuating shaft 701 to disengage the clutch and stop the machine instantly.

While only one of the fluid pressure actuated ball mechanisms has been described it will be understood that a plurality of these mechanisms are provided at spaced intervals along the signature conveyor so that failure of proper signature progress at widely spaced points along the machine will result in the prompt operation of the above described mechanism to cut off driving power to the machine.

Air Circuits

Figure 92:
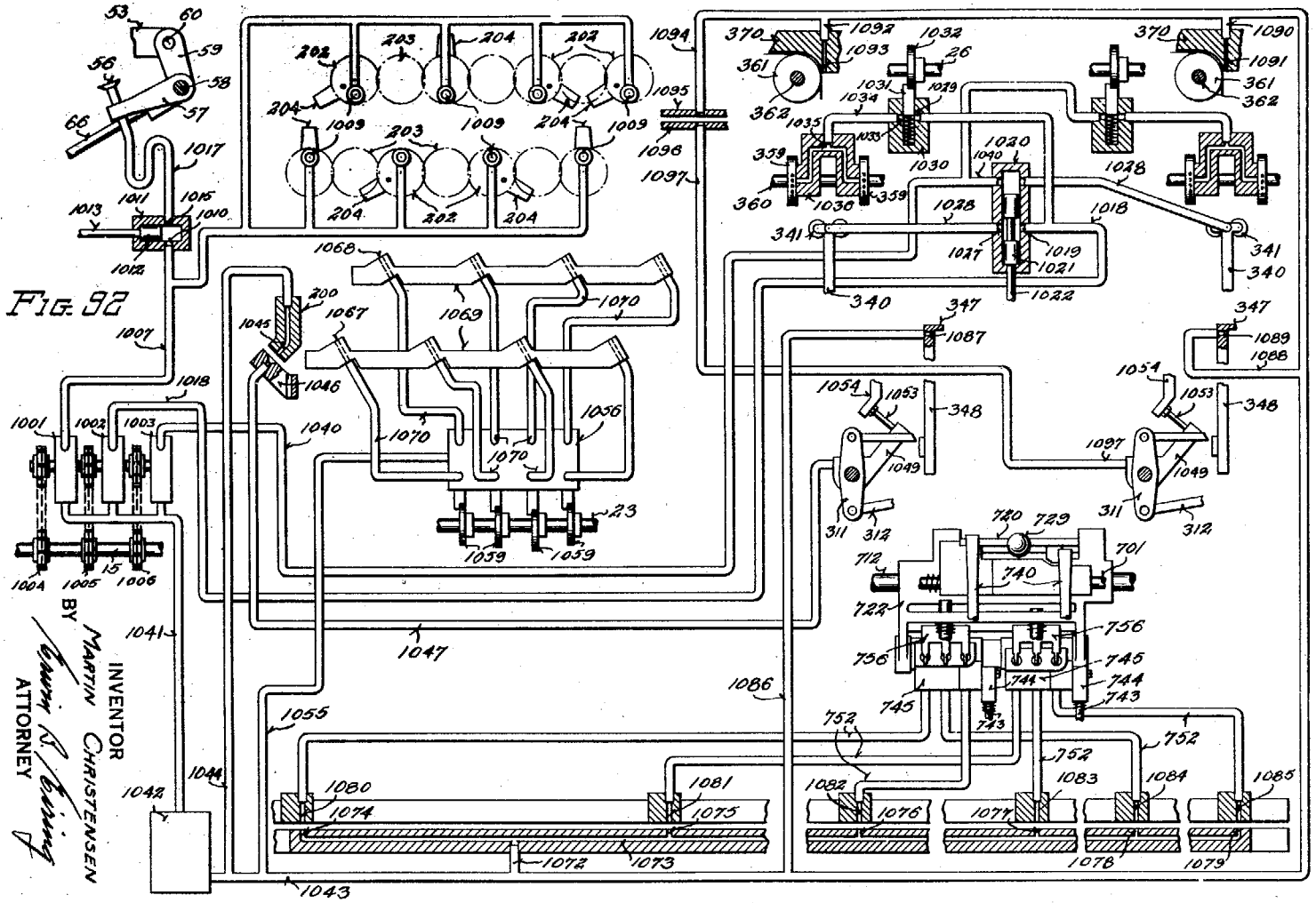
Fig. 92 is a schematic diagram of the air circuits of the machine.

*Figure 92 Sheet 43*

The machine is provided with air circuits of two types, vacuum and blower. Each type of circuit serves a definite purpose in the operation of the machine. The vacuum circuits, three of which are utilized, provide means for lowering the forward edge of the bottom signature from a supply stack, for opening signatures as they pass through the signature opener station, for transferring sheets from a supply stack or pile to a delivery table, and for effecting the transfer of sheets from the delivery table into opened signatures. The blower circuit serves primarily as a control circuit to render associated portions of the machine either operative or inoperative in accordance with the presence or absence of a signature at specific places along the run of the main signature conveyor.

Vacuum Circuits

*Figure 92 Sheet 43*

The vacuum circuits are formed on the intake side of three pumps 1001, 1002 and 1003 which are secured to the base 1 of the machine and located in the signature feed station. These pumps are driven from shaft 15 respectively through chain and sprocket drives 1004, 1005 and 1006. The air supply for pump 1001 is drawn through a conduit 1007 which communicates with ports 1008 formed in each of the signature contacting arms 204 in the signature opener station. Manually operable control elements 1009 are operatively associated with each of the gears 202. The elements 1009 are adapted to selectively establish or break the vacuum connection between the pump 1001 and each of the ports 1008 to render the selected opener arm 204 active or inactive upon signatures which pass adjacent to it. When the elements 1009 are in position shown in Fig. 21, a portion of the air intake in the pump 1001 is obtained through the ports 1008 as the arms 204 pass beneath and establish communication with a port formed in the body of the element and a groove formed in an extended foot portion thereof. This vacuum is established just prior to the contacting of the outermost sheet of a signature as it passes the revolving signature contacting arm 204 to effect adhesion between the outermost sheet on one side of the signature and the port 1008. The vacuum persists until such time as the sheet contacted by the arm 204 is drawn outwardly a sufficient distance to permit admission of the sheet deflecting member 200 between the outer engaged sheet and the remaining sheets of the signature. In the event that each of the manually operable control elements 1009 in one bank of the signature opener lies in vacuum establishing relationship with the arms 204, successive sheets will be turned outwardly from that side of the signature to produce an opening between the fourth and fifth sheet of the signature. Figures 44 to 47 indicate diagrammatically the sequence of operation followed to effect this desired result upon an individual signature as it passes through the signature opener station. By manual adjustment of the elements 1009 in the opposite bank of signature opener mechanisms, any desired number of sheets may be withdrawn to produce an opening in the signature between preselected sheets on that side of the signature.

Another branch of the conduit 1007 communicates with a port 1010 formed in a valve body 1011 (see Fig. 38) containing a valve plunger 1012 having an actuating rod 1013 extending therefrom and pivotally mounted at its outer extremity on a pin 1014 carried by an extended portion of the arm 71 (see Fig. 19) rocked through movement of the cam follower 70 in contact with cam 69. The cam follower 70 is retained in contact with the cam 69 through spring urged means operatively associated with the pin 1014. As the cam follower 70 rises and falls, the valve plunger 1012 intermittently establishes communication between the port 1010 and a port 1015 through the passageway 1016 formed through the valve plunger 1012 (see Fig. 38). The port 1015 communicates with the vacuum cups 56 through a flexible hose connection 1017. When the valve plunger 1012 is in position to establish contact between the ports 1010 and 1015, the vacuum cups are energized. This condition exists as the cups 56 are rocked into signature stack engaging position wherein, the vacuum is strong enough to bend the forward edge of the lowermost signature downwardly from the bottom of the stack. The vacuum persists until such time as the jaws 92 and 93 of the picker arm have engaged the lowered forward edge of the bottom signature of the stack. It will be noted that the valve plunger 1012 is reciprocated once with each revolution of the power take-off shaft 26.

The air supply for pump 1002 is obtained through a conduit 1018 which communicates with a port 1019 formed in a valve body 1020 (see Fig. 68) containing a valve plunger 1021 actuated for reciprocating movement in the valve body 1020 by a connecting rod 1022 pivotally mounted at one end to the lower extremity of the plunger 1021 and at its other end to a free end of an arm 1023 fulcrumed on shaft 307 (see Fig. 28). The arm 1023 carries a cam follower 1024 actuated by a cam 1025 keyed to power take-off shaft 23. The cam follower 1024 is retained in contact with the cam 1025 through the action of a coil spring secured at one end to the rod 1022 and having its other end in contact with a fixed abutment which serves as a guide block for the rod 1022. A groove 1026 formed in the valve plunger 1021 serves to intermittently establish communication between the port 1019 and a port 1027. The port 1027 communicates with vacuum cups 341 carried by the arm 340 in the first sheet feed station, through a flexible rubber tube 1028.

A branch of conduit 1018 communicates with a port 1029 formed in the valve body 1030. The valve body 1030 is provided with a cylindrical bore adapted to receive a spring urged valve plunger 1031 which is retained in contact with a cam 1032 keyed to power take-off shaft 26. As the valve plunger 1031 is reciprocated by action of the cam 1032, it serves to intermittently establish communication between the port 1029 and a port 1033 also formed in the valve body 1030. A flexible rubber hose 1034 connects the port 1033 with a passage 1035 formed in a casting 1036 which is supported on the shaft 360. The vacuum feed rolls 359 are disposed adjacent the sides of the casting 1036 and a friction plate 1037 lies between a casting 1036 (see Figs. 59 and 60) on one side of the vacuum roll 359. The vacuum roller is provided with a series of openings 1038 disposed about a portion of its peripheral surface. These openings communicate with the passage 1035 through a bore 1039 formed in the friction plate 1037. As the valve plunger 1031 is reciprocated in the valve body 1030, the openings 1038 formed in the friction rollers 359 are intermittently energized by reason of their connection with the pump 1002 through conduit 1018. When the openings 1038 are under the influence of the vacuum created by the pump 1002, they engage the bottom surface of a sheet located on the delivery table 339 and urge it forwardly into contact with driven feed rolls 361 which effect its delivery into the opened signature.

The air supply for pump 1003 is drawn through a conduit 1040 from the vacuum cups 341 and vacuum feed rolls 359 of the second sheet feed station in a manner identical with that just previously described with reference to pump 1002. It will be noted that the plunger 1021 in the valve body 1020 serves to control the intake for both pumps by reason of its duplex structure.

Blower Circuit

*Figure 92 Sheet 43*

The exhaust of pumps 1002, and 1003 is directed through a conduit 1041 into an air filter 1042 and then into a pressure supply pipe 1043 from which the air under pressure is directed through branch conduits to different locations in the machine. One branch pipe 1044 directs the air through a passage 1045 formed in one of the sheet abutment elements 200 in the signature opener station. The discharge of air under pressure from the mouth of passage 1045 bridges a gap between the sheet engaging element 200 and the stationary bracket member 1046 supported adjacent the member 200. The gap just mentioned provides a passageway through which the outermost sheet of a signature is adapted to be directed under action of the first signature opener mechanism on the operator's side of the machine (see Fig. 22). In the event that the outermost sheet of the signature has been directed into the gap, the air pressure from the mouth of the passage 1045 is directed against the inner surface of the passing sheet and no further action is produced by this air under pressure. In the absence of a sheet the air from the mouth of the passage 1045 will bridge the gap and pass through a conduit 1047 into a passage 1048 (see Fig. 62) in a rockable arm 1049 which forms a part of the arm 357 journalled on the shaft 307. The passage 1048 lies in an angular position with respect to a horizontal plane and is adapted to receive a ball 1050, the diameter of which is sufficiently less than that of the passage 1048 to permit its free movement in the bore under pressure of air passed through conduit 1047. The movement of the ball 1050 within the bore 1048 is limited by a pair of pins 1051 extending through the bore 1048 a short distance apart. An opening 1052 that extends radially with respect to the bore 1048 serves to receive a pin 1053 adjustably secured in a bracket 1054 fixed to the tie rod 712. In one extreme position of movement of the arm 1049, the pin 1053 lies within the bore 1048, while in the other extreme position of the arm 1049, the pin 1053 lies outside the confines of the bore 1048. Rocking movement is imparted to the arm 1049 which forms a part of arm 357 from the above shaft 307 which is actuated from the cam 308 through a follower 309 and the arm 310. In the event of the absence of a signature in the gap formed between the sheet abutting member 200 and the member 1046, air under pressure passes through the conduit 1047 to urge the ball 1050 upwardly to its extreme outer position in the passage 1048. When the ball 1050 lies in its extreme outer position the rocking movement of the arm 1049 is impeded by contact between pin 1053 and the ball 1050. The impeded movement of the arm 1049 which comprises a part of the arm 357 prevents elevation of the bar 348 under action of the arm 357. The failure to elevate the bar 348 results in the retention of the foot 347 in contact with the top of the sheet pile to preclude the removal of a sheet therefrom under action of the vacuum cups 341. As previously stated, this condition will exist in the absence of a sheet of the signature in the passageway formed between the sheet engaging element 200 and the stationary bracket member 1046. The absence of the signature sheet indicates either that no signature is passing through the opener station or that the signature passing through the station has not been properly opened to receive an insert sheet as it passes through the sheet feed station. The inclusion of the pneumatically actuated control mechanism insures against the feeding of a sheet either in the absence of a signature or in the absence of an opened signature.

Another branch pipe 1055 directs air under pressure from the supply pipe 1043 to a valve body 1056 located in the signature opener station. The valve body 1056 is provided with a plurality of parallelly disposed horizontal bores 1057 (see Fig. 26) adapted to receive valve plungers 1058. Each valve plunger 1058 is normally retained in contact with a separate cam 1059 keyed to power take-off shaft 23 under the action of a coil spring 1069 which surrounds the tail rod of the valve plunger and lies between the plunger 1058 in a cover plate 1061. The single lobed cams 1059 are so disposed on the shaft 23 so that there is a timed relationship in their action upon successive valve plungers 1058. Air under pressure in the branch pipe 1055 enters a passageway 1062 formed in the valve body 1056. A port 1063 formed in each bore 1057 communicates with the passageway 1062 so that the bore 1057 is always supplied with air under pressure. A pair of spaced lands 1064 formed on the valve plunger 1058 serve to successively uncover ports 1065 and 1066 which are respectively connected with orifices 1067 and 1068 formed in a pair of blower bars 1069 through flexible hose connections 1070. The blower bars 1069 lie adjacent the path of travel of the signature and are supported on brackets 1071 (see Fig. 22) formed on the plates 216. It will be noted that the orifices 1067 are formed in the blower bar 1069 lying on the operator's side of the signature opener station and that the orifices 1068 are formed in the blower bar 1069 lying on the far side of the signature opener station. Orifices 1067 project a jet of air against the leading edge of the oncoming signature to facilitate the operation of the opener mechanisms which produces an opening on the operator's side of the signature as it passes through the opener station. Orifices 1068 serve the same purpose for the opening formed on the far side of the signature. As previously stated, the cams 1059 are angularly disposed with respect to each other so that the jet of air under pressure is projected against the leading edge of the oncoming signature as it passes the adjacent signature contacting arm 204.

Another branch pipe 1072 directs air under pressure to a passageway 1073 formed in the conveyor frame 10 on the operator's side of the machine. A plurality of ports 1074, 1075, 1076, 1077, 1078 and 1079 are disposed in spaced relationship along the conveyor frame 10 so that ports 1074 and 1075 lie in the signature opener station, 1076 lies in the first sheet feed station, 1077 lies between the first and second sheet feed station, 1078 lies in the second sheet feed station and 1079 lies in the caliper station. These ports are adapted to project air under pressure across the path of signature travel immediately above the conveyor 11 into ports 1080, 1081, 1082, 1083, 1084 and 1085 respectively in the absence of a signature traveling between the pairs of ports disposed on opposite sides of the path of signature travel. Flexible hose connections 752 lead from the ports 1080 to 1085 inclusive to individual passages 751, three of which are formed in each of the two arms 745. The air pressure transmitted across the gap between the respective pairs of ports 1074—1079 and 1080—1085 will be carried through individual hose connections 752 and cause the individual balls 750 to be urged outwardly to a position where they will impede the rocking movement of arms 745 and thereby cause declutching of the machine transmission through the action of rods 740 as previously described in connection with the pneumatic control automatic mechanical clutch throw-out mechanism. As a normal flow of signatures are traveling along the conveyor, they will cut off the passage of air between the respective pairs of ports previously mentioned and thereby relieve air pressure upon the balls 750. In the absence of air pressure on the balls 750, they fall by gravity into the low extremity of the sleeve in which they are housed and the clutch throw-out mechanism is thereby rendered ineffective.

Another branch pipe 1086 leads air under pressure to orifices 1087 formed in the rod 348 immediately beneath the sheet pile engaging foot 347 in the first sheet feed station. When the foot 347 is elevated from contact with the sheet pile, the air issuing from the orifices 1087 will impinge against the forward edge of the uppermost sheets to introduce air between them whereby the action of the vacuum picker cups 341 is facilitated in its action to withdraw the topmost sheet of the pile.

Another branch pipe 1088 leads to orifice 1089 formed in the rod 348 immediately beneath the sheet pile engaging foot 347 in the second sheet feed station. The action of this mechanism in the second sheet feed station is identical with that just described which is located in the first sheet feed station.

Another branch pipe in the form of a flexible hose connection 1090 provides a means for transmitting air under pressure to a passage 1091 which is disposed in a vertical plane through one of the fingers 370 which overlie the sheet feed table 339 of the second sheet feed station. The mouth of the passage 1091 lies adjacent the edge of the feed roller 361 and throws a jet of air under pressure into the opened signature to facilitate the admission of a sheet into the opening formed in the signature. A plurality of these air injecting mechanisms are provided in these sheet feed stations to insure a proper opening in the signature throughout its length.

Another branch pipe 1092 in the form of a flexible hose connection provides a means for delivering fluid under pressure to a passage 1093 formed in a finger 370 in the first sheet feed station. A plurality of these mechanisms is also provided in this station to serve the same purpose, as those described in the preceding paragraph.

Another branch pipe 1094 leads to a port in a signature guide bar 1095. A cooperating port formed in a second signature guide bar 1096 spaced laterally from the face is connected to an arm 1049 in the second sheet feed station through a pipe 1097. The gap formed between the ports lying in the signature guide bars 1095 and 1096 serves the same purpose as that previously described in connection with the gap formed between the sheet deflecting arm 200 and the stationary bracket member 1046. The gap between the elements 1095 and 1096 controls the second sheet feed mechanism in a manner identical with the mechanism previously described for controlling the mechanism of the first sheet feed station.

General Summary Operation of the Machine

Figure 93:
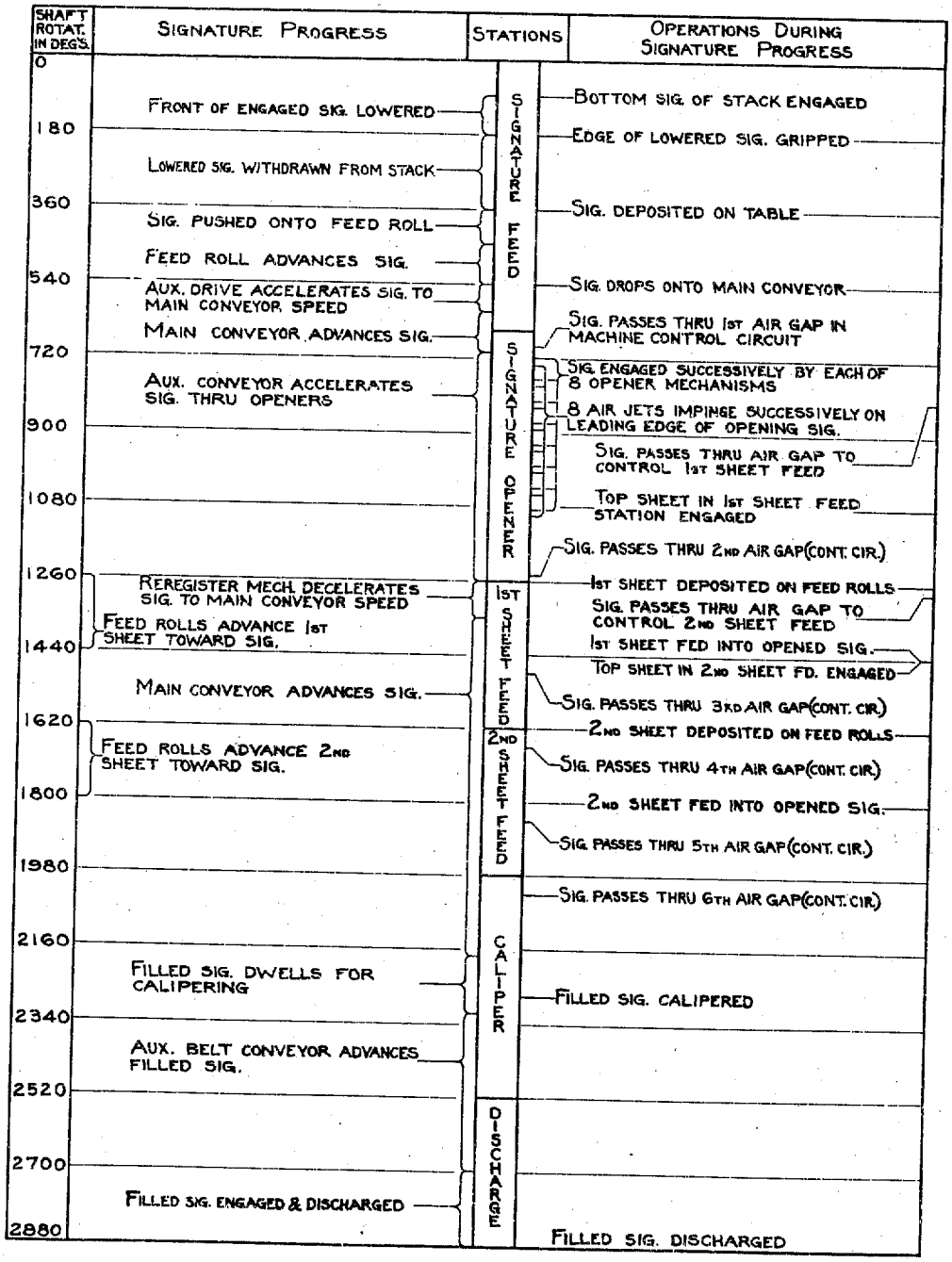
Fig. 93 is a chart showing the progress of a signature through the several stations of the machine and also the operations occurring during the signature progress.

While the mechanical and pneumatic mechanisms contained in the machine have been individually described at considerable length in the foregoing specification, it is believed that a summary of their combined actions will lead to a more comprehensive understanding of the operation of the signature handling machine as a unit. The summary of operations will be more readily understood by reference to Figure 93 which is in chart form, and includes designations as to the degrees of rotation of the power take-off shafts 23, 24, 25, and 26; the signature progress, the machine stations and the operations effected on or by the signatures during their progress through the machine.

After a stack of signatures has been placed with folded edge forwardmost on the plate 54 in the signature feed station, and a stack of sheets have been placed on each of the sheet feed station tables 301, the starting lever 706 may be swung to a starting position to place the machine in operation. The starting handle 706 should be retained in starting position manually until the first signature has reached the signature calipering station so that the prenmatically actuated automatic clutch throw-out mechanism will be rendered ineffective, due to the absence of signatures along the main conveyor 11 at the positions where the respective pairs of ports 1074—1079 and 1080—1085 are located. When the first signature has reached the calipering station, the machine will be in full automatic operation and the sequence of events on successive signatures will follow as indicated on the chart in Fig. 93. The initial step comprises the engagement of the bottom surface of the lowermost signature in the stack in the signature feed station by the vacuum cups 56 which are energized to effect the lowering of the forward folded edge of the signature. Upon completion of the lowering action of the forward edge of the signature, the same is gripped between the jaw 93 and foot portion 92 of the rockable arm 91. Upon completion of the gripping action, the vacuum on cups 56 is deenergized and the signature will be withdrawn from the stack under action of the arm 91. As the arm 91 reaches its forwardmost position, the gripping action of the jaw 93 is released and the signature is deposited on the feed table 51. A pusher plate 94 engages the rearward edge of the signature to advance the same onto the feed roll 103 from which the signature is dropped onto the main conveyor 11. The signature is then engaged between a pair of discs 137 to initiate its forward movement to bring it up to the speed at which the conveyor is traveling so that the abutment of the signature pusher block 43 of the chain 11 will not result in an impact strong enough to displace the signature on the conveyor chin. The signature is then advanced into the signature opener station under control of the main conveyor. In passing into the signature opener station, the signature passes through the first air gap in the machine controlled circuit which comprises the ports 1074 and 1080 of the automatic clutch throw-out mechanism. As the signature continues through the signature opener station, the auxiliary signature conveyor comprising chains 219 and 220 contact the signature and accelerate it to a speed above that of the main conveyor. While the signature is under control of the auxiliary conveyor, just mentioned, the signature is engaged successively by each of the eight opener mechanisms which comprise arms 204. In the event that the manually adjustable elements 1069 are in operative position each of the signature engaging arms 204 will withdraw the then outermost sheet from the signature and draw it beyond the sheet deflecting arm 200. As the signature passes each of the opener mechanisms a jet of air from the orifices 1067 and 1068 formed in the blower bars 1069 will impinge upon the leading edge of the signature to facilitate the forming of an opening therein. As the signature passes the first signature opener arm 204 on the operator's side of the machine the deflected sheet passes through the gap formed between the passage 1045 in the sheet deflecting arm 200 and the passage formed in the bracket 1046. As the signature passes through this gap it effects the pneumatic control which renders the first sheet feed mechanism operative upon the presence of a signature sheet in the last mentioned gap, or inoperative upon the absence of a sheet in this gap. In the event that a signature sheet is present in the gap, the top sheet of the first sheet feed station is engaged just prior to the time of the completion of the operation of the opener mechanisms upon the signature. As the signature leaves the signature opener station it passes through the second air gap in the control circuit comprising ports 1075 and 1081 to provide a means for effecting automatic declutching operation of the drive of the machine transmission in the absence of the signature. As the signature passes into the first sheet feed station, the topmost sheet of the supply stack is deposited upon the table 339. As the signature leaves the signature opener station the action of the auxiliary conveyor terminates and a reregister mechanism in the form of a pair of discs 225 reduce the speed of signature travel to that of the main conveyor which again controls its advance through the machine. As the signature enters the sheet feed station it passes through a gap formed in the signature guide rails 1095 and 1096 which control the operation of the second sheet feed mechanism in a manner identical with that previously described for the first sheet feed control. As the open signature continues its advance through the first sheet feed station, sheet feed rolls 359 advance the sheet along the table and sheet feed rolls 361 discharge it downwardly into the opening in the moving signature. The delivery of the sheet into the open signature is facilitated by the action of jets of air projected downwardly through the passages 1093 formed in the sheet guide fingers 370. Simultaneouly with the feeding of the first sheet into the open signature, the top sheet of the second sheet feed station is engaged. In passing through the first sheet feed station, the signature passes the third air gap in the control circuit comprising port 1076 and 1082. As the signature leaves the first sheet feed station the second sheet is deposited on the table 339 and immediately begins its advance on the table under the action of feed rolls 359. As the signature passes into the second sheet feed station it passes the fourth air gap in the control circuit comprising ports 1077 and 1083. As the opened signature continues its travel through the second sheet feed station the second sheet is advanced by rolls 361 and directed downwardly into the open signature. The opening in the signature is maintained uniform throughout its length by the projection of a plurality of jets of air under pressure from passages 1091 formed in the sheet guide fingers 370. Continued travel of the signature through the second sheet feed station results in its passing through the fifth air gap in the control circuit comprising ports 1078 and 1084. As the filled signature is advanced into the signature calipering station it passes through the sixth and last air gap in the control circuit comprising ports 1079 and 1085. When the signature reaches the end of the main conveyor it stops in proper position between the sliding plates 401 of the calipering station. The plates 401 are then urged toward each other so that signature contacting elements 433 and 440 on each plate 401 contact the signature to effect the calipering operation to determine the correctness of the opening and insetting operation performed in the preceding stations. Upon completion of the calipering operation, the signature is advanced under action of an auxiliary conveyor comprising belts 502 and 507 into the signature discharge station. After the signature is discharged from the auxiliary belt conveyor, just mentioned, it is engaged between the discharge drum 551 and cam discs 560 to effect its discharge from the machine either onto a plurality of belts 596 under action of the discharge fly 576 which comprises those signatures which are properly filled or on to a discharge plate 595 which serves to receive incorrectly filled signatures. The discharge of the signatures into segregated groups of properly and improperly filled signatures is controlled by the signature calipering mechanism.

From the foregoing description it will be understood that a new and improved signature handling machine has been provided which is capable of automatically feeding, opening, insetting, calipering and discharging signatures into segregated groups of properly and improperly filled signatures under control of the calipering mechanism.

In addition to the general novelty found in this machine it will be noted that novel means have been provided for effecting each of the operations which combine to effect the new and novel results attained by this machine.

While the machine has been described in considerable detail in the foregoing specification it is to be understood that various changes may be made in its embodiment without departing from or sacrificing any of the advantages hereinafter claimed.

I claim:

1. A signature handling machine comprising a conveyor, means for automatically performing all operations essential to the feeding of a closed signature onto said conveyor, opening the signature on said conveyor, insetting a sheet into the opening formed in the signature, calipering and discharging the signature in a continuous automatic cycle of operation, said conveyor means adapted to receive said closed signature and advance it through said machine, a plurality of mechanisms for performing the several operations on the signature, and means for controlling the synchronized advance of the signature conveyor and the operation of said mechanisms.

2. A signature handling machine comprising, a conveyor adapted to receive a signature in closed position, means for automatically performing all operations essential to the feeding of a closed signature onto said conveyor, opening the signature on said conveyor, insetting a sheet into said opening, calipering the filled signature, and discharging the signature in a continuous automatic cycle of operation, means for advancing said conveyor and signature through said machine, a plurality of mechanisms for performing the several operations on the signature, and automatic means for discharging signatures individually into segregated groups of properly and improperly filled signatures.

3. A signature handling machine comprising, a conveyor adapted to receive a signature in closed position, means for automatically performing all operations essential to the feeding of a closed signature onto said conveyor, opening the signature on said conveyor, insetting a sheet into said opening, calipering, and discharging the signature in a continuous automatic cycle of operation, means for advancing said conveyor and signature through said machine, a plurality of mechanisms for performing the several operations on the signature, means for controlling the synchronized advance of the signature conveyor and the operation of said mechanisms, and automatic means for discharging signatures individually into segregated groups of properly and improperly filled signatures.

4. A signature handling machine comprising, a conveyor adapted to receive a signature in closed position, means for automatically performing all operations essential to the feeding of a closed signature onto said conveyor, opening the signature on said conveyor, insetting a sheet into said opening, calipering, and discharging the signature in a continuous automatic cycle of operation, a plurality of mechanisms for performing the several operations on the signature, actuating means for said mechanisms, and automatic means for discharging signatures individually into segregated groups of properly and improperly filled signatures.

5. A signature handling machine comprising, a conveyor adapted to receive a signature in closed position, means for automatically performing all operations essential to the feeding of a closed signature onto said conveyor, opening said signature on said conveyor, insetting a sheet into said opening, calipering, and discharging signature in a continuous automatic cycle of operation, a plurality of mechanisms for performing the several operations on the signature, actuating means for said mechanisms, means for advancing said conveyor and signature through said machine, and automatic means for discharging signatures individually into segregated groups of properly and improperly filled signatures.

6. A signature handling machine comprising, a conveyor adapted to receive a signature in closed position, means for automatically performing all operations essential to the feeding of a closed signature onto said conveyor, opening said signature on said conveyor, insetting a sheet into said opening, calipering, and discharging of a signature in a continuous automatic cycle of operation, a plurality of mechanisms for performing the several operations on the signature, actuating means for said mechanisms, means for advancing said conveyor and signature through said machine, means for controlling the synchronized advance of the signature and the operation of the mechanisms, and automatic means for discharging signatures individually into segregated groups of properly and improperly filled signatures.

7. A signature handling machine comprising a base, a conveyor adapted to receive a signature in closed position, a plurality of stations including a signature feed station, a signature opener station, a sheet feed station, a signature calipering station, and a signature discharge station disposed on said base adjacent said conveyor, mechanisms in each of said stations for performing the several operations on said signature, means for actuating said mechanisms, a conveyor driving means, and means for synchronizing the operation of said station mechanisms with said conveyor and signature movement.

8. A signature handling machine comprising a base, a plurality of stations disposed on said base, including a signature feed station, a signature opener station, a sheet feed station, a calipering station, and a signature discharge station, mechanism in each of said stations adapted to perform some operation on a signature, means for actuating said mechanisms, and a conveyor adapted to receive a signature in closed position and transport it through said machine whereby said mechanisms may effect their respective operations on a signature in a continuous automatic cycle.

9. A signature handling machine comprising a base, a plurality of stations disposed on said base, including a signature feed station, a signature opener station, a sheet feed station, a calipering station, and a signature discharge station, mechanism in each of said stations adapted to perform some operation on a signature, means for actuating said mechanisms, a conveyor extending through said stations adapted to receive a signature in closed position, and means for driving said conveyor.

10. A signature handling machine comprising a base, a plurality of stations disposed on said base, including a signature feed station, a signature opener station a sheet feed station, a calipering station, and a signature discharge station, mechanism in each of said stations adapted to perform some operation on a signature, means for actuating said mechanisms, a conveyor extending through said stations adapted to receive a signature in closed position, means for driving said conveyor, and means for controlling the synchronized advance of said signature conveyor and the timed operation of said mechanisms.

11. A signature handling machine comprising a base, a plurality of stations disposed on said base, including a signature feed station, a signature opener station, a sheet feed station, a calipering station, and a signature discharge station, mechanism in each of said stations adapted to perform some operation on a signature, means for actuating said mechanisms, a conveyor extending through said stations adapted to receive a signature in closed position, means for driving said conveyor, means for controlling the synchronized advance of said signature conveyor and the timed operation of said mechanisms, and means actuated by said caliper mechanism to control the operation of said discharge mechanism whereby properly and improperly filled signatures are automatically segregated in said discharge station.

12. A signature handling machine comprising, a base, a conveyor adapted to reecive a signature in closed position, a plurality of stations disposed adjacent said conveyor, said stations comprising a signature feed station, a signature opener station, a sheet feed station, a signature calipering station and a signature discharge station, said machine adapted to effect the automatic feeding, opening, insetting, calipering and discharging operations on a signature in a continuous cycle of operation.

13. A signature handling machine comprising, a plurality of stations disposed in adjacent relationship, a driven conveyor extending through said stations adapted to receive a signature in closed position, means operative in one of said stations for effecting the feeding of a closed signature to said conveyor, means operative in another of said stations for effecting the opening of a signature while traveling with said conveyor, means operative in another of said stations for effecting the insetting of a sheet into the opened signature while traveling with said conveyor, means operative in another of said stations for effecting the calipering of the filled signature to determine the correctness of the preceding opening and insetting operations, and means operative in another of said stations for effecting the discharge of filled calipered signatures.

14. A signature handling machine comprising, a plurality of stations disposed in adjacent relationship, a driven conveyor extending through said stations adapted to receive a signature in closed position, means operative in one of said stations for effecting the feeding of a closed signature to said conveyor, means operative in another of said stations for effecting the opening of a signature while traveling with said conveyor, means operative in another of said stations for effecting the insetting of a sheet into the opening in the moving signature, means operative in another of said stations for effecting the calipering of the filled signature to determine the correctness of the preceding opening and insetting operations, means operative in another of said stations for effecting the discharge of filled calipered signatures, and means associated with said calipering means and operative upon said discharge means for controlling the action of the last named means to segregate incorrectly filled signatures from those which are correctly filled.

15. In a signature handling machine the combination with a plurality of associated units respectively including mechanism for effecting signature feeding, signature opening, sheet feeding, signature calipering, and signature discharging, of a conveyor extending through said units adapted to receive a signature in closed position, driving means for said conveyor, mechanism in each of said units adapted to effect successive operations upon a signature, driving means for said mechanisms, and means associated with said conveyor driving means and said mechanism driving means adapted to synchronize said mechanism operations with the advance of said signature conveyor.

16. In a signature handling machine the combination with a plurality of associated units respectively including mechanism for effecting signature feeding, signature opening, sheet feeding, signature calipering, and signature discharging, of a conveyor extending through said units adapted to receive a signature in closed position, driving means for said conveyor, mechanism in each of said units adapted to effect successive operations upon a signature, driving means for said mechanisms, means associated with said conveyor driving means and said mechanism driving means adapted to synchronize said mechanism operations with the advance of said signature conveyor, and means associated with said signature calipering mechanism and operative upon said discharge mechanism for segregating improperly filled signatures from those which are properly filled.

17. A signature handling machine comprising, a signature feed mechanism, a signature opener mechanism, a sheet feed mechanism, a signature caliper mechanism, a signature discharge mechanism, and a conveyor adapted to receive a signature in closed position and transport it through said machine to render said signature capable of being acted upon by said several mechanisms whereby automatic feeding, opening, filling, gaging the filled signature to determine the correctness of the opening and insetting operations, and discharge operations may be effected in a continuous automatic cycle of machine operation.

18. A signature handling machine comprising a signature feed mechanism, a signature opener mechanism, a sheet feed mechanism, a caliper mechanism, a signature discharge mechanism, a conveyor adapted to receive a signature in closed position and advance it from said signature feed mechanism and transport it through said signature opener mechanism, said sheet feed mechanism, said caliper mechanism, to said signature discharge mechanism, means for driving said conveyor, driving connections for said opener, sheet feed, caliper and discharge mechanisms, and means under control of said calipering mechanism whereby properly and improperly filled signatures are automatically segregated in said discharge station.

19. A signature handling machine provided with means for automatically performing the operations of feeding a closed signature onto a conveyor, opening said signature on said conveyor, insetting a sheet into said opening, calipering the filled signature, and discharging the signature in one continuous automatic cycle of operation of the machine, the combination of a plurality of mechanisms for performing the several operations, actuating means for said mechanisms, means for advancing said conveyor and signature through said machine, and means for controlling the synchronized advance of the signature and operation of said mechanisms.

20. In a signature handling machine provided with means for automatically performing several operation on a signature in a continuous automatic cycle, the combination of a machine base, a plurality of operating units disposed on said base, mechanism in each of said units adapted respectively to feed, open, insert into, caliper, and discharge signatures individually, means for actuating said mechanisms, a conveyor adapted to receive a signature in closed position and transport a signature through said machine, and means for controlling the synchronized advance of the signature and operation of said unit mechanisms.

21. In a signature handling machine provided with means for automatically performing several operations on a signature, the combination of a base, a plurality of operating units disposed on said base, said units including a signature feed unit, a signature opener unit, a sheet feed unit, a signature caliper unit, and a signature discharge unit, mechanism in each of said units, means for operating said mechanisms, and a conveyor adapted to receive a signature in closed position and transport it through said machine, whereby a signature may be exposed to the operation of each of said units to effect the feeding of closed signatures onto said conveyor, opening said signatures on said conveyor, insetting a sheet into said opening, calipering, and discharging of a signature in a continuous automatic cycle of operation.

22. In a signature handling machine, the combination with an endless conveyor adapted to receive a signature in closed position and transport it through the machine, a signature feed station, means in said station adapted to withdraw a succession of individual signatures from a source of signature supply and deposit them individually upon said conveyor in closed position, a signature opener station adjacent said signature feed station, means in said signature opener station adapted to effect an opening in said signature between preselected pages thereof, a sheet feed station adjacent said signature opener station, means in said sheet feed station adapted to withdraw a succession of individual signature inset sheets from a source of supply and deposit them individually into the opening in each signature, a caliper station, means in said caliper station adapted to contact and gauge the signature to determine the correctness of the signature opening and insetting operations, a signature discharge station, and means in said last named station for discharging signatures.

23. In a signature handling machine, the combination with an endless conveyor adapted to receive a signature in closed position and transport it through the machine, a signature feed station, means in said station adapted to withdraw a succession of individual signatures from a source of signature supply and deposit them individually upon said conveyor in closed position, a signature opener station adjacent said signature feed station, means in said signature opener station adapted to effect an opening in said signature between preselected pages thereof, a sheet feed station adjacent said signature opener station, means in said sheet feed station adapted to withdraw a succession of individual signature inset sheets from a source of supply and deposit them individually into the opening in each signature, a caliper station, means in said caliper station adapted to contact and gauge the signature to determine the correctness of the signature opening and insetting operations, a signature discharge station, and means in said last named station under control of said caliper means to segregate correctly from incorrectly filled signatures as they are discharged from the machine.

24. In a signature handling machine, the combination with a signature feed station, a signature opener station, a sheet feed station, a signature calipering station, and a signature discharge station, of a signature conveyor extending through said several stations adapted to receive signatures in closed position and transport them through the several stations of the machine, a signature supply source in said signature feed station, a sheet supply source in said sheet feed station, signature feed mechanism operative to remove individual signatures from said signature supply source and deliver them in closed position upon said signature conveyor, vacuum means operative in said signature opener station to effect automatic opening of said signature between preselected pages thereof, sheet feed mechanism operative to remove individual sheets from said sheet supply source and deliver them into said signature opening, caliper means operative to check the accuracy of said opening and insetting operations, and signature discharge means operative to discharge the filled signatures into segregated groups of properly and improperly filled signatures under control of said caliper means.

25. In a signature handling machine the combination with signature feed mechanism, signature opener mechanism, sheet feed mechanism, signature calipering mechanism, and signature discharge mechanism, of an endless conveyor adapted to receive signatures in closed position and transport them from said signature feed station to said signature calipering station, a power source for said machine, conveyor driving means associated with said power source, mechanism driving means associated with said power source, an air pump, pump driving means associated with said power source, a vacuum circuit in said machine associated with said pump intake, a fluid pressure circuit in said machine associated with said pump exhaust, vacuum means associated with said signature feed, signature opener and sheet feed mechanisms, means for energizing said vacuum means at timed intervals, fluid pressure means associated with said signature opener and sheet feed mechanisms, means for energizing said fluid pressure means at timed intervals, and a signature actuated fluid pressure control circuit adapted to automatically disengage said machine power source upon failure of a proper flow of signatures through said machine.

26. In a signature handling machine the combination with signature feed mechanism, signature opener mechanism, sheet feed mechanism, signature calipering mechanism, and signature discharge mechanism, of an endless conveyor adapted to receive a succession of individual signatures from said signature feed mechanism in closed position and transport them through said signature opener and sheet feed mechanisms to said signature calipering mechanism, an air pump, a power source for said machine, conveyor driving means associated with said power source, mechanism driving means associated with said power source, pump driving means associated with said power source, a vacuum circuit associated with said pump intake, a fluid pressure circuit associated with said pump exhaust, said vacuum circuit adapted to effect certain operations on said signature, said fluid pressure circuit adapted to control the operation of certain of said mechanisms, and signature actuated means for controlling the operation of said fluid pressure circuit to effect the automatic disengaging of said power source upon failure of a proper flow of signatures through said machine.

27. In a signature handling machine the combination with signature feed mechanism, signature opener mechanism, sheet feed mechanism, signature calipering mechanism, and signature discharge mechanism, of an endless conveyor adapted to receive a succession of individual signatures from said signature feed mechanism in closed position and transport them through said signature opener and sheet feed mechanisms to said signature calipering mechanism, and air pump, a power source for said machine, conveyor driving means associated with said power source, mechanism driving means associated with said power source, pump driving means associated with said power source, a vacuum circuit associated with said pump intake, a fluid pressure circuit associated with said pump exhaust, said vacuum circuit adapted to effect certain operations on said signature, said fluid pressure circuit adapted to control the operation of said mechanisms, and fluid pressure means controlled by an open signature for controlling the operation of said sheet feed mechanism.

28. A signature handling machine comprising a unitary structure including a plurality of stations disposed in adjacent relationship, a continuously moving conveyor extending through said plurality of stations, mechanism in one of said stations adapted to feed a closed signature onto said conveyor, mechanism in another of said stations adapted to be manually adjusted for effecting the opening of the moving signature between preselected pages on either or both sides of the center fold, mechanism in another of said stations adapted to insert a sheet into the opening formed in the moving signature, means in said signature opener station responsive to the presence of an open signature for rendering said insetting mechanism operative, said last named means being operative in the absence of an open signature for rendering said insetting mechanism inoperative, mechanism in another of said stations adapted to caliper said filled signature to check the accuracy of said opening and insetting operations, and mechanism in another of said stations adapted to discharge said filled calipered signature.

29. A signature handling machine comprising a unitary structure including a plurality of stations disposed in adjacent relationship, a continuously moving conveyor extending through said plurality of stations, mechanism in one of said stations adapted to feed a closed signature onto said conveyor, mechanism in another of said stations adapted to be manually adjusted for effecting the opening of the moving signature between preselected pages on either or both sides of the center fold, mechanism in another of said stations adapted to inset a sheet into the opening formed in the moving signature, means in said signature opener station responsive to the presence of an open signature for rendering said insetting mechanism operative, said last named means being operative in the absence of an open signature for rendering said insetting mechanism inoperative, mechanism in another of said stations adapted to caliper said filled signature to check the accuracy of said opening and insetting operations, and mechanism in another of said stations adapted to discharge said filled calipered signature.

30. A signature handling machine comprising a unitary structure including a plurality of stations disposed in adjacent relationship, a continuously moving conveyor extending through said plurality of stations, mechanism in one of said stations adapted to feed a closed signature onto said conveyor, mechanism in another of said stations adapted to be manually adjusted for effecting the opening of the moving signature between preselected pages on either side of the center fold, mechanism in another of said stations adapted to inset a sheet into the opening formed in the moving signature, means in said signature opener station responsive to the presence of an open signature for rendering said insetting mechanism operative, said last named means being operative in the absence of an open signature for rendering said insetting mechanism inoperative, mechanism in another of said stations adapted to caliper said filled signature to check the accuracy of said opening and insetting operations, mechanism in another of said stations adapted to discharge said filled calipered signature, and means in said caliper mechanism operative upon said discharge mechanism for segregating improperly filled signatures from those which are properly filled.

31. A signature handling machine comprising a unitary structure including a plurality of stations disposed in adjacent relationship, a continuously moving conveyor extending through said plurality of stations, mechanism in one of said stations adapted to feed a closed signature onto said conveyor, mechanism in another of said stations adapted to be manually adjusted for effecting the opening of the moving signature between preselected pages on both sides of the center fold, mechanism in another of said stations adapted to inset a sheet into the opening formed in the moving signature on one side of the centerfold, mechanism in another of said stations adapted to inset a sheet into the opening formed in the moving signature on the other side of the center fold, means in said signature opener station responsive to the presence of an open signature for rendering each of said insetting mechanisms operative, said last named means being operative in the absence of an open signature for rendering each of said insetting mechanisms inoperative, mechanism in another of said stations adapted to caliper said filled signature to check the accuracy of said opening and insetting operations, and mechanism in another of said stations adapted to discharge said filled calipered signature.

32. A signature handling machine comprising a unitary structure including a plurality of stations disposed in adjacent relationship, a continuously moving conveyor extending through said plurality of stations, mechanism in one of said stations adapted to feed a closed signature onto said conveyor, mechanism in another of said stations adapted to be manually adjusted for effecting the opening of the moving signature between preselected pages on both sides of the center fold, mechanism in another of said stations adapted to inset a sheet into the opening formed in the moving signature on one side of the center fold, mechanism in another of said stations adapted to inset a sheet into the opening formed in the moving signature on the other side of the center fold, means in said signature opener station responsive to the presence of an open signature for rendering each of said insetting mechanisms operative, said last named means being operative in the absence of an open signature for rendering each of said insetting mechanisms inoperative, mechanism in another of said stations adapted to caliper said filled signature to check the accuracy of said opening and insetting operations, mechanism in another of said stations adapted to discharge said filled calipered signature, and means in said caliper mechanism operative upon said discharge mechanism for segregating improperly filled signatures from those which are properly filled.

33. The method of performing a succession of operations on a signature in a continuous cycle of operation of an automatic machine, which comprises feeding a closed signature onto a continuously moving conveyor, effecting automatic opening between preselected pages of the moving signature, effecting insetting of a sheet into the opening formed in the moving signature, calipering the filled signature to check the accuracy of the opening and insetting operations, and discharging the calipered signature into segregated groups of correctly and incorrectly filled signatures under control of said caliper.

34. The method of performing a succession of operations on a signature in a continuous cycle of operation of an automatic machine, which comprises feeding a signature in closed position onto a continuously moving conveyor, exposing the moving signature to the action of a signature opener mechanism adapted to open the signature between preselected pages, exposing the open signature to the action of sheet feed mechanism adapted to feed a sheet into the opening formed in the signature, exposing the filled signature to the action of a caliper mechanism operative to check the accuracy of the opening and insetting operations, and discharging the signature upon completion of the succession of operations.

35. The method of automatic feeding, opening, insetting into, calipering and discharging of a signature in a continuous cycle of operation of a signature handling machine, which comprises the feeding of successive individual signatures from a source of supply, delivering them in closed position onto a continuously moving conveyor, exposing the moving signature to the action of opener mechanisms adapted to effect automatic opening thereof between preselected pages, automatically removing a sheet from a source of supply, advancing and insetting the sheet into the opening formed in the moving signature, arresting the signature advance to effect automatic calipering of the filled signature, advancing the calipered filled signature into the discharge station, and discharging the same.

36. The method of automatic feeding, opening, insetting into, calipering and discharging of a signature in a continuous cycle of operation of a signature handling machine, which comprises the feeding of successive individual signatures from a source of supply, delivering them in closed position onto a continuously moving conveyor, exposing the moving signature to the action of opener mechanisms adapted to effect automatic opening thereof between preselected pages, automatically removing a sheet from a source of supply under control of the opened signature, advancing and insetting the sheet into the opening formed in the advancing signature, arresting the signature advance to effect automatic calipering of the filled signature, advancing the calipered filled signature into the discharge station, and discharging the same.

37. The method of automatic feeding, opening, insetting into, calipering and discharging of a signature in a continuous cycle of operation of a signature handling machine, which comprises the feeding of successive individual signatures from a source of supply, delivering them in closed position onto a continuously moving conveyor, exposing the moving signature to the action of opener mechanisms adapted to effect automatic opening thereof between preselected pages, automatically removing a sheet from a source of supply, advancing and insetting the sheet into the opening formed in the advancing signature, arresting the signature advance to effect automatic calipering of the filled signature, advancing the calipered filled signature into the discharge station, discharging the same and providing automatic means for arresting the machine operation upon failure of normal signature movement therethrough.

38. The method of handling a signature in a machine adapted to automatically perform a succession of operations upon a signature in a continuous cycle of operation, which comprises automatic removal of a signature from source of supply, transferring the signature in closed position to a continuously moving conveyor, advancing the signature through signature opener mechanisms adapted to effect automatic opening between preselected pages of the signature, advancing the opened signature through a sheet feed station wherein sheets are removed individually from a source of supply and delivered into the opening formed in the signature, advancing the filled signature into a signature calipering mechanism wherein the filled signature is gauged to determine the correctness of the opening and insetting operations, and discharging the filled gauged signature.

39. The method of handling a signature in a machine adapted to automatically perform a succession of operations upon a signature in a continuous cycle of operation, which comprises automatic removal of a signature from source of supply, transferring the signature in closed position to a continuously moving conveyor, advancing the signature through signature opener mechanisms adapted to effect automatic opening between preselected pages of the signature, advancing the opened signature through a sheet feed station wherein sheets are removed individually from a source of supply and delivered into the opening formed in the signature, advancing the filled signature into a signature calipering mechanism wherein the filled signature is gauged to determine the correctness of the opening and insetting operations, and discharging the filled gauged signature into segregated groups of properly and improperly filled signatures.

40. The method of performing a succession of operations on a signature in a continuous cycle of operation of an automatic machine, which comprises removing a succession of individual signatures from a source of signature supply, transferring them individually in closed position to a continuously moving conveyor, opening the individual signatures between preselected pages while they are in motion, removing inset sheets individually from a source of supply, depositing the inset sheet into the signature opening, advancing the filled signature to a calipering mechanism, arresting the advance of the filled signature to effect the calipering operation, advancing the calipered signature, and discharging the same from the machine.

41. The method of performing a succession of operations on a signature in a continuous cycle of operation of an automatic machine, which comprises removing a succession of individual signatures from a source of signature supply, transferring them individually in closed position to a continuously moving conveyor, opening the individual signatures between preselected pages while they are in motion, removing inset sheets individually from a source of supply, depositing the inset sheet into the signature opening, advancing the filled signature to a calipering mechanism, arresting the advance of the filled signature to effect the calipering operation, advancing the calipered signature, and discharging the same from the machine into segregated groups of properly and improperly filled signatures.

42. The method of performing a succession of operations on a signature in a continuous cycle of operation of an automatic machine, which comprises removing a succession of individual signatures from a source of signature supply, transferring them individually in closed position to a continuously moving conveyor, opening the individual signatures between preselected pages while they are in motion, controlling the removal of inset sheets individually from a source of supply under action of the opened signature, depositing the inset sheet into the signature opening, advancing the filled signature to a calipering mechanism, arresting the advance of the filled signature to effect the calipering operation, advancing the callipered signature, and discharging the same from the machine.

43. The method of performing a succession of operations on a signature in a continuous cycle of operation of an automatic machine, which comprises removing a succession of individual signatures from a source of signature supply, transferring them individually in closed position to a continuously moving conveyor, opening the individual signatures between preselected pages while they are in motion, removing inset sheets individually from a source of supply, depositing the inset sheet into the signature opening, advancing the filled signature to a calipering mechanism, arresting the advance of the filled signature to effect the calipering operation, advancing the calipered signature, and discharging the same from the machine into segregated groups of properly and improperly filled signatures under control of the signature calipering mechanism.

44. A sheet material feeding mechanism comprising, a material stack supporting member, a feed table, a pusher plate, a feed roll, vacuum means for engaging the bottom sheet of material of the stock and operative to free a portion thereof from the remaining sheets in the stack, means operative to engage and elevate the remaining sheets in the stack to relieve pressure on the bottom sheet, means operative to effect the gripping of the free portion of the bottom sheet of material and transfer said sheet of material to said feed table and release the same in advance of said pusher plate, means for rendering said pusher plate operative to advance said sheet material into contact with said feed roll, and means for driving said feed roll to discharge said sheet material.

45. A signature feed mechanism comprising, a frame, a signature stack supporting member, a signature feed table, a signature feed roll, vacuum means for engaging the lowermost signature of the stack to free one edge thereof from the remaining signatures in the stack, signature gripping means adapted to withdraw the engaged signature from the stack and deposit it upon said feed table, means for advancing said signature into contact with said feed roll, and means for driving said feed roll to discharge said signature from said table.

46. A signature feed mechanism comprising, a frame, a signature feed table, a signature feed roll, a signature stack supporting element disposed above said table, vacuum means adapted to oscillate toward and from said signature stack to contact the lowermost signature of said stack, means for moving said vacuum means toward and from said signature stack, means for intermittently energizing said vacuum means upon contact with the signature on the stack to effect separation of the forward edge of the bottom signature from the remaining signatures in the stack upon movement of the energized vacuum means from the stack, means for elevating the forward edge of the signature stack to relieve pressure on the bottom signature, signature gripping means for removing the lowermost signature of the stack and depositing it on said feed table, means for advancing said signature into contact with said feed roll, and means for driving said feed roll to discharge said signature from said table.

47. A sheet feed mechanism comprising, a frame, a movable sheet stack supporting member, a sheet feed table, a movable presser foot overlying the forward edge of said sheet stack adapted to normally exert pressure on said stack, means for moving said presser foot free from contact with said stack, means for removing a sheet from said stack when said presser foot is free from said stack, means for transferring said sheet to said table, and means for feeding said sheet from said table.

48. A sheet feed mechanism comprising, a frame, a movable sheet stack supporting member, a sheet feed table, a movable presser foot overlying the forward edge of said sheet stack adapted to normally exert pressure on said stack, means for moving said presser foot free from contact with said stack, means for controlling the operation of said presser foot moving means adapted to render the same operative or inoperative, means for removing a sheet from said stack when said presser foot is free from pressure contact with said stack, means for transferring said sheet to said table, and means for feeding said sheet from said table.

49. A sheet feed mechanism comprising, a movable sheet stack supporting member, automatic means for elevating said sheet stack supporting member intermittently to retain the top of the sheet stack at a substantially constant level as sheets are removed therefrom, a presser foot adapted to overlie a portion of said sheet stack and exert a holding pressure thereon, presser foot actuating means operative to raise said presser foot from contact with said sheet stack, means operative upon the uppermost sheets of said stack tending to separate said sheets to facilitate the removal of the top sheet, and means for removing the top sheet from said stack when the presser foot is free from contact therewith.

50. A sheet feed mechanism comprising, a movable sheet stack supporting member, automatic means for elevating said sheet stack supporting member intermittently to retain the top of the sheet stack at a substantially constant level as sheets are removed therefrom, a presser foot adapted to overlie a portion of said sheet stack and exert a holding pressure thereon, pressure foot actuating means operative to raise said presser foot from contact with said sheet stack, fluid pressure means associated with said presser foot, means operative to energize said fluid pressure means when said presser foot is free from contact with said sheet stack to direct a jet of air under pressure against the edge of said sheet stack to separate the uppermost sheets to facilitate the removal of the top sheet, and means for removing the top sheet from said stack when said presser foot is free from contact therewith.

51. A sheet feed mechanism comprising, a movable sheet stack supporting member, automatic means for elevating said sheet stack supporting member intermittently to retain the top of the sheet stack at a substantially constant level as sheets are removed therefrom, a presser foot adapted to overlie a portion of said sheet stack and exert a holding pressure thereon, presser foot actuating means operative to raise said presser foot from contact with said sheet stack, fluid pressure means associated with said presser foot, means operative to energize said fluid pressure means when said presser foot is free from contact with said sheet stack to direct a jet of air under pressure against the edge of said sheet stack to separate the uppermost sheets to facilitate the removal of the top sheet, jogger means operative upon the uppermost sheets of said stack to aid in the action of said fluid pressure means, and means for removing the top sheet from said stack when said presser foot is free from contact therewith.

52. A sheet feed mechanism comprising, a movable sheet stack supporting member, a sheet feed table, a sheet feed roll, a movable presser foot overlying the forward edge of said sheet stack adapted to normally exert pressure on said stack, means for moving said presser foot free from contact with said stack, means for controlling the operation of said presser foot moving means to render the same operative or inoperative in accordance with the requirement for the feeding of a sheet, means for removing a sheet when said presser foot is free from contact with said sheet stack, means for transferring the top sheet to said sheet feed table and releasing the same in contact with said sheet feed roll, and means for rendering said sheet feed roll operative to feed said sheet from said table.

53. A sheet feed mechanism comprising, a movable sheet stack supporting member, a sheet feed table, a sheet feed roll, a movable presser foot arranged to overlie a portion of said sheet stack and exert a holding pressure thereon, presser foot moving means operative to free said foot from contact with said sheet stack, fluid pressure means associated with said presser foot, means operative to energize said fluid pressure means when said presser foot is free from contact with said sheet stack to direct a jet of air under pressure against the edge of said sheet stack to separate the uppermost sheets to facilitate the removal of the top sheet, vacuum means operative to engage and remove the top sheet of said stack when said presser foot is free from contact therewith and deposit the same on said sheet feed table in contact with said sheet feed roll, and means operative to drive said sheet feed roll to feed the sheet from said table.

54. A caliper mechanism for gauging the correctness of the thickness of one piece of material in comparison with another piece of material comprising, a movable gauge supporting member, a pair of movable elements carried by said member, one of said elements being adapted to contact one piece of the material and the other being adapted to contact the other piece of material, a floating element disposed to contact both of said movable elements, and gauging means arranged to cooperate with said floating element and operative to determine the correctness of the position of said floating element whereby the correctness of the thickness of one piece of material with respect to another is indicated.

55. A caliper mechanism for gauging the correctness of the thickness of one piece of material in comparison with another piece of material comprising, a movable gauge supporting member, a pair of movable elements carried by said member, one of said elements being adapted to contact one piece of the material and the other being adapted to contact the other piece of material, means for moving said gauge supporting member to bring said movable elements into contact with the respective pieces of material, a floating element adapted to be retained in contact with both of said movable elements and be positioned thereby, a pair of gauging surfaces on said floating element, and gauging means movable into cooperating relationship with said gauging surfaces on said floating element to determine the correctness of the position of said floating element whereby the correctness of the thickness of one piece of material with respect to another is indicated.

56. A caliper mechanism for gauging material to determine the correctness of a portion thereof with respect to the whole comprising, a movable gauge supporting member, a pair of movable material contacting elements carried by said gauge supporting member, a floating element disposed to contact said material contacting elements, and gauging means arranged to cooperate with said floating element and operative to determine the correctness of the position of said floating element whereby the correctness of the portion with respect to the whole is indicated.

57. A caliper mechanism for gauging material to determine the correctness of a portion thereof with respect to the whole comprising, a movable gauge supporting member, a pair of spaced material contacting elements, one of said elements being adapted to contact the portion of material and the other being adapted to contact the whole material, a floating element arranged to be retained in contact with both of said material contacting elements and movable under the action of said material contacting elements to position said floating element with respect to the material, and gauging means movable into cooperating relationship with said floating element to determine the correctness of the position of said floating element whereby the correctness of the portion with respect to the whole is indicated.

58. A caliper mechanism for gauging material to determine the correctness of a portion thereof with respect to the whole comprising, a fixed abutment adapted to expose a portion of the material, a movable member adjacent said fixed abutment, a pair of movable material contacting elements mounted in spaced relationship on said movable member, one of said material contacting elements being arranged to contact the exposed portion of the material and the other of said elements being arranged to contact the whole of the material, a floating element arranged to be retained in contact with said material contacting elements and be positioned thereby with respect to the material to be calipered, a gauging surface on said floating element, and a gauging means movable into cooperating relationship with said gauging surface on said floating element to determine the correctness of the position of said floating element whereby the correctness of the portion of material with respect to the whole is indicated.

59. A caliper mechanism for gauging material to determine the correctness of a portion thereof with respect to the whole comprising, a pair of abutments one for contact with the portion of material to be gauged and the other for contact with the whole of the material, a movable gauge supporting member, a pair of movable material contacting elements carried by said gauge supporting member, a floating element arranged to contact said material contacting elements, means for urging said material contacting elements against the material, one of said material contacting elements cooperating with each of said abutments to effect the positioning of said floating element, and a gauging element arranged to cooperate with said floating element to determine the correctness of the position of said floating element whereby the correctness of the thickness of material calipered is indicated.

60. A caliper mechanism comprising, a fixed abutment, a movable member adjacent to said fixed abutment, a pair of movable material contacting elements mounted on said movable member, a floating element, means for retaining said floating element in contact with said material contacting elements, a gauging surface on said floating element, and a gauging element arranged to coact with said gauging surface on said floating element to indicate the correctness of the positioning of said floating element.

61. A caliper mechanism comprising, a fixed abutment, a movable member adjacent to said fixed abutment, a pair of movable material contacting elements mounted on said movable member, a floating element, means for retaining said floating element in contact with said material contacting elements, means for moving said movable member to bring said material contacting elements into contact with the material disposed between said elements and said fixed abutment whereby said floating element is moved to a position controlled by the material contacting elements, a gauging surface on said floating element, and a gauging element arranged to coact with said gauging surface on said floating element to indicate the correctness of the positioning of said floating element whereby the correctness of the thickness of material calipered is indicated.

62. A caliper mechanism comprising, a fixed abutment, a movable member adjacent to said fixed abutment, a pair of movable elements mounted on said movable member in spaced relationship, means for moving said movable member to bring said movable elements into contact with material disposed between said elements and said fixed abutment, a floating element adapted to contact said movable elements and be positioned thereby with respect to the material to be calipered, and gauging means arranged to cooperate with said floating element to determine the correctness of the position of said floating element.

63. A caliper mechanism comprising, a fixed abutment, a movable member adjacent to said fixed abutment, a pair of movable elements mounted on said movable member in spaced relationship, means for moving said movable member to bring said movable elements into contact with material disposed between said elements and said fixed abutment, one of said movable elements being arranged to contact a portion of the material and the other being arranged to contact the whole material to be calipered, a floating element adapted to contact said movable elements and be positioned thereby with respect to the material to be calipered, and gauging means arranged to cooperate with said floating element to determine the correctness of the position of said floating element whereby the correctness of the thickness of the material calipered is indicated.

64. A caliper mechanism comprising, a fixed abutment, a movable member adjacent said fixed abutment, a pair of movable elements mounted on said movable member, a floating element in contact with each of said movable elements, a pair of parallelly disposed faces on said floating element, a fixed element adjacent said faces, a pair of parallelly disposed faces on said fixed element spaced from said faces on said floating element, and a gauging element adapted for introduction between the adjacent faces of said floating element and said fixed element.

65. A caliper mechanism for checking the accuracy of the opening and insetting operations in a signature handling machine comprising, a fixed abutment adapted to house the unopened sheets of a signature and expose the opened sheets together with the inset sheet, a movable member adjacent said fixed abutment, a pair of movable signature contacting elements mounted in spaced relationship on said movable member, one of said signature contacting elements being arranged to contact the opened portion of the signature and the other of said elements being arranged to contact the complete signature, a floating element arranged to be retained in contact with said signature contacting elements and to be positioned thereby with respect to the signature to be calipered, gauging surfaces on said floating element, and gauging means movable into cooperating relationship with said gauging surfaces on said floating element to determine the correctness of the position of said floating element whereby the correctness of the signature opening and insetting operations are indicated.

66. A calipering mechanism for checking the accuracy of the opening and insetting operations in a signature handling machine comprising, a fixed abutment, a movable member adjacent said fixed abutment, a pair of signature contacting elements mounted in spaced relationship on said movable member, means for moving said movable member to bring said signature contacting elements into contact with the signature positioned between said movable member and said fixed abutment, one of said signature contacting elements being arranged to contact the opened portion of the signature and the other of said elements being arranged to contact the complete signature, a floating element arranged to be retained in contact with said signature contacting elements and be positioned thereby with respect to the signature to be calipered, gauging surfaces on said floating element, and a gauging means operative to be moved toward and from said gauging surfaces on said floating element to determine the correctness of the position of said floating element whereby the correctness of the opening and insetting operations are indicated.

67. A caliper mechanism for checking the accuracy of the opening and insetting operations in a signature handling machine comprising a fixed abutment adapted to house the unopened sheets of a signature and expose the opened sheets together with the inset sheet, a movable member adjacent said fixed abutment, a pair of axially movable signature contacting elements mounted in laterally spaced relationship on said movable member, a floating element adapted to contact both of said signature contacting elements, a gauge surface on said floating element, a fixed element adjacent said floating element, a gauge surface on said fixed element in spaced relationship with said gauge surface on said floating element, a gauge ball adapted for introduction between said gauge surface on said floating element and said gauge surface on said fixed element, mechanical means for elevating said gauge ball between said gauge surfaces, and gravity means for retaining said ball to a position beneath said floating element.

68. A caliper mechanism for checking the accuracy of the opening and insetting operations in a signature handling machine comprising a fixed abutment adapted to house a portion of the unopened signature and expose the opened sheets together with the inset sheet, a pair of movable members adapted to be urged toward and from said fixed abutment, a pair of axially movable signature contacting elements mounted in laterally spaced relationship on each of said movable members, one of each pair of signature contacting elements adapted to contact the exposed portion of the filled signature lying between said fixed abutment and said movable members, the other of each pair of signature contacting elements adapted to contact the face of the entire signature including the inset sheet, a floating element adapted to remain in contact with said pair of signature contacting elements on said movable member, a pair of finished surfaces on each of said floating elements, a fixed element adjacent the sides of said floating element, a finished surface on said fixed element lying in spaced parallel relationship with each surface on said floating element when the same is parallel to the center line of the signature, a movable gauge ball adapted to be elevated into a position between the finished surfaces of said floating element and said fixed element on each side of said floating element, and gravity means for returning each of said balls to a position beneath the floating element if the signature is properly opened and filled.

69. The method of calipering a piece of material to determine the correctness of its thickness in comparison with a standard which comprises the contacting of the piece of material by one movable element and the standard by another movable element, a floating element arranged to be maintained in abutting relationship with both of said movable elements and movable under the action of said elements to position said floating element, and gauging means arranged to cooperate with said floating element and operative to determine the correctness of the position of said floating element whereby the correctness of the thickness of the material to be calipered is indicated.

70. The method of calipering material which comprises the contacting of material by a pair of movable elements, one of said elements being adapted to gauge the thickness of a portion of the material and the other being adapted to gauge the entire thickness of the material, a floating element disposed to contact said material contacting elements, and gauging means arranged to cooperate with said floating element and operative to determine the correctness of the position of said floating element whereby the correctness of the portion with respect to the whole is indicated.

71. The method of calipering material to determine the correctness of a portion thereof with respect to the whole which comprises the contacting of the material by a pair of spaced material contacting elements, one of said elements being adapted to contact the portion of the material and said other element being adapted to contact the whole material, a floating element arranged to be maintained in abutting relationship with said material contacting elements and movable under the action of said material contacting elements to position said floating element with respect to the material, and gauging means arranged to cooperate with said floating element to determine the correctness of the position of said floating element whereby the correctness of the portion with respect to the whole is indicated.

72. The method of calipering a filled signature to check the correctness of the opening and insetting operations which comprises the contacting of a signature by a pair of movable elements, one of said elements adapted to gauge the thickness of the opened sheets of the signature plus the thickness of the inset sheet and the other adapted to gauge the entire thickness of the signature plus the thickness of the inset sheet, a floating element lying in contact with said signature contacting elements, a fixed element in spaced relationship with said floating element and cooperating with the same to permit the admission of a gauging element between said floating element and said fixed element and permit its withdrawal in the event that the signature is correctly opened and filled.

73. The method of calipering a filled signature to check the correctness of the opening and insetting operations which comprises the contacting of a signature by a pair of movable elements, one of said elements adapted to gauge the thickness of the opened sheets of the signature plus the thickness of the inset sheet and the other adapted to gauge the entire thickness of the signature plus the thickness of the inset sheet, and means for gauging the position of a floating element operatively associated with said signature contacting elements to determine the accuracy of said opening and insetting operations.

74. A signature discharge mechanism comprising, a signature supporting member, a driven signature discharge roll disposed adjacent to the supported signature, and a driven signature contacting element arranged to cooperate with said driven discharge roll to effect withdrawal of the signature from said signature supporting member.

75. A signature discharge mechanism comprising a signature supporting member, a driven signature discharge roll disposed adjacent to the supported signature, a driven signature contacting element arranged to cooperate with said driven discharge roll to effect withdrawal of the signature from said signature supporting member, and a movable means operative to receive the signature from said discharge roll and deposit it on a signature receiving element.

76. A signature discharge mechanism comprising, a signature supporting member, a signature contacting element adapted to engage the signature, a signature delivery element adapted to cooperate with said signature contacting element to effect removal of the signature from said support, a signature receiving member, and a movable means operative to receive the signature from said signature delivery element and deposit it on said signature receiving member.

77. A signature discharge mechanism comprising, a frame, a signature supporting member, a signature contacting element adapted to engage the signature, a signature delivery element adapted to cooperate with said signature contacting element to effect removal of the signature from said signature supporting member, and movable means operative to permit an improperly filled signature to be discharged untouched by said means and operative to receive a properly filled signature from said signature delivery element and discharge it from the machine.

78. A signature discharge mechanism comprising, a frame, a signature supporting member, a driven signature contacting element adapted to engage the signature, a driven discharge roll adapted to cooperate with said signature contacting element to effect withdrawal of the signature from said signature supporting member, a movable signature fly, and means for controlling said fly movement whereby properly filled signatures are received on said fly and improperly filled signatures pass the fly when discharged from said discharge roll.

79. The combination with a signature handling machine including a signature conveyor, a power source, a transmission, a clutch, and manual means for operating said clutch, of a fluid pressure control circuit including a pump continuously driven from said power source, a conduit in said circuit, a gap in said conduit bridging the path of signature travel along said conveyor, and fluid pressure responsive means adapted to automatically disengage said clutch in the absence of a signature following its normal course of travel through said machine.

80. The combination with a signature handling machine including a signature conveyor, a power source, a transmission, a clutch, a manual means for operating said clutch, of a fluid pressure control circuit including a pump continuously driven from said power source, a plurality of conduits in said circuit, a gap in each conduit bridging the path of signature travel through said machine at spaced intervals along said conveyor, and fluid pressure responsive means adapted to automatically disengage said clutch in the absence of a signature following its normal course of travel through said machine.

MARTIN CHRISTENSEN.